(12) United States Patent
Werner et al.

(10) Patent No.: US 8,887,471 B2
(45) Date of Patent: Nov. 18, 2014

(54) STRUT, SYSTEM AND METHOD FOR A SOLAR MIRROR FRAME

(75) Inventors: Craig Roy Werner, Lake Forest, IL (US); John Funai, Lake in the Hills, IL (US)

(73) Assignee: Werner Extrusion Solutions LLC, Libertyville, IL (US)

( * ) Notice: Subject to any disclaimer, the term of this patent is extended or adjusted under 35 U.S.C. 154(b) by 534 days.

(21) Appl. No.: 12/798,757

(22) Filed: Apr. 10, 2010

(65) Prior Publication Data

US 2010/0258702 A1 Oct. 14, 2010

Related U.S. Application Data

(63) Continuation-in-part of application No. 12/583,787, filed on Aug. 26, 2009.

(60) Provisional application No. 61/212,854, filed on Apr. 16, 2009, provisional application No. 61/190,573, filed on Aug. 29, 2008.

(51) Int. Cl.
*E04H 12/00* (2006.01)
*F24J 2/54* (2006.01)
*F24J 2/14* (2006.01)
*F24J 2/10* (2006.01)
*F24J 2/52* (2006.01)

(52) U.S. Cl.
CPC .. *F24J 2/14* (2013.01); *Y02E 10/45* (2013.01); *Y02E 10/47* (2013.01); *F24J 2002/1085* (2013.01); *F24J 2/5233* (2013.01); *F24J 2/52* (2013.01); *F24J 2/541* (2013.01)
USPC ............ 52/655.1; 52/653.1; 52/693; 403/157

(58) Field of Classification Search
USPC ......... 52/693, 655.1, 653.2, 653.1, 81.3, 694; 248/284.1, 291.1; 403/79, 157
See application file for complete search history.

(56) References Cited

U.S. PATENT DOCUMENTS

| | | | |
|---|---|---|---|
| 3,977,800 A | 8/1976 | Cassel | |
| 4,140,414 A | 2/1979 | Buttgereit | |
| 4,226,550 A * | 10/1980 | Kupcak et al. | 403/157 |
| 4,567,707 A | 2/1986 | Herman | |
| 4,570,408 A | 2/1986 | Frascaroli et al. | |
| 4,669,908 A | 6/1987 | Simone et al. | |
| 4,836,485 A * | 6/1989 | Cooper | 248/278.1 |
| 4,929,113 A * | 5/1990 | Sheu | 403/157 |
| 5,556,219 A | 9/1996 | Mason | |
| 5,964,546 A | 10/1999 | Castano | |
| 6,675,546 B2 * | 1/2004 | Coles | 52/655.1 |
| 2004/0128940 A1 | 7/2004 | Laforge | |
| 2006/0277843 A1* | 12/2006 | Livingston et al. | 52/110 |
| 2007/0011983 A1* | 1/2007 | Reynolds et al. | 52/633 |
| 2007/0125033 A1* | 6/2007 | Stephan et al. | 52/655.1 |
| 2008/0072516 A1* | 3/2008 | Reynolds et al. | 52/694 |
| 2010/0005752 A1* | 1/2010 | Hawkins et al. | 52/655.1 |
| 2011/0286121 A1* | 11/2011 | Werner et al. | 359/872 |

\* cited by examiner

*Primary Examiner* — Brian Glessner
*Assistant Examiner* — Brian D Mattei
(74) *Attorney, Agent, or Firm* — Ansel M. Schwartz

(57) ABSTRACT

A strut end piece for a strut for connecting with a fin of a sleeve for a solar mirror frame support. A strut for receiving a strut end piece for a solar mirror frame support. A sleeve for connecting with a chord and a strut end piece for a solar mirror frame support having a main portion having an opening for receiving the chord. A method for connecting a sleeve to a chord and a strut end piece for a solar mirror frame support.

3 Claims, 113 Drawing Sheets

Compression Deformation

A = .0045
B = .0043
C = .0035
D = .0018
E = <.0015
F = .0018
G = .002
H = .0025
I = .005
(INCHES)

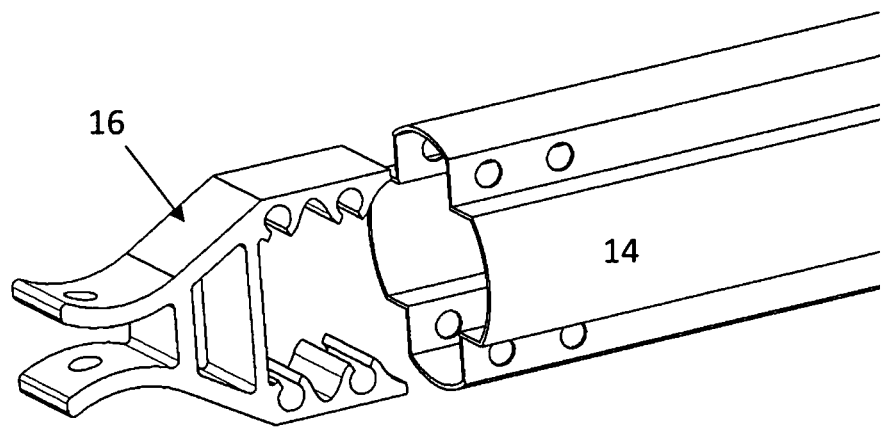
FIGURE 67
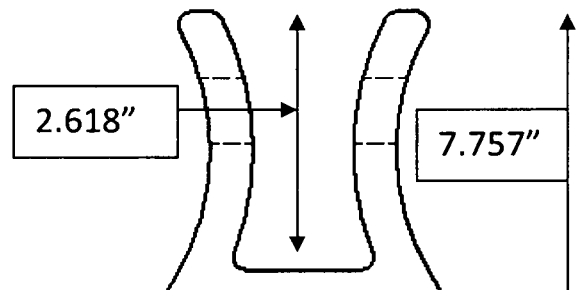
FIGURE 68
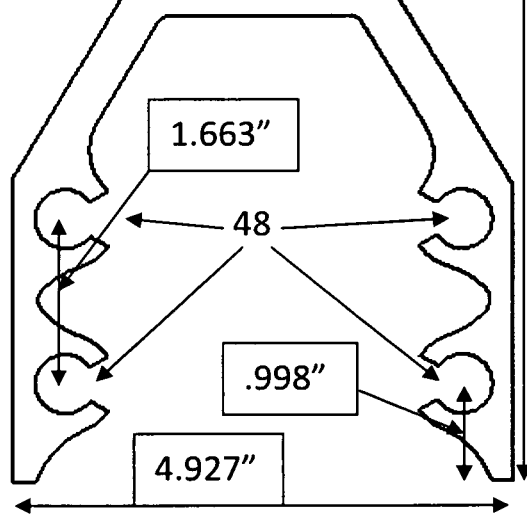

AN ADDITIONAL HOLE CAN BE ADDED FOR HIGHER LOADS

STRUT, SYSTEM AND METHOD FOR A SOLAR MIRROR FRAME

CROSS-REFERENCE TO RELATED APPLICATIONS

This is a nonprovisional of U.S. provisional application 61/212,854 filed Apr. 16, 2009, and is a continuation-in-part of U.S. patent application Ser. No. 12/583,787 filed Aug. 26, 2009, which is a nonprovisional of U.S. provisional application 61/190,573 filed Aug. 29, 2008.

FIELD OF THE INVENTION

The present invention is related nodes, such as sleeves, strut end pieces and struts of a solar mirror frame support. (As used herein, references to the "present invention" or "invention" relate to exemplary embodiments and not necessarily to every embodiment encompassed by the appended claims.)

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

CSP (Concentrated Solar Power), particularly the parabolic trough utility scale facilities, are a proven source of renewable energy. Florida Power and Light operates a facility in the Mojave Desert which has operated for decades, which is based on a steel framework supporting the parabolic mirrors. Parabolic mirrors focus sunlight on an oil filled tube, and the hot oil is transferred to a conventional steam electrical power plant (the hot oil boils the water to steam, which drives the turbines).

Nevada Solar One (NSO) came on line a few years ago—the first new parabolic trough CSP plant in the US since the Mojave Desert installation. NSO used aluminum extrusions, fabricated and assembled into mirror support frames instead of structural steel. Continued installation of these types of CSP utility scale operations requires continual development in the technologies to improve performance and reduce costs.

The WES solar frame designs (see provisional patent applications U.S. 61/190,573 and 61/195,087, both of which are incorporated by reference herein) incorporate improvements in the extruded and other profiles and the way that they are combined into a framework to support the mirrors. These improvements yield a more efficient system—from profiles that are more easily extrudable at a wider variety of available extrusion operations through parts that are easily fabricated and assembled, utilizing the unique design opportunities provided by the aluminum extrusion process to enhance performance and reduce weight and cost of the final installation.

The description of the present invention, which follows incorporates further improvements to the WES designs, covering the strut, strut end piece and sleeve design enhancements which separately and together yield these improved designs, performance and costs.

BRIEF SUMMARY OF THE INVENTION

The present invention pertains to a sleeve for connecting with a chord and a strut end piece for a solar mirror frame support. The sleeve comprises a main portion having an opening for receiving the chord. The sleeve comprises at least one fin extending outward from the main portion having opposing nonparallel surfaces.

The present invention pertains to a strut end piece for a strut for connecting with a fin of a sleeve for a solar mirror frame support. The strut end piece comprises an engagement portion which engages with the strut. The strut and piece comprises a first strut end piece upper leg extending from the engagement portion. The strut end piece comprises a second strut end piece upper leg extending from the engagement portion, the ends of the first strut end piece upper leg and the second strut end piece upper leg curving outwards, the first and second strut end piece upper legs engaging with the fin of the sleeve.

The present invention pertains to a strut. The strut comprises a housing. The strut comprises a strut end piece formed from the housing and into a single fin.

The present invention pertains to a strut. The strut comprises a housing. The strut comprises a strut end piece formed from the housing and having a slot in which the fin of the sleeve is disposed. The strut may include a strut spacer disposed in the housing.

The present invention pertains to a strut. The strut comprises a housing. The strut comprises a strut end piece formed from the housing and defining a tube which receives a fin of a sleeve to connect with the sleeve.

The present invention pertains to a strut for receiving a strut end piece for a solar mirror frame support. The strut comprises a housing having an opening. The housing has an indented portion that is adapted to fasten with the strut end piece.

The present invention pertains to a sleeve for connecting with a chord and a strut end piece for a solar mirror frame support. The sleeve comprises a main portion having an opening for receiving the chord. The sleeve comprises a first fin extending outward from the main portion having opposing nonstraight surfaces which may also be nonparallel. The sleeve comprises a second fin extending outward from the main portion having opposing nonstraight surfaces which may also be nonparallel in spaced relation with the first fin, the strut end piece connected to the first and second fin.

The present invention pertains to a sleeve for connecting with a chord and a strut end piece for a solar mirror frame support. The sleeve comprises a main portion having an opening for receiving the chord. The sleeve comprises a fin extending outward from the main portion, the fin having an opening through which a fastener is inserted to connect the strut end piece to the fin.

The present invention pertains to a method for connecting a sleeve to a chord and a strut end piece for a solar mirror frame support. The method comprises placing a first strut end piece upper leg extending from an engagement portion which engages with the strut and a second strut end piece upper leg extending from the engagement portion which engages with the strut about a fin extending outward from a main portion of a sleeve having an opening for receiving the chord, the ends of the first strut end piece upper leg and the second strut end piece upper leg curving outwards, the first and second strut end piece upper legs engaging with the fin of the sleeve. There is the step of inserting a fastener through the fin and the first and second strut end piece upper legs to attach the sleeve to the strut.

BRIEF DESCRIPTION OF THE SEVERAL VIEWS OF THE DRAWING

In the accompanying drawings, the preferred embodiment of the invention and preferred methods of practicing the invention are illustrated in which:

FIG. 67 shows an SEP with screw bosses 48 and 3D assembly.

FIG. 68 shows an SEP with screw bosses 48—Print.

FIG. 81a shows a strut without strut spacer.

FIG. 97 shows a Box strut with SEP—3D.

FIG. 98 shows an X Strut.

FIG. 99 shows an X Strut and SEP with connection hole—3D.

FIG. 100 shows an X Strut—and SEP with screw bosses 48—3D.

FIG. 101 shows an SEP with screw bosses 48.

FIG. 102 shows an FEA for SEP with screw bosses 48—Deformation in compression.

FIG. 103 shows an FEA for SEP with screw bosses 48—Stress in compression.

FIG. 104 shows a Smashed Strut Concept—3D.

FIG. 105 shows a Formed Strut Concept—3D.

FIG. 106 shows a Slotted Strut concept shown with strut spacer—3D.

DETAILED DESCRIPTION OF THE INVENTION

Figure 1A:
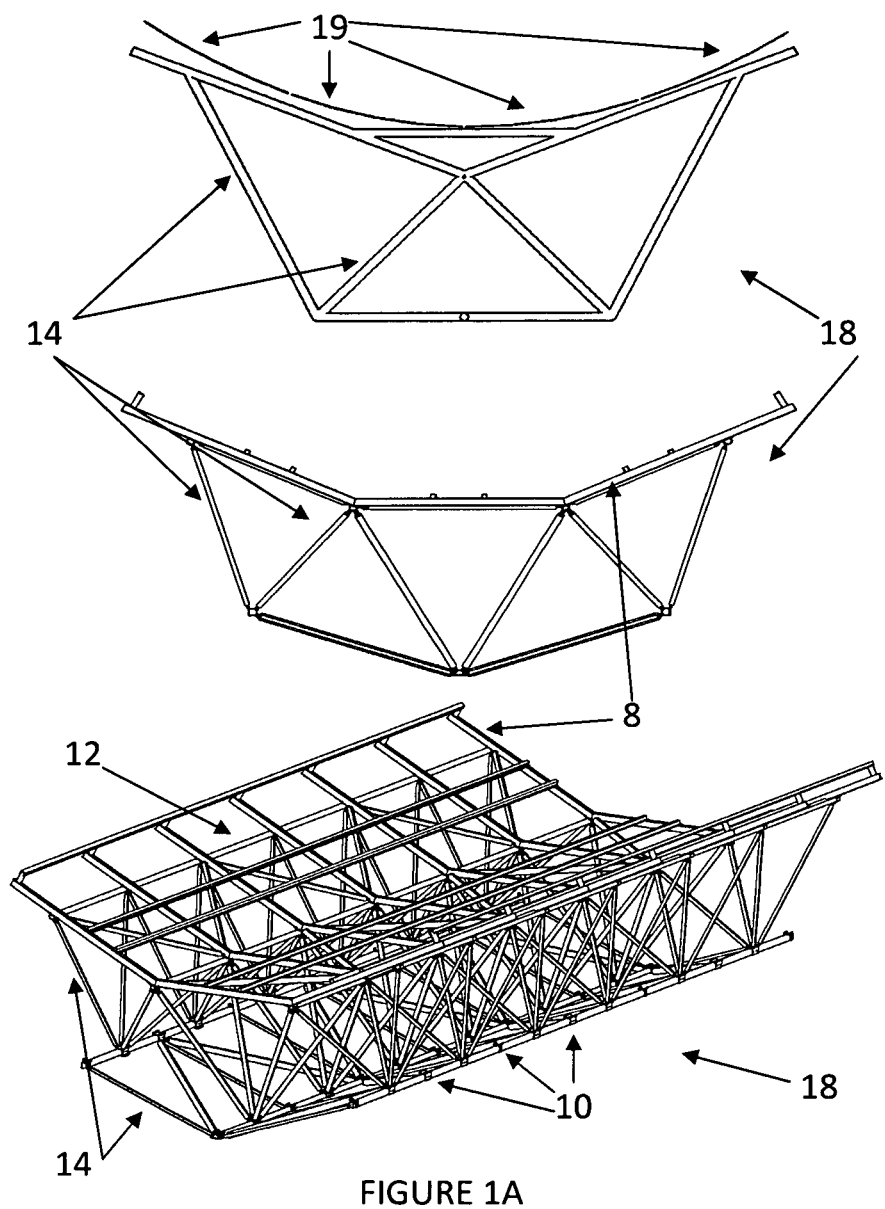
FIG. 1a shows Series 3 and 5 end views and Series 5 angled view showing the overall configuration of a solar frame.

Referring now to the drawings wherein like reference numerals refer to similar or identical parts throughout the several views, and more specifically to FIGS. 3a, 3b, 84 and 85 thereof, there is shown a sleeve 10 for connecting with a chord 12 and a strut end piece 16 for a solar mirror frame support 18. The sleeve 10 comprises a main portion 20 having an opening 22 for receiving the chord 12. The sleeve 10 comprises at least one fin 24 extending outward from the main portion 20 having opposing nonparallel surfaces 26.

The sleeve 10 may have a plurality of fins 24 extending outward from the main portion 20. Each of these additional fins may or may not have opposing nonparallel surfaces 26. All or some of the fins may or may not be in parallel with each other. The opposing surfaces 26 of the fin 24 may be curved. The fin 24 may have a wider central portion 28 than the fin's base 30 that connects to and extends from the main portion 20. The fin 24 may have a wider central portion 28 than the fin's top 32.

The main portion 20 may have a slot 34. The fin 24 is disposed in the slot 34 and extends from the slot 34. The fin 24 may be separable and removable from the main portion 20.

Figure 87:
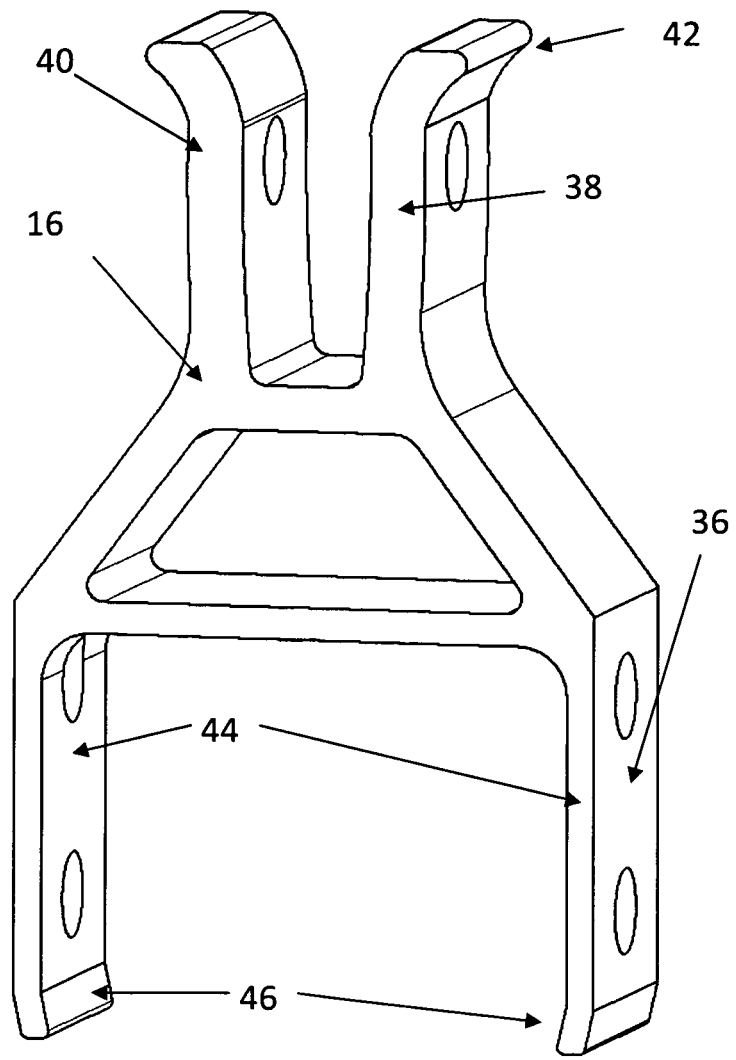
FIG. 87 shows a Guided Insertion SEP—3D.

The present invention pertains to a strut end piece 16 for a strut 14 for connecting with a fin 24 of a sleeve 10 for a solar mirror frame support 18. See FIG. 87. The strut end piece 16 comprises an engagement portion 36 which engages with the strut 14. The strut end piece 16 comprises a first strut end piece upper leg 38 extending from the engagement portion 36. The strut end piece 16 comprises a second strut end piece upper leg 40 extending from the engagement portion 36, the ends 42 of the first strut end piece upper leg 38 and the second strut end piece upper leg 40 curving outwards, the first and second strut end piece upper legs 38, 40 engaging with the fin 24 of the sleeve 10.

Figure 89:
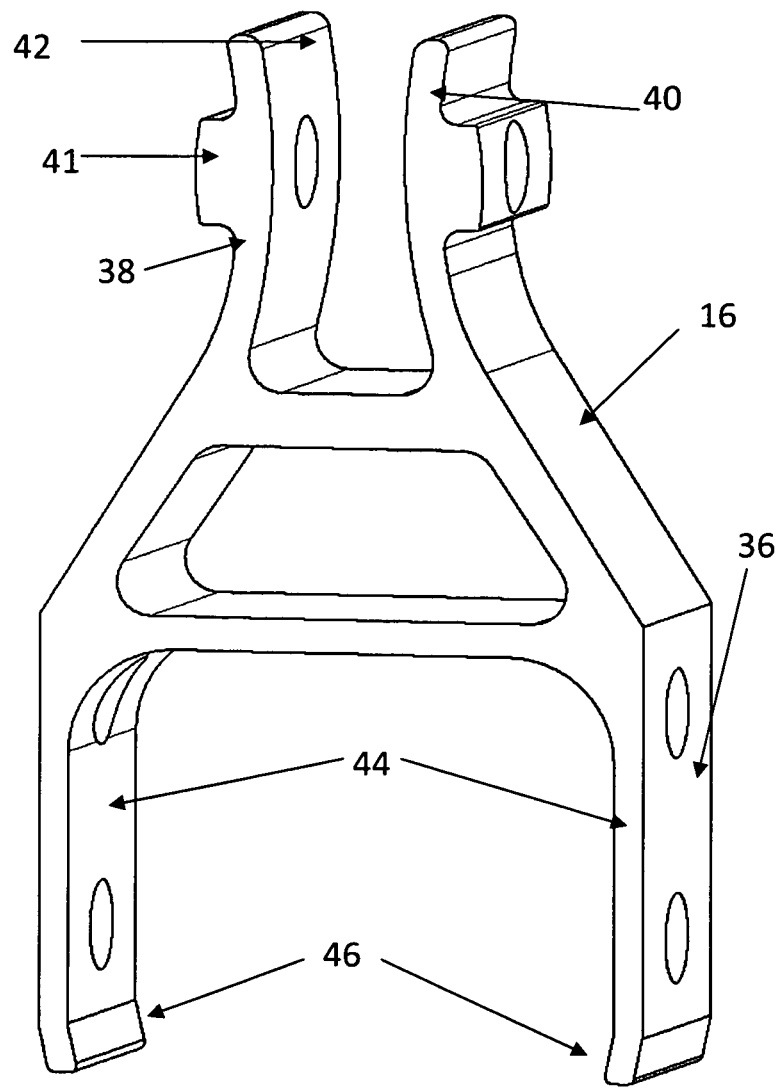
FIG. 89 shows a Guided Insertion SEP thickened (nonparallel) bearing area.
Figure 90:
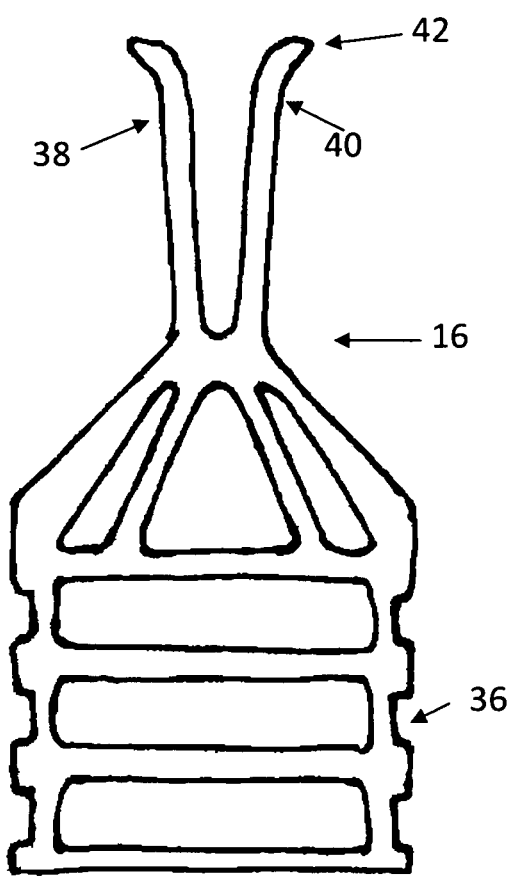
FIG. 90 shows a hand drawing of extruded swaged SEP.

The engagement portion 36 may have bottom legs 44 (or may be connected into one piece as a solid or hollow) which fit into the strut 14 whose ends 46 angle inwards for ease of insertion. The first and second strut end piece upper legs 38, 40 may have at least a portion which is curved outwards along their length. Each of the upper legs may have a greater thickness where a fastener connects the upper legs with the sleeve 10 fin 24. See FIG. 89. The engagement portion 36 may be swaged to the strut 14. See FIG. 90. Each of the bottom legs 44 may have a screw boss 48 or a fastener. See FIG. 99. The strut end piece 16 may be connected to the strut 14 with a pin, bolt, rivet or other fastener extending through the strut 14 in the bottom legs 44 of the strut end piece 16. The strut end piece 16 may be a separate and distinct element from the strut 14 and may be attached or separated from the strut 14 as required.

Figure 104:
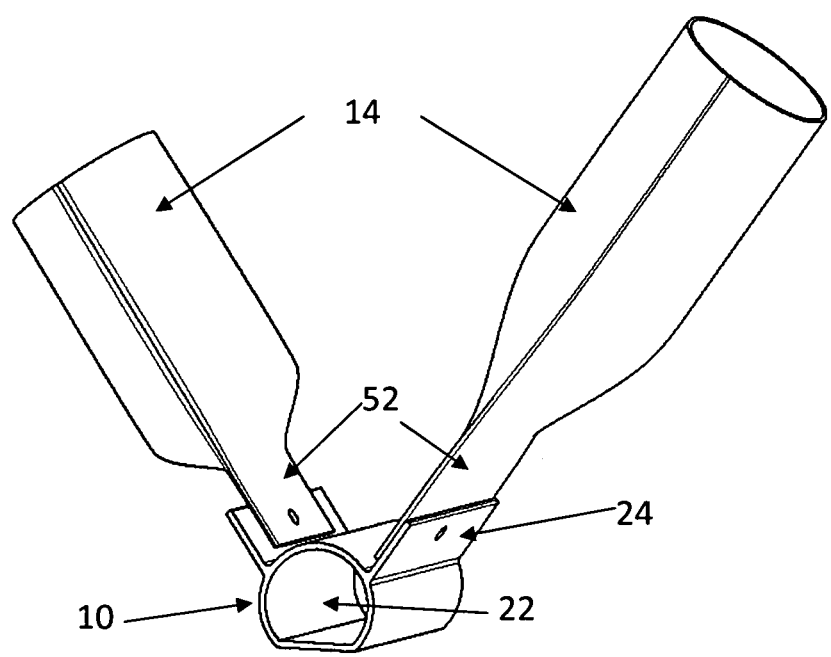

The present invention pertains to a strut 14. The strut 14 comprises a housing 50. The strut 14 comprises a strut end piece 16 formed from the housing 50 and into a single fin 52. See FIG. 104.

Figure 106:
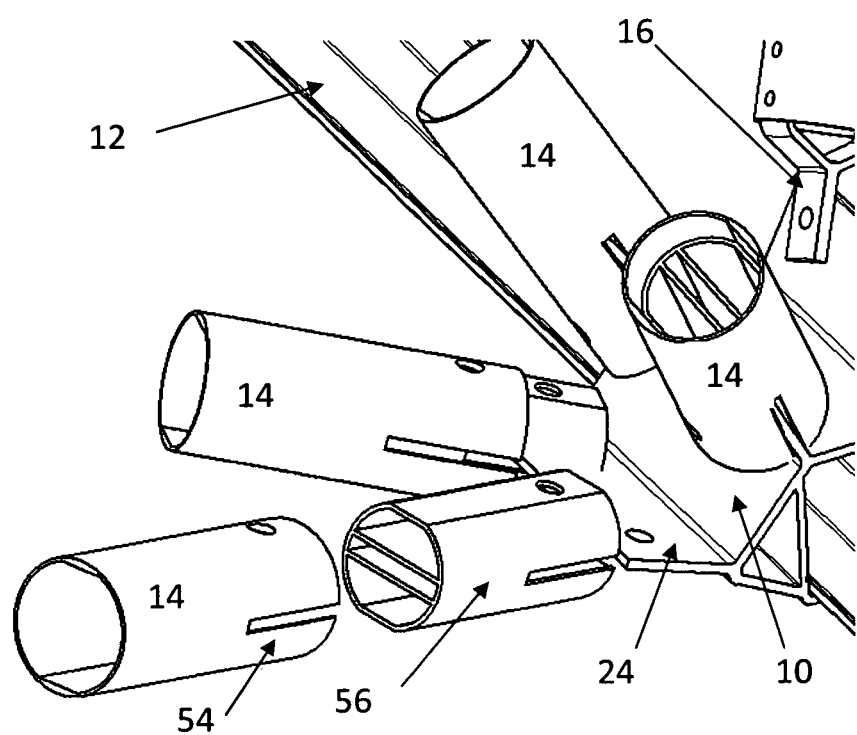

The present invention pertains to a strut 14. The strut 14 comprises a housing 50. The strut 14 comprises a strut end piece 16 formed from the housing 50 and having a slot 54 in which the fin 24 of the sleeve 10 is disposed. The strut 14 may include a strut spacer 56 disposed in the housing 50. See FIG. 106.

Figure 105:
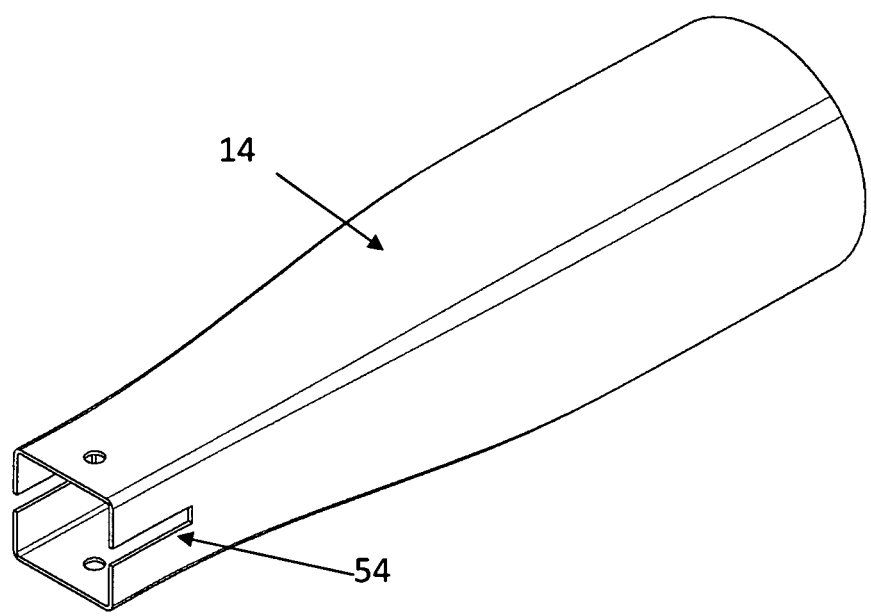

The present invention pertains to a strut 14. The strut 14 comprises a housing 50. The strut 14 comprises a strut end piece 16 formed from the housing 50 and defining a tube which receives a fin 24 of a sleeve 10 to connect with the sleeve 10. See FIG. 105.

Figure 95:
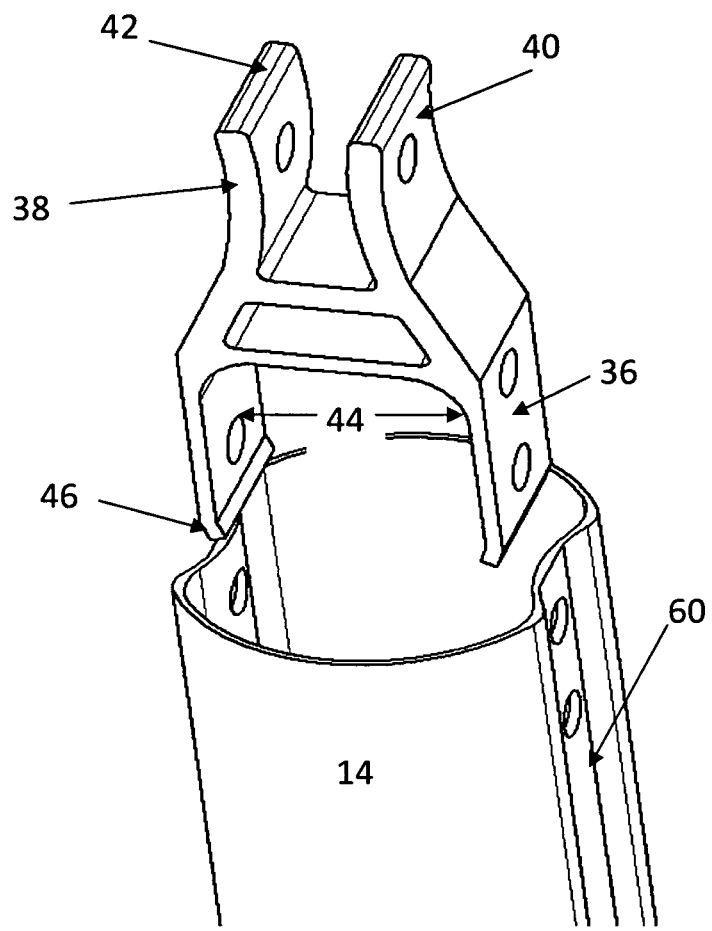
FIG. 95 shows an Apple Strut with SEP-3D.

The present invention pertains to a strut 14 for receiving a strut end piece 16 for a solar mirror frame support 18. The strut 14 comprises a housing 50 having an opening 58. The housing 50 has an indented portion 60 that is adapted to fasten with the strut end piece 16. See FIG. 95.

Figure 97:
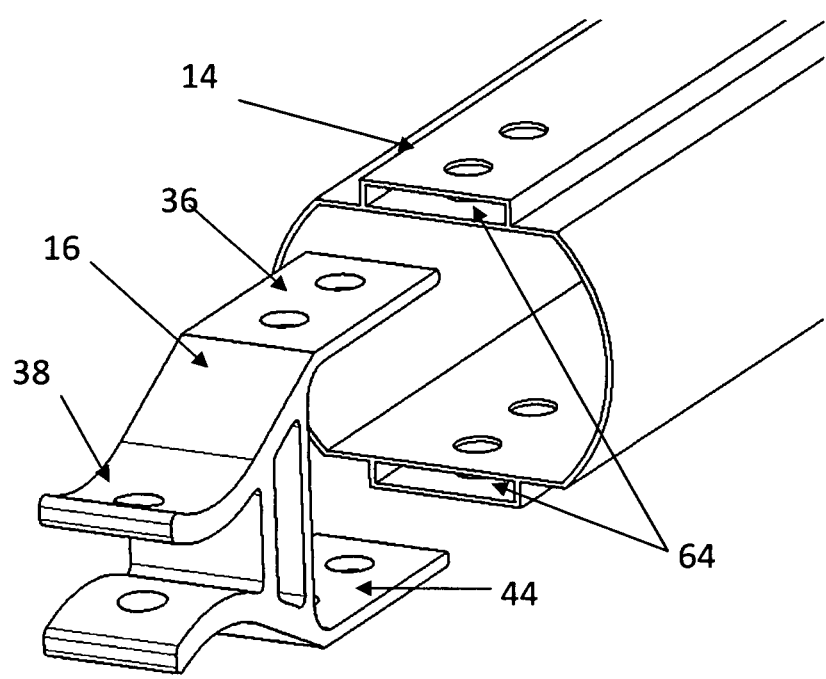
Figure 98:
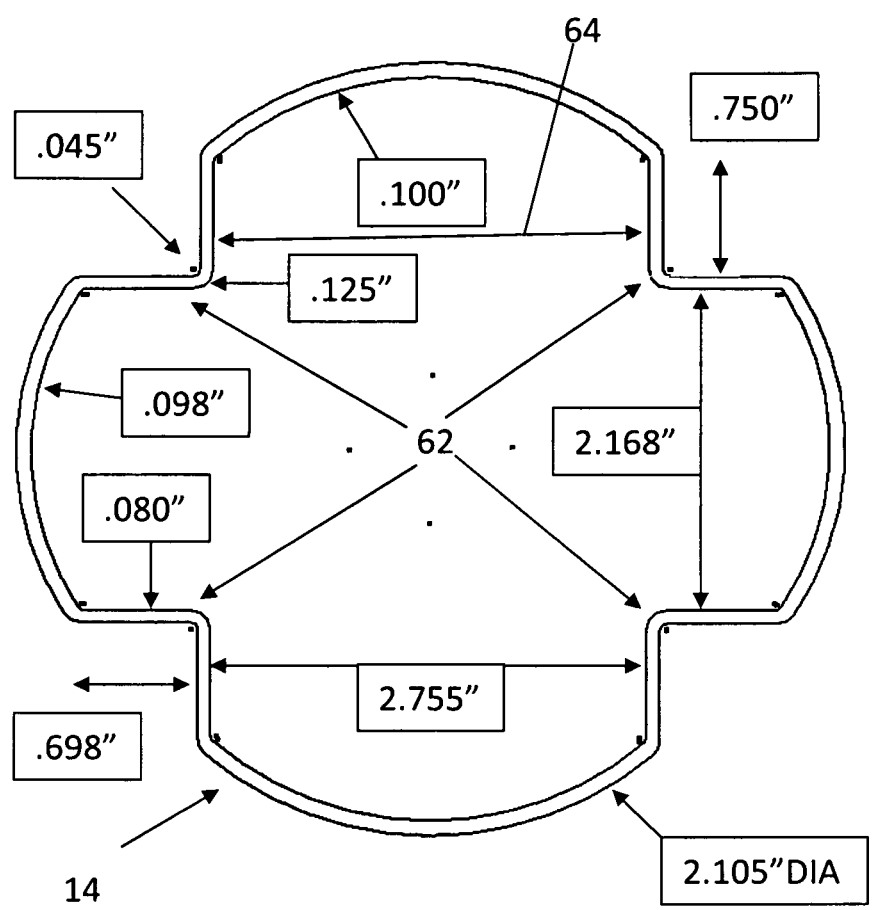

The housing 50 may have a slot 54 in which a bottom leg of the strut end piece 16 is disposed. See FIG. 97. The housing 50 may have four inward corners 62 defining two channels 64 in which bottom legs 44 of the strut end piece 16 are disposed. See FIG. 98.

The present invention pertains to a sleeve 10 for connecting with a chord 12 and a strut end piece 16 for a solar mirror frame support 18. The sleeve 10 comprises a main portion 20 having an opening 22 for receiving the chord 12. The sleeve 10 comprises a first fin 66 extending outward from the main portion 20 having opposing nonstraight (can also be nonparallel, allowing the fin to be locally thickened in the fastener area) surfaces 26. The sleeve 10 comprises a second fin 68 extending outward from the main portion 20 having opposing nonstraight surfaces 26 in spaced relation with the first fin 66, the strut end piece 16 connected to the first and second fin 66, 68. The first fin 66 and the second fin 68 may or may not be in parallel with each other. See FIG. 10a.

Figure 91:
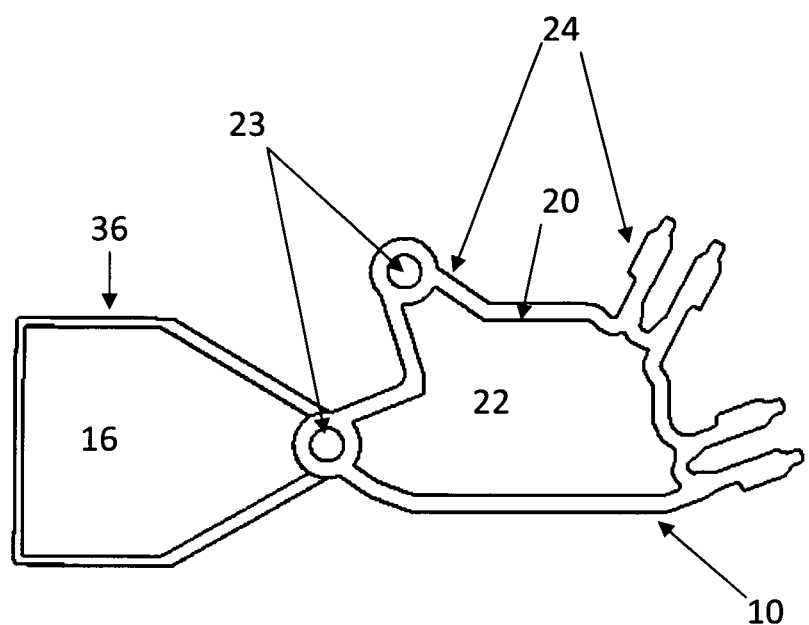
FIG. 91 shows a Knuckle Hinge Connector.
Figure 92:
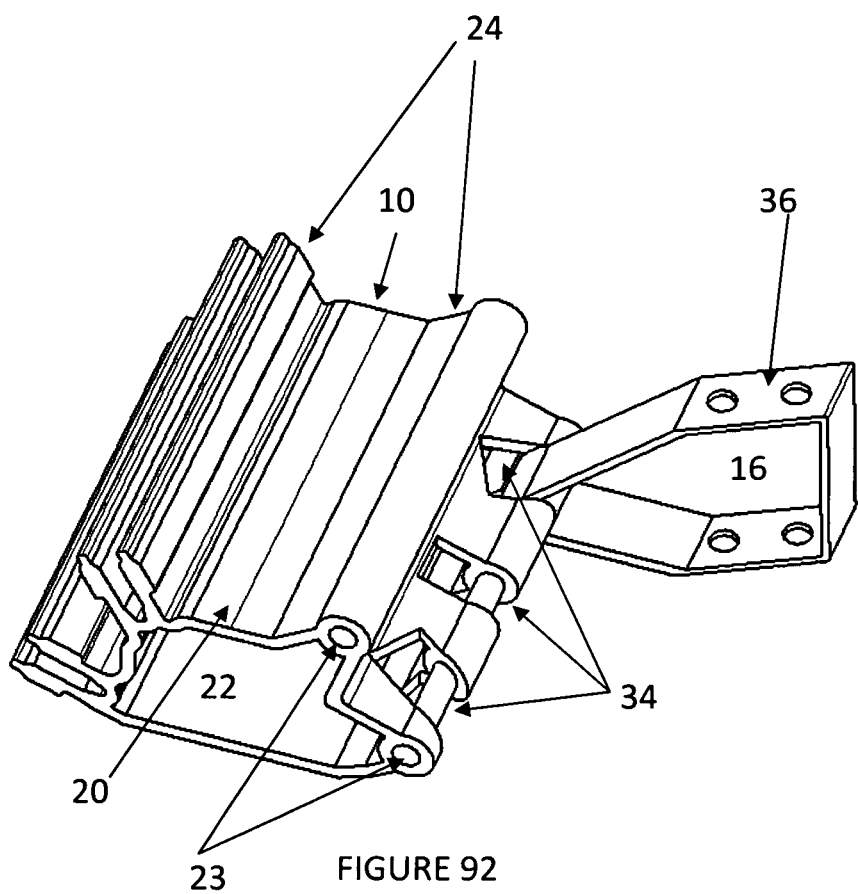
FIG. 92 shows a Knuckle Hinge Connector.

The present invention pertains to a sleeve 10 for connecting with a chord 12 and a strut end piece 16 for a solar mirror frame support 18. The sleeve 10 comprises a main portion 20 having an opening 22 for receiving the chord 12. The sleeve 10 comprises a fin 24 extending outward from the main portion 20, the fin 24 tip having an opening 23 through which a fastener is inserted to connect the strut end piece 16 to the fin 24. See FIGS. 91 and 92.

Each of the strut end pieces (SEPs) described herein are able to support between 1000-20000 pounds. Each of the sleeve 10 fins described herein is able to support between 1000-20000 pounds.

The present invention pertains to a method for connecting a sleeve 10 to a chord 12 and a strut end piece 16 for a solar mirror frame support 18. The method comprises placing a first strut end piece upper leg 38 extending from an engagement portion 36 which engages with the strut 14 and a second strut end piece upper leg 40 extending from the engagement portion 36 which engages with the strut 14 about a fin 24 extending outward from a main portion 20 of a sleeve 10 having an opening 22 for receiving the chord 12, the ends 42 of the first strut end piece upper leg 38 and the second strut end piece upper leg 40 curving outwards, the first and second strut end piece upper legs 38, 40 engaging with the fin 24 of the sleeve 10. There is the step of inserting a fastener through the fin 24 and the first and second strut end piece upper legs 38, 40 to attach the sleeve 10 to the strut 14.

In the operation of the invention, the following features are described.

Single fin 52 Sleeve 10
Guided Insertion Strut End Piece
Swage connection Strut End Connection
Angled "Knuckle" Hinge Connector
Additional Alternative Strut and Strut End Piece Designs
Single Pinned Truss Description:

The solar frame designs use a single "pivot" pin (fastener) to create the truss joints, which places the strut 14 assemblies (struts or strut+strut end pieces for those designs) into pure axial loading, without any bending moments. Trusses designed with multiple pins can lead to shorter effective strut lengths, but can induce bending moments ("secondary stresses" below) into the structure which may require additional material to resist the deformation. The space frame trusses designed contemplate the single pin connections in many areas to avoid this bending moment effect.

Because the strut 14 assemblies are arranged into a triangle, the parts can NOT "pivot". In the designs shown throughout this patent application, the connections are contemplated as single pin connections (whether the "standard" strut end piece fins to sleeve 10 fin 24 or the "knuckle" design which is 90 degrees removed from the "standard" or the "X strut" design which is attached to the strut 14 orthogonal to both of those; in all of these cases, the trusses use triangular members and cannot pivot. The designs could easily be modified with multiple fasteners to prevent "pivoting", with the requirement that bending moments be calculated and material and/or geometrical arrangement of the space frame be modified (perhaps some parts of some struts, sleeves, etc. . . . would need to be thickened to withstand bending moments and/or the basic geometry "tweaked").

From the Sixth Edition of "Structural Analysis" by R. C. Hibbeler pages 6 and 84 (published by Pearson/Prentice Hall, Upper Saddle River, N.J. 07458 ISBN 0-13-147089-2):

Page 6:

Trusses. When the span of a structure is required to be large and its depth is not an important criterion for design, a truss may be selected. Trusses consist of slender elements, usually arranged in triangular fashion. Planar trusses are composed of member that lie in the same plane and are frequently used for bridge and roof support, whereas space trusses have members extending in three dimensions and are suitable for derricks and towers.

Due to the geometric arrangement of its members, loads that cause the entire truss to bend are converted into tensile or compressive forces in the members. Because of this, one of the primary advantages of a truss, compared to a beam, is that it uses less material to support a given load. Also a truss is constructed from long and sender elements, which can be arranged in various ways to support a load. Most often it is economically feasible to use a truss to cover spans ranging from 30 ft to 400 ft, although trusses have been used on occasion for spans of greater lengths.

Page 84:

Assumptions for Design. To design both the members and the connections of a truss, it is first necessary to determine the force developed in each member when the truss is subjected to a given loading. In this regard, two important assumptions will be made in order to idealize the truss.

1. The members are joined together by smooth pins. In cases where bolted or welded joint connections are used, this assumption is generally satisfactory provided the center lines of the joining members are concurrent at a point. It should be realized, however, that the actual connections do give some rigidity to the joint and this in turn introduces bending of the of the connected members when the truss us subjected to a load. The bending stress developed in the members is called secondary stress, whereas the stress in the in the members of the idealized truss, having pin-connected joints, is called primary stress. A secondary stress analysis of a truss is seldom performed, although for some types of truss geometries these stresses may be large.

2. All loadings are applied at the joints. In most situations, such as for bridge and roof trusses, this assumption is true. Frequently, in the force analysis, the weight if the members is neglected, since the force supported by the members is large in comparison with their weight. If the weight is to be included in the analysis, it is generally satisfactory to apply it as a vertical force, half of its magnitude applied at each end of the member.

Because of these two assumptions, each truss member acts as an axial force member, and therefore the forces acting at the ends of the member must be directed along the axis of the member. If the force tends to elongate the member, it is tensile force, whereas if the force tends to shorten the member, it is important to state whether the force is tensile or compressive. Most often, compression members must be made thicker than tension members, because of the buckling or sudden instability that may occur in compression members.

Single fin 52 Sleeve 10

1. Single fin 52 allows the mating "Guided Insertion Strut End Piece" to be designed with flared fins. See FIGS. 84 and 85.
2. Curved (non-parallel) surface (or even stepped design) allows for easier insertion of Strut end piece 16 while maintaining both larger bearing surface area to reduce stresses and allowing for the mating Strut end piece 16 to have an easily extrudable tongue ratio (the wider central area allows a wider "base" of the Strut end piece 16 "tongue"). The metal content on the single fin 52 sleeve 10 is put exactly where needed for the extrusion process and part function.
3. Single fins 52 can result in lighter sleeves, enabling extrusion of these components on smaller, more commercially available extrusion press systems.
4. Single fins 52 result in smaller circle size of the sleeve 10, enabling extrusion of these components on smaller, more commercially available extrusion press systems.
5. The single fin 52 design (actually all of the various components of the sleeve 10, strut end pieces and struts) can be optimized for the particular load case in question (the base of the fin, bearing area of the fastener, fin tip and fin length can all be designed to create the optimal tradeoffs in extrudability, circle size, sleeve 10, strut end piece 16 and associated strut total weight, etc. . . .
6. The sleeve 10 can be designed as a single piece (including all fins) or broken into parts such that fin(s) can be extrudable separately and inserted/fastened to allow the larger sleeve 10 designs to be produced on smaller capacity extrusion systems (both wt/ft and circle size limitations restrictions can be improved using this method).

Guided Insertion Strut End Piece 16

Figure 86:
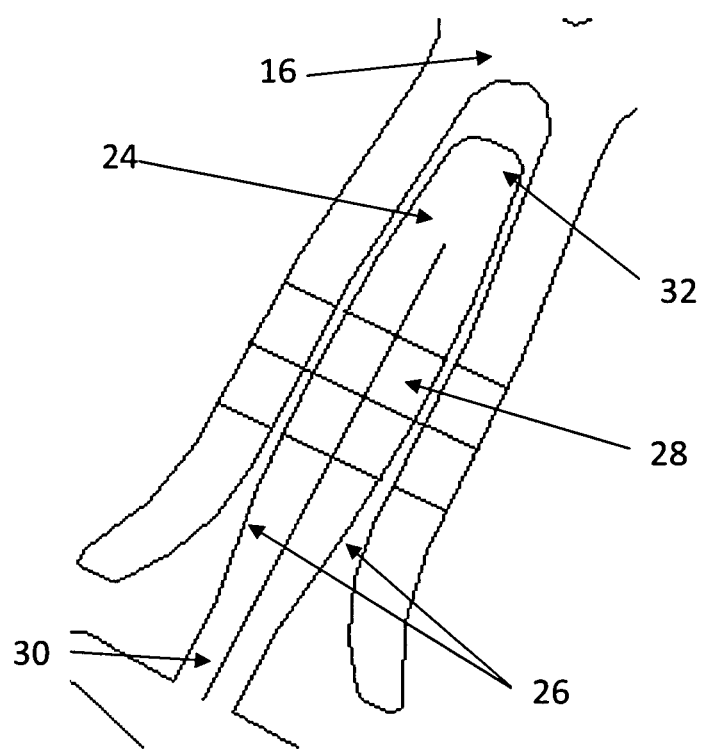
FIG. 86 shows a single fin sleeve with guided insertion Strut End Piece (SEP).
Figure 88:
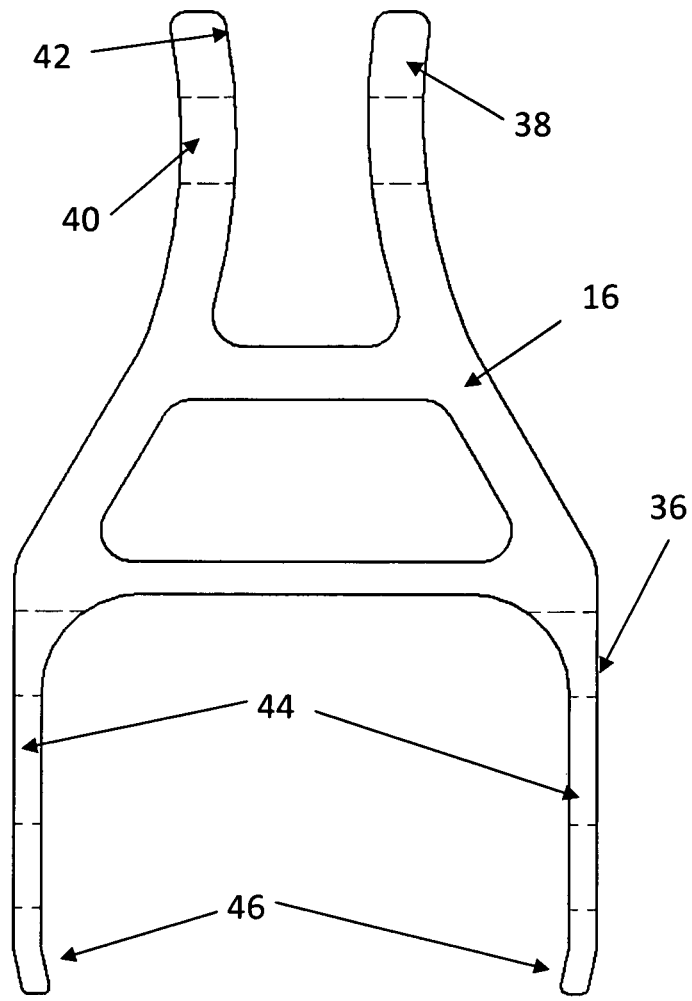
FIG. 88 shows a Guided Insertion SEP Variant (with load transfer curve)—3D.

1. The "Guided Insertion Strut End Piece" flared design of the fins which mate with the single fin 52 sleeve 10 enable the parts to be more easily guided onto the single fin 52 sleeve 10. This is advantageous for any assembly operation, but particularly important as the solar frame designs move toward longer and heavier struts (and strut assemblies including the struts and two associates strut end pieces). These longer, heavier parts aren't as easily manipulated and positioned as smaller pieces, often now requiring two hands or even two assemblers to handle them—easing the alignment of the strut end piece 16 fins onto the sleeve 10 is thus extremely advantageous. See FIGS. 86 and 87.
2. The flared design of the "Guided Insertion Strut End Piece" allows for a greatly improved extrusion tongue ratio. The extrusion tongue is the part of the die which forms the gap between extruded portions (in this case, between the flared fins). If the extrusion die is pictured, a portion of the die blocks the metal flow, creating the gap; if the area of blockage is too large—vs—the base of the die portion supporting the blockage, the die can run inconsistently and create extrusion problems and die breakage. The "tongue ratio" is the area of the tongue divided by the base dimension squared. The wider gap created by the curved or stepped single fin 52 sleeve 10 coupled with the flared design of the "Guided Insertion Strut End Piece" allows for greatly reduced tongue ratios.
3. The "legs" of the "Guided Insertion Strut End Piece" are angled inwards at the very tip, allowing easier insertion into the strut 14 for fabrication and assembly efficiency purposes.
4. The cross sectional design of the strut 14 can be optimized depending on the load carrying requirements.
5. The alternative design of strut end piece 16 efficiently transfers loads from the pin connecting it to the sleeve 10 fin to the pins connection the strut end piece 16 to the strut 14. The curve design shown greatly reduces the deformation and both equivalent and principal stress maximums; the curve transfers the loads to the lower legs (which connect to the strut 14) in a more "vertical" direction (as pictured). By having the compressive or tensile forces less "offset" between the sleeve 10 fastener and the strut fasteners, there is less bending moment within the strut end piece 16. This design is preferred over the "basic" "Guided Insertion Strut End Piece" if the tongue ratio for the particular design is acceptable (this design has a slightly larger tongue area). See FIG. 88.
6. The strut end piece 16 designs can include increased thickness at any points required by the design (one modification shows a widened portion where the fastener connects the strut end piece 16 to the sleeve 10 fin— allowing lower bearing stresses). By putting the extruded metal only exactly where required by the forces (to reduce bearing stresses in this case), the overall weight of the strut end piece 16 is minimized. See FIG. 89.

Swage Connection Strut End Connection

1. The strut end piece 16 to strut 14 connections center around a strut assembly composed of a strut 14 and two strut end pieces. The use of the strut end pieces enables the compressive or tensile loads of the strut 14 to be transferred efficiently to the sleeves 10 by using the intermediate strut end piece 16 (various designs and variants of struts and strut end pieces are shown throughout this application). Most of these designs use fasteners (pins, rivets, bolts or other fasteners) to connect the strut end pieces to the strut 14. The "Swage connection" is an alternative fastening means.
2. The strut end piece 16 can be die cast, extruded or produced by other means.
3. While additional design work and testing will be needed to confirm tensile and compressive load and to help determine the optimal process (extrude/cut/swage/age or extrude/age/cut/swage), the use of the swaging system may well both reduce the # of fasteners, speed assembly of the strut assembly system and provide exceptional strength and rigidity.

One potential strut end piece 16 to use with the swage connection system could be as shown at the right, with the "swaging" operation "pushing" the strut extrusion into the indentations and hollows of the strut end piece 16 to "lock" the strut 14 to the strut end piece 16. See FIG. 90.

Figure 93:
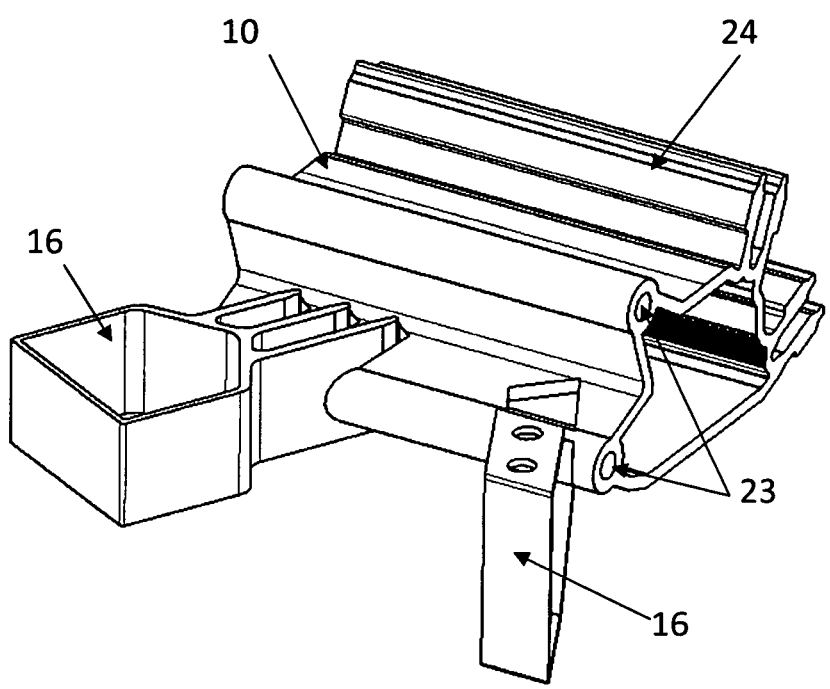
FIG. 93 shows a Knuckle Hinge Connector—3D.
Figure 94:
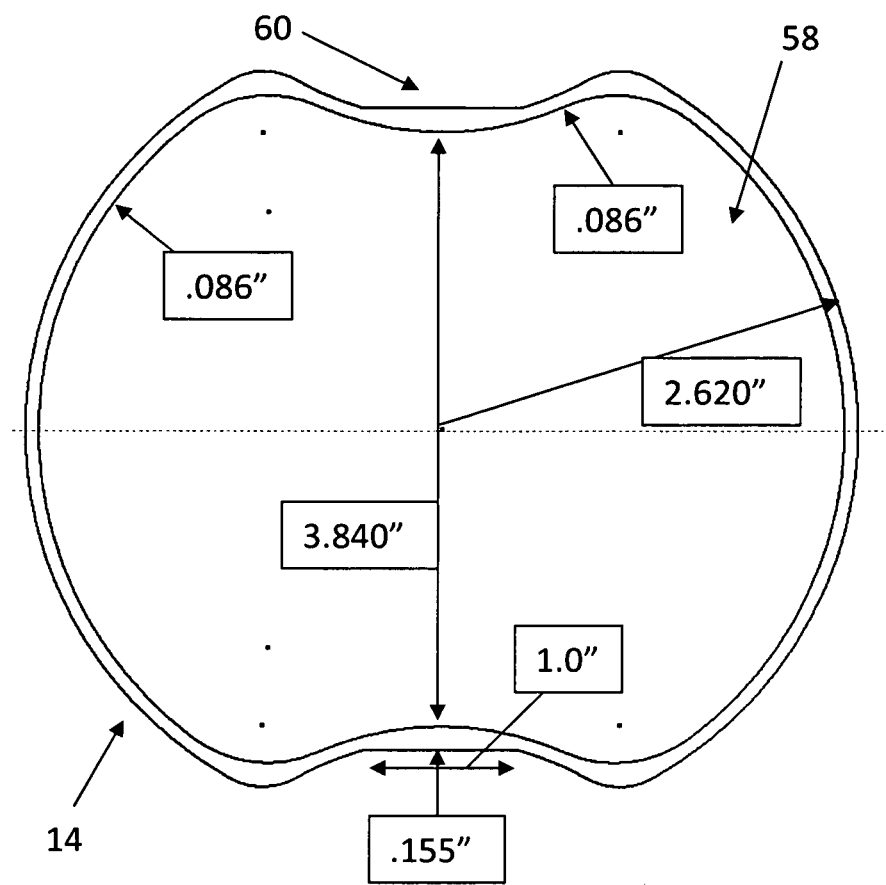
FIG. 94 shows an Apple Strut.

Angled "Knuckle" Hinge Connector
1. The standard strut assembly uses individual fasteners for each of the strut end piece 16 to sleeve 10 fin 24 connections. The "Knuckle" design is an alternative approach that can utilize a single pin to join multiple strut end pieces with extruded and/or fabricated connection holes to a common fin. The design may allow some load parameter conditions to be solved with lighter weight components, as the bearing surfaces 26 that mate with the "pin" are greatly enhanced—vs—other designs.
2. The sleeve 10 has an extruded and/or fabricated hole through each of the "fins", through which a fastener (noted as a pin, but can be other kinds of fasteners as well) is inserted into a single or multiple strut end pieces. The "fins" are slotted (milled or stacked saw blades) to create the properly angled slot(S) for the straight or miter cut strut end piece 16 to be inserted.
3. The $3^{rd}$ example shows two different types of strut end pieces that could be used for the strut end piece 16 to sleeve 10 fin 24 connection; this creates multiple shear points for the strut end piece 16 to sleeve 10 fin 24 connection and will thus enable smaller diameter pins to be used. See FIGS. 91, 92 and 93.

Additional Alternative Strut and Strut End Piece Designs

"Apple" Strut
1. The "Apple" strut provides advantages to a simple tubular strut or one with integrated flats. The "tips" of the "Apple" create both a balanced Ix/Iy cross sectional design (minimizes weight while providing "balanced" compressive buckling performance) and a thickened wall (stronger) area so that the strut can be extruded with thinner walls but run out of the extrusion press onto the stronger "tips" to prevent denting while still at the elevated extrusion temperature. By dropping the average wall thickness below what extruders would desire to prevent denting, the overall shape OD can be made larger and the overall weight/ft of the strut reduced while still maintaining the compressive buckling parameters and thickened portion to attach to the strut end pieces for additional bearing strength.
2. The smaller dimension of the strut in the "Apple" design allows for a smaller strut end piece 16 outside dimension. This is ideal as the forces transfer from the sleeve 10 fin 24 through the strut end piece end fins, and through the strut end piece legs to the actual strut in more of a straight line, reducing deformation and excess loads due to bending moments within the strut end piece profile that occur when the strut end piece fins and legs are less aligned. Locally thickening the area where the fasteners connect the Apple strut to the SEP keeps the Ix and Iy balanced and reduces bearing stresses on the fasteners and strut material.
3. Note that for this and many other strut end pieces shown, there are two fasteners (4 holes in both the strut and strut end piece 16) shown connecting the strut and strut end piece 16. These could be filled with pins or other fasteners (either two extending through both sides of the strut 14 or 4 separate ones (blind rivets for example). Alternative designs, such as the "Box Strut" may not require the $2^{nd}$ through pin (or $3^{rd}$ & $4^{th}$ blind rivets)—besides bearing strength and block shear strength capabilities, these are included to be CERTAIN that the strut end piece 16 can't "cock" in the strut 14 during compressive loading; alternate designs could have extrusion features (either simple protrusions or the "box" rectangles or similar features which keep the strut end piece 16 axially aligned with the strut 14 despite a single pivot point).

Figure 96:
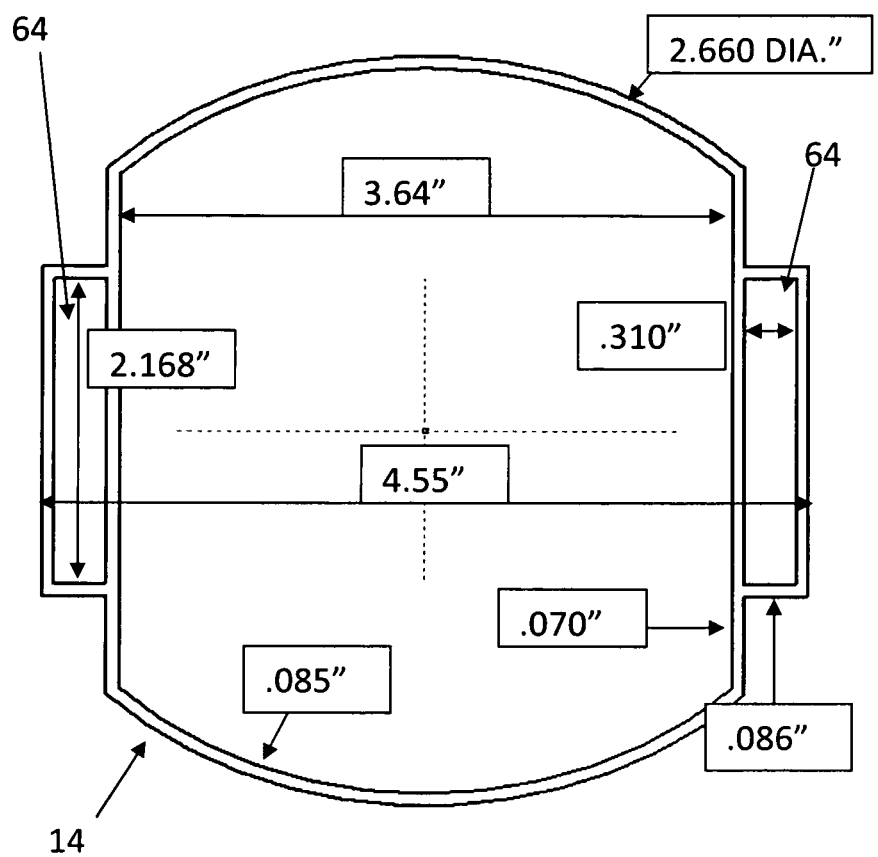
FIG. 96 shows a Box Strut.

"Box Strut"
1. The "Box Strut" utilizes two extruded slots into which the legs of the strut end piece 16 fits. By doing so, there are two additional shear planes available in the fastener, reducing the required fastener area by ½ and additional surface areas to resist net tensile, block shear and bearing stresses.
2. The double walls on the left and right also allow the strut 14 to be designed narrower (although likely slightly heavier overall). This narrower design leads to a narrower strut end piece 16 that fits into the slots, which leads to a more "axially aligned" strut end piece fin to leg design, reducing bending stresses and deformation in the strut end piece 16.
3. As noted under item 3. in the "Apple" strut discussion, this type or design or variants of it could use the extruded strut features to prevent the strut end piece 16 from rotating in the strut 14 under compression, reducing the number of holes and fasteners required by ½. The figures shown at the right still have the full number of holes/fasteners connecting the strut end piece 16 to the strut 14, but if there were ½ the number, if the strut end piece 16 were slipped into the "box", it could not rotate under compressive loading. See FIGS. 96 and 97.

Figure 99:
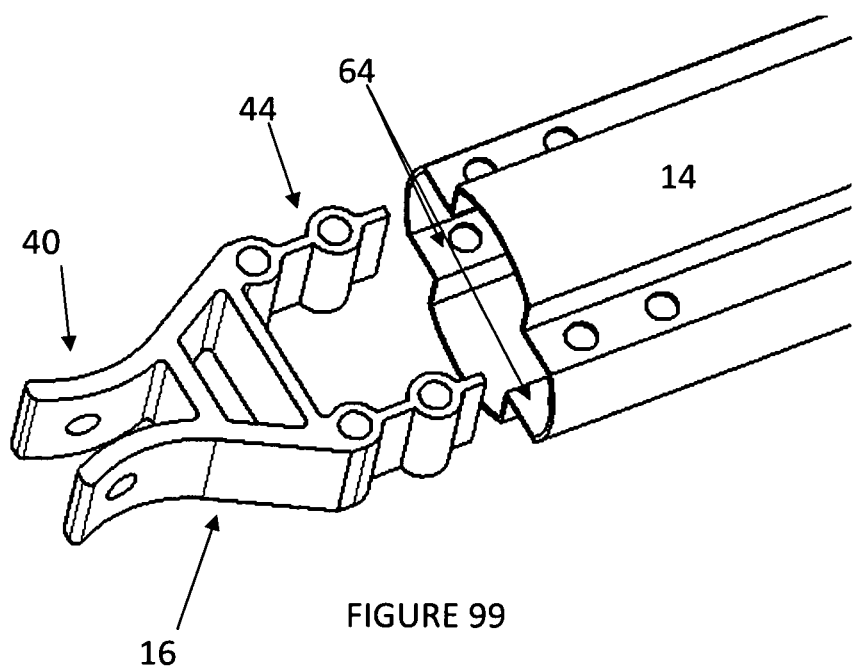
Figure 100:
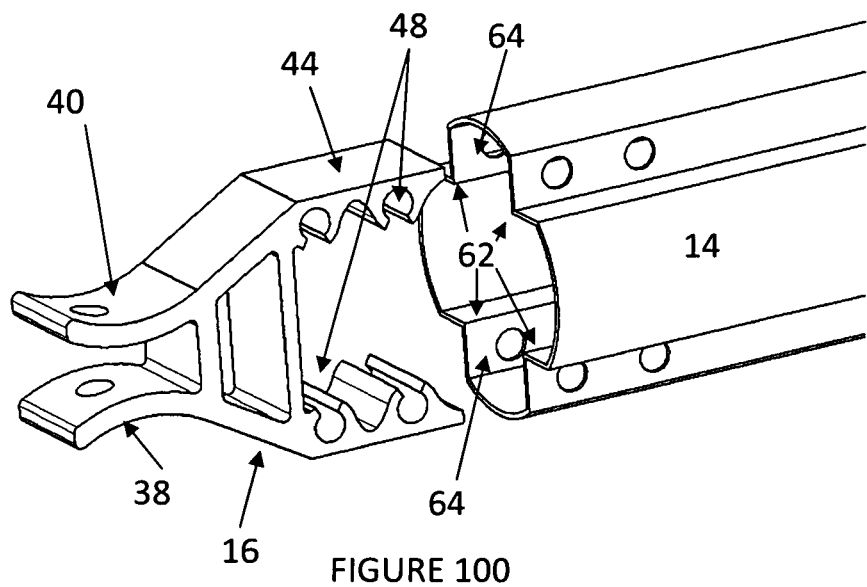
Figure 101:
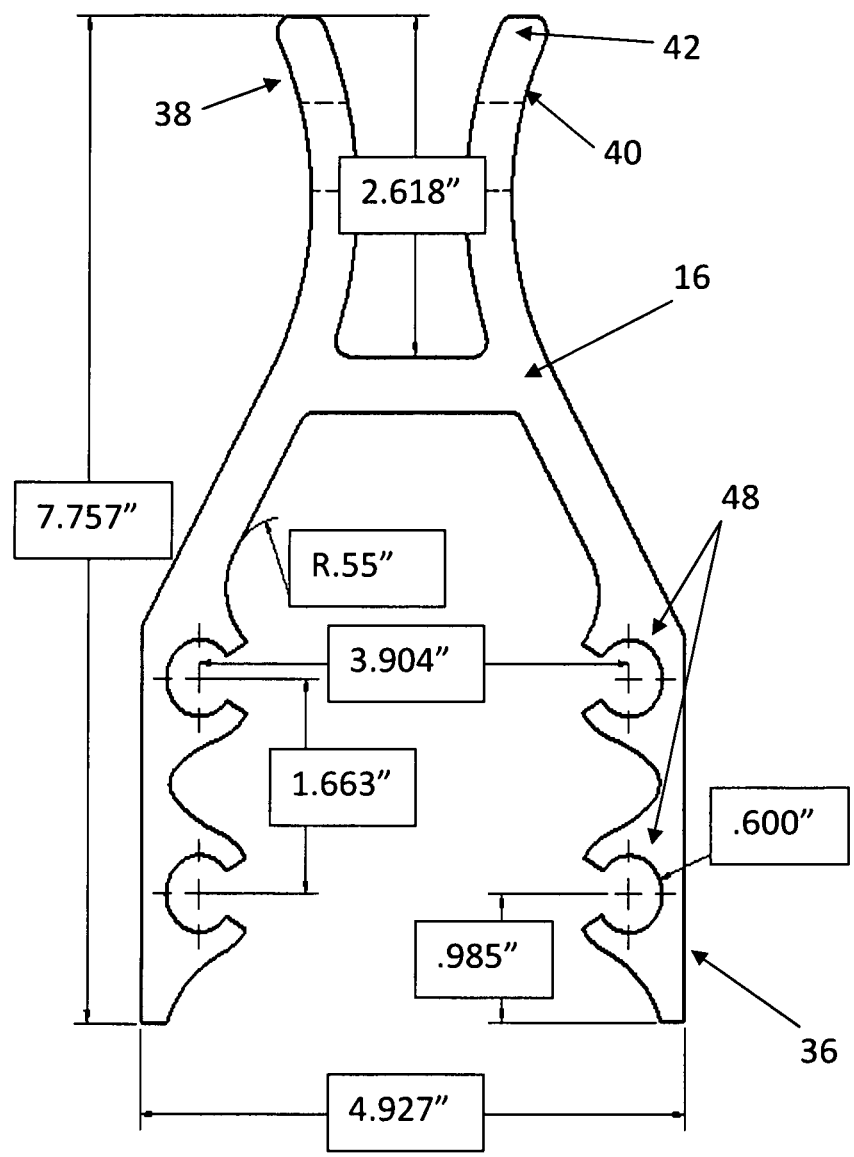
Figure 102:
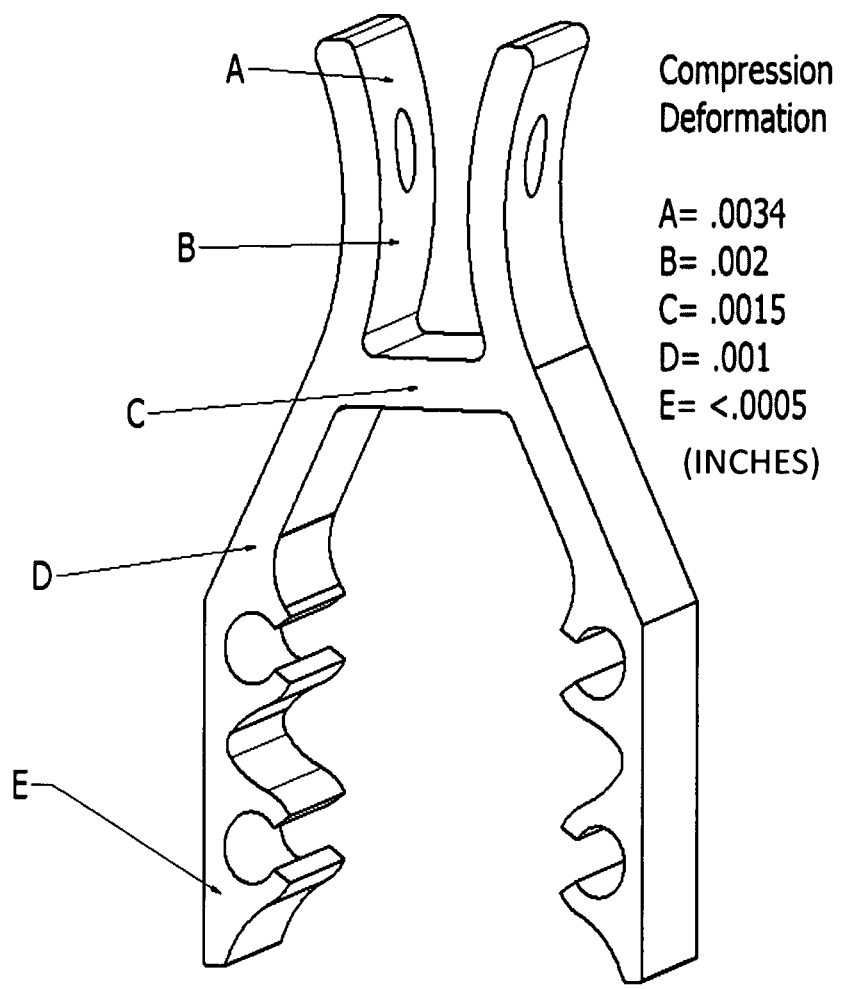
Figure 103:
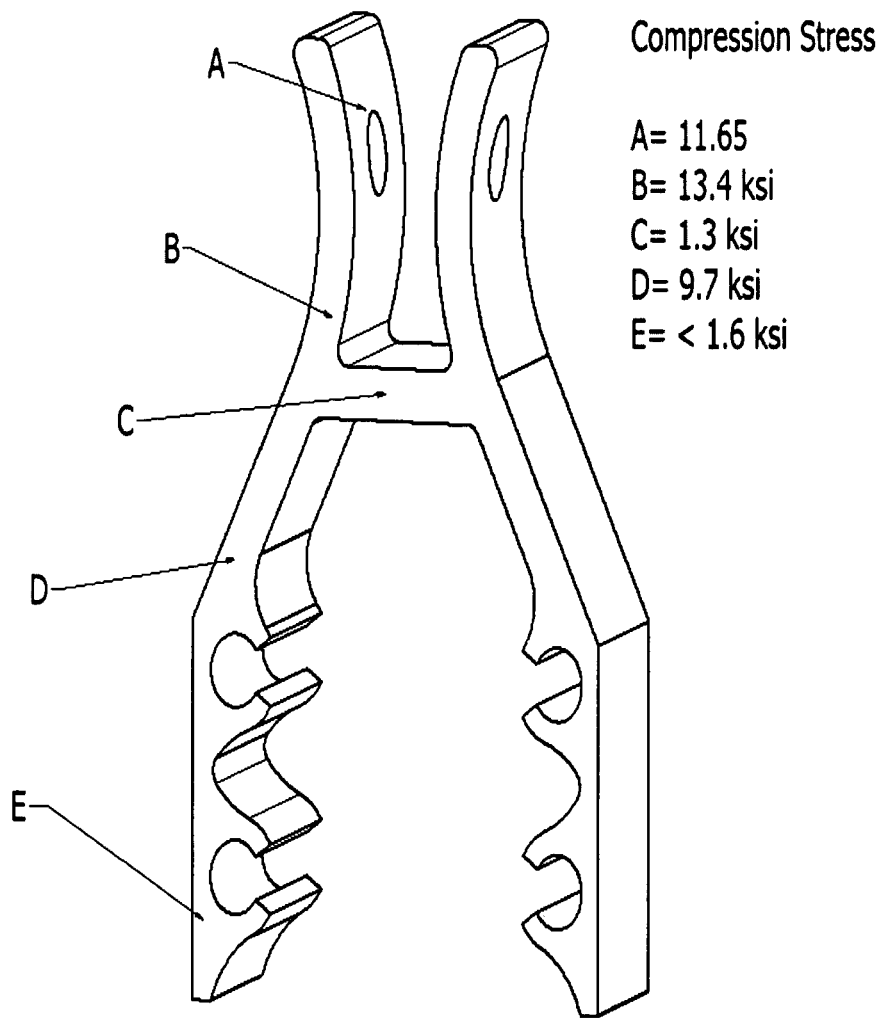

"X Strut"
1. The "X Strut" utilizes an entirely different connection between the strut end pieces and the strut 14. In most of the other designs from the prior patent or discussed below, the strut 14 to strut end piece fastener is inserted through the strut leg at a right angle to the extrusion direction (see the 2 holes on the top leg and 2 holes on the bottom leg under #3. of the "Box Strut" on the previous page as an example). The "X Strut" uses holes or screw bosses 48 extruded and/or fabricated into the strut end piece 16 legs in the direction of extrusion, and then "mates" these with fabricated holes in the strut 14. See FIG. 98.
2. As discussed under the "Knuckle" design, this type of design can provide additional design flexibility to create more bearing strength, block shear strength or net tensile strength as required by the design parameters for the part in question.
3. Strut End Pieces with extruded and/or fabricated screw bosses 48 are shown in FIGS. 99 and 100.
4. By constraining the strut end piece legs in this manner inside the struts, the strut end piece legs aren't free to deflect along the pins when in tension or compression, which greatly reduces the internal bending stresses on the strut end piece 16, which would allow a design of strut end piece 16 extruded as a solid—vs—the hollow with the central horizontal leg shown stabilizing the strut end piece 16 legs. FEA analysis shows that the stresses and deformations are greatly reduced with this design, allowing for weight to be designed out of the strut end pieces. See FIGS. 101, 102 and 103.

Smashed Strut end Concept:

This concept is similar to how many steel trusses are produced—a simple tubular extrusion is flattened, and then connected at the flat area. See FIG. 104.

Formed Strut Concept:

After extrusion, the end of the strut 14 is formed and slotted, with the fastener holes pierced, drilled or otherwise created. This design would lead to a direct strut 14 to sleeve 10 connection, reducing the dimensions of the interface so that the strut 14 to sleeve 10 connection is more "compact", leading to a more extrudable sleeve 10 (lighter weight and smaller circle size, so that it can be extruded on smaller extrusion presses. See FIG. 105.

Slotted Strut Concept:

After extrusion, the end of the strut 14 is slotted, with the fastener holes pierced, drilled or otherwise created. This design would lead to a direct strut 14 to sleeve 10 connection. With very small diameter struts, it is possible that this connection could be simply the slotted strut slid over a single fin 52 of the sleeve 10 and fastened. With larger diameters, or higher stresses, this could lead to fastener bending issues. In this case, a strut spacer 56 could be utilized, slid into the end of the strut 14, perhaps even pierced and slotted at the same time, with the strut spacer 56 providing support for the pin much closer to the sleeve 10 fin 24 connection and possibly additional fasteners spreading the loads. See FIG. 106.

DETAILED DISCUSSION

Several geometries have been developed to provide support of the parabolic mirrors—for the sake of explanation, these are called "Series Three" and "Series Five" (with the Series Three having three main triangles as viewed from the end and Series Five having five main triangles as viewed from the end). The Series Three solar frame is configured as three triangles viewed from the end. The design uses fewer, but longer and heavier struts, than the Series Five frame. This design was fine-tuned through Structural Engineering analysis. The Series Five solar frame is configured as five triangles viewed from the end, using more, but shorter and lighter struts, than the Series Three frame. Multiple iterations of FEA and extrusion profiles led to the optimized design.

FIG. 1a shows Series 3 and 5 end views and Series 5 angled view showing the overall configuration of a solar frame.

The Series 5 design shown above in FIG. 0 is an older "geometry". Since that time, focus has begun on more of a traditional space frame design where all of the struts come in to a common "unified hub" (in FIG. 0 above you can see how every other "hub" uses different struts). With the Strut end piece 16 and Sleeve 10 designs, the member (struts)/forces are able to be brought together into very small physical spaces. Bringing all of the forces into a "unified hub" reduces any bending moments, improving the efficiency of the space frame in terms of load carrying capacity and deflection. When the Series 5 configuration was redesigned to use a "unified hub", there were improvements in both deflection and individual member loads, as the bending moments were relatively low due to short strut lengths and short connections between the sleeves along the chord 12.

Figure 1B:
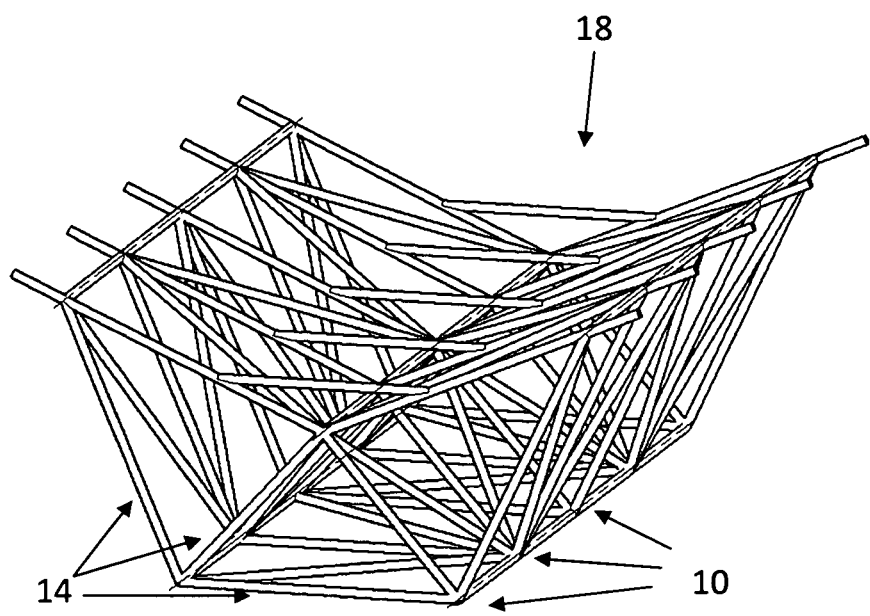
FIG. 1b shows WES series 3 with Unified hubs.

FIG. 1b shows a Series Three Design with a "Unified hub".

Figure 2:
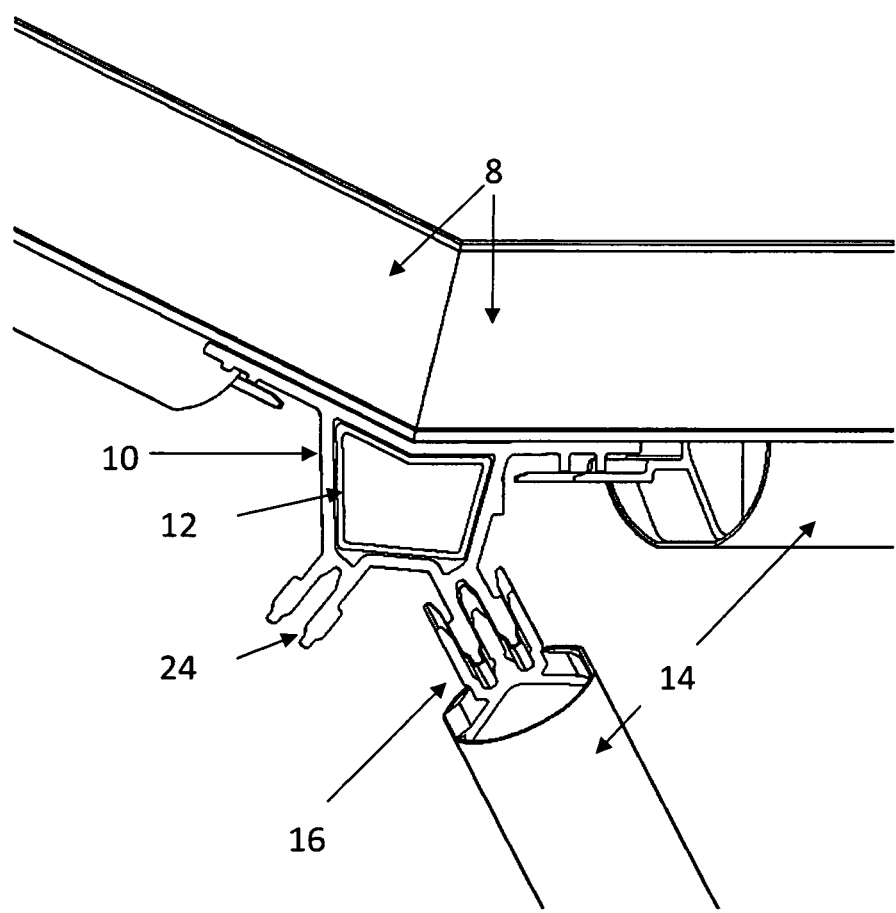
FIG. 2 shows prior patent component names.

FIG. 2 shows named components of the prior patent application Series 5 multifinned sleeve 10 and strut end piece 16 design—useful to refer to re: nomenclature of the rest of this document. Note that this figure also shows the multiple parallel fins of the sleeve 10 and/or strut end piece 16. Depending on load characteristics and fasteners, the number of fins on the sleeve 10 or strut end piece 16 can be modified; for example, the single fin 52 sleeve 10, with one or more fins on the mating strut end piece 16, is discussed below.

Patent application 61/190,573 contained design elements applicable to either design, but the inventions herein are made after further development yielded opportunities to improve design, fabrication, assembly and frame performance functionality for frames capable of handling the same or higher loads than those typically used for the cases used as examples in patent application 61/190/573. Further development on the Series Three alternative design (fewer but larger and heavier struts) could lead to compressive loads approaching 12,000 lbs. Examples of 1,000, 10,000 and 20,000 lb loads are shown below, herein.

When considering the higher load requirements, it became less efficient to transfer the loads from the strut end piece fins to the sleeve 10 fins via many multiple strut end piece pin shear points, accomplished through multiple fins on each component. Staying with smaller fasteners (pins, rivets, bolts, etc. . . . ) by taking advantage of multiple shear points was only advantageous to the extent that fastener sizes (rivets for example) capable of being set by hand held pneumatic rivet squeezer could be used; for the larger load requirements, unless many, many multiple fins on the strut end piece 16 and sleeve 10 are used, the rivet diameter/material is such that hand held pneumatic rivet squeezers do not have sufficient capacity.

Alternative designs were developed, as will be explained below:

The Following Additional Designs are Submitted Herein (Explanations Follow):

Single fin 52 sleeve 10 (design concepts shown include FEA results for test case)

Guided insertion strut end piece 16 (design concepts shown include FEA results for test case)

Swage connection strut end connection

Angled "Knuckle" hinge connector and alternative multi-finned strut end piece 16/knuckle concept Additional alternative strut and strut end piece 16 designs Single Fin 52 Sleeve 10

As higher design loads were contemplated, and it became impossible to use rivet diameters capable of being set with hand-held pneumatic squeeze riveters, larger fastener diameters were considered, which further increased the fin sizes on both the sleeves and the strut end pieces (due to the need to have at least 1.5, and preferable 2.0× without downgrading calc's) for the hole center-to part edge distance (from the Aluminum Design Manual). As larger fasteners were designed, the use of multiple fin designs became less ideal, as the extrusion "tongue" ratio (area of the extrusion die "tongue" divided by the base^2) became larger than was ideally extrudable. The "single fin sleeve" was developed, with dual fins, more widely spaced, on the strut end piece 16 used.

Figure 4:
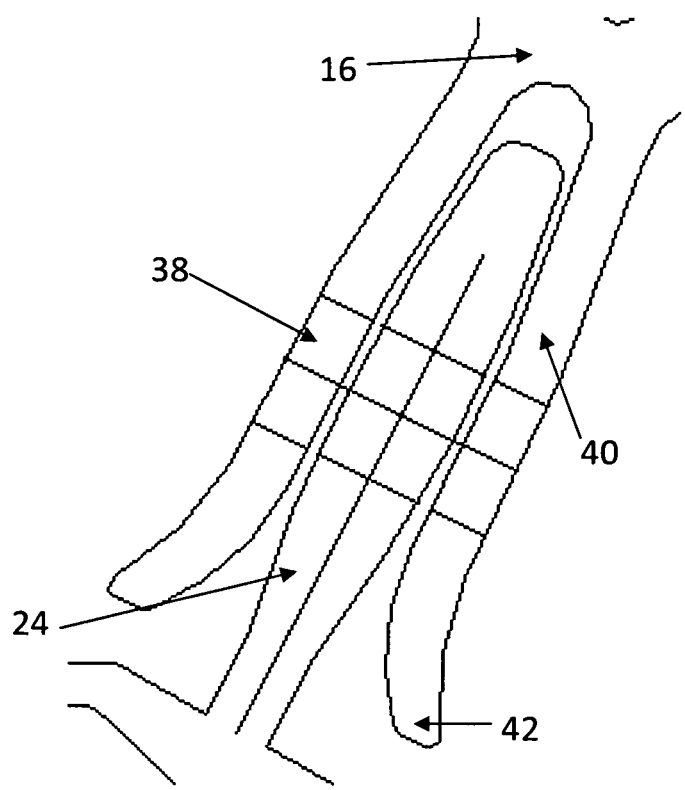
FIG. 4 shows a single fin sleeve with guided insertion SEP (abbreviation for "Strut End Piece").

The single fins 52 can be simple constant thickness, stepped or curved (as shown in FIG. 4) (please note that the "stepped" variety will be shown later in the "Guided Insertion" description). The purpose of having either a stepped or curved design is to allow the mating strut end piece 16, with multiple fins, to have an ideal extrusion "tongue ratio"—the step or the curve adds additional material to the sleeve 10 fin(s) which is NOT needed for block shear or net tensile strength on the sleeve 10 fin(s) (but does improve bearing stress capacities), but allows a larger base/gap on the mating strut end piece 16 (see FIG. 4) In addition, the larger thickness creates more bearing area for the more highly loaded pins (particularly where higher strength alloy pins are used, leading to smaller diameters and thus smaller hole-center-to-edge distances. The thickened center portion of the single fin 52 (and corresponding designs on other parts) thus provides both improved bearing area on the fin and a better extrusion ratio on the mating dual strut end piece fins—the WES design uses the characteristics of the extrusion process to place metal only where needed for the function, reducing weight while meeting the part requirement(s).

The figures herein throughout show sleeves with various designs of chords (some D-shaped, some tubular, etc. . . . )—the "Single Fin Sleeve" and "Guided Insertion Strut End Piece" and other alternative strut end piece 16 design concepts can be applied around any logical center chord 12 shape.

Most of the following designs show the use of non-parallel surfaces 26, to more efficiently use metal where needed and to help to guide the assembly of the structure.

Figure 3A:
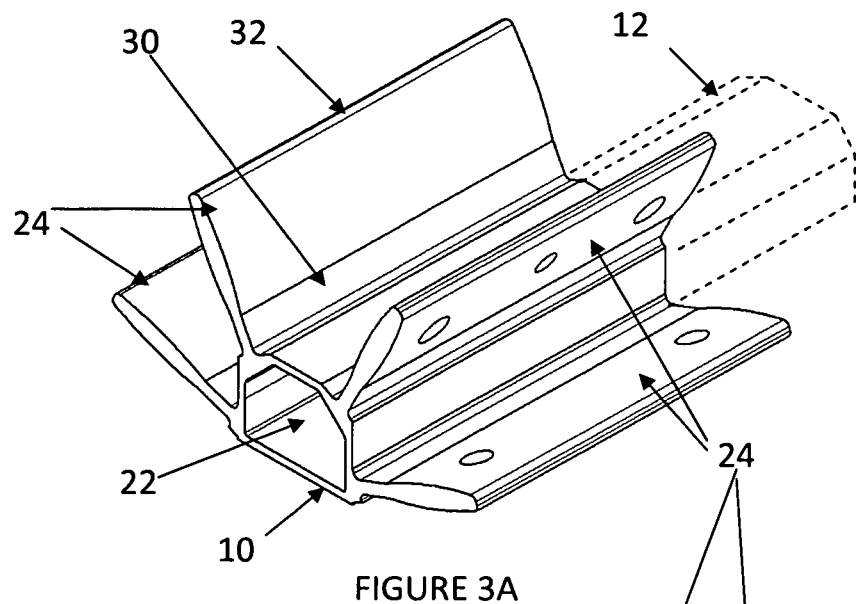
FIGS. 3a and 3b show a single fin sleeve design.
Figure 3B:
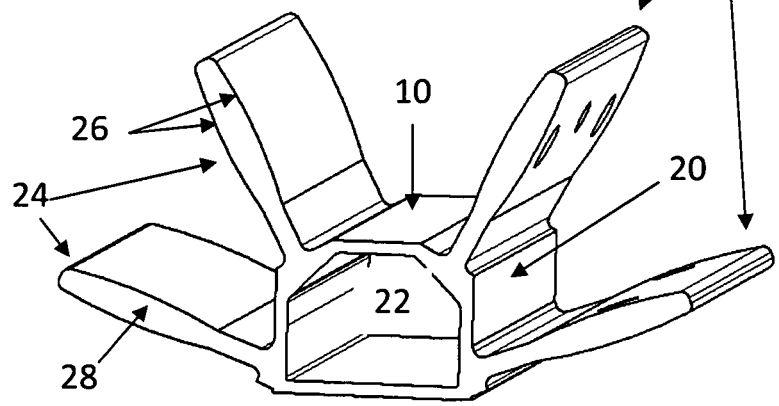

FIGS. 3*a* and 3*b* show single fin 52 sleeve 10 design graphics (single fin 52 refers to a single sleeve 10 fin vs. possible multiple sleeve 10 fins for each connection to a strut end piece 16).

FIG. 4 shows how the curved (could be stepped) single sleeve 10 fin 24 (lower left) allows for a wider "gap" so that the strut end piece fin (top right) can have adequate extrusion tongue ratio to optimize extrusion die design and extrusion characteristics.

Figure 5:
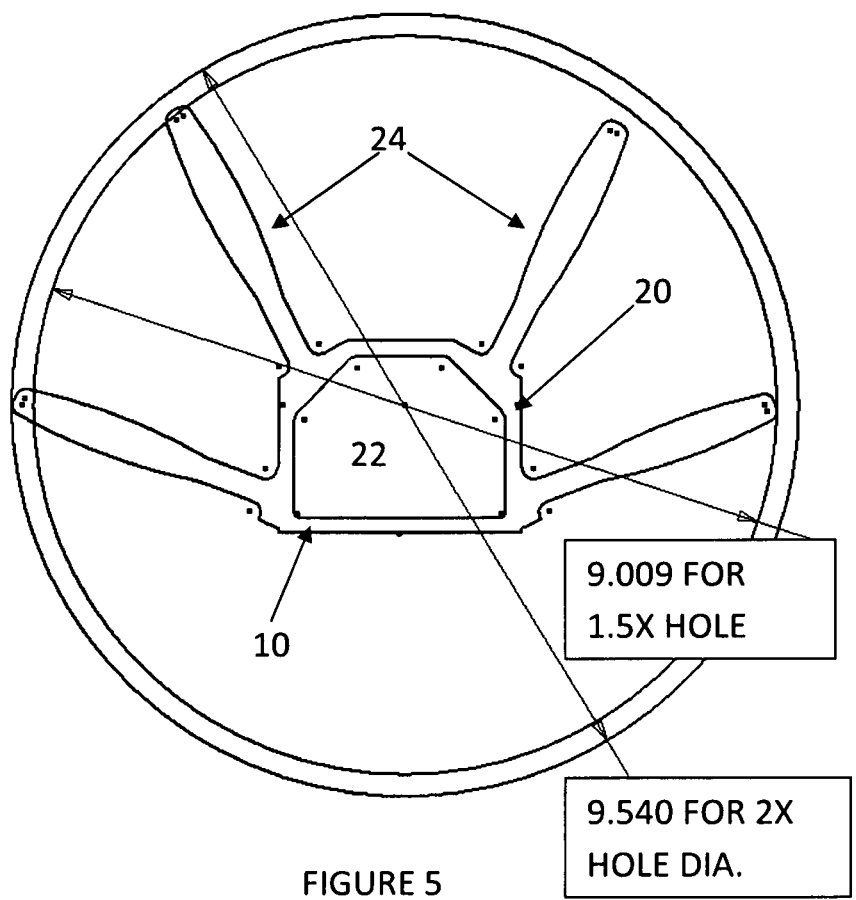
FIG. 5 shows the circle size for single fin design.

FIG. 5 shows how despite being designed for a 10,000+ lb load, the single fin 52 design is still extrudable via a 10" diameter press. With a 2.0× hole diameter hole-to-part-edge, it requires a 9.54" circle size (left part of the graphic) while for a 1.5× it requires just over a 9" circle size.

Figure 6:
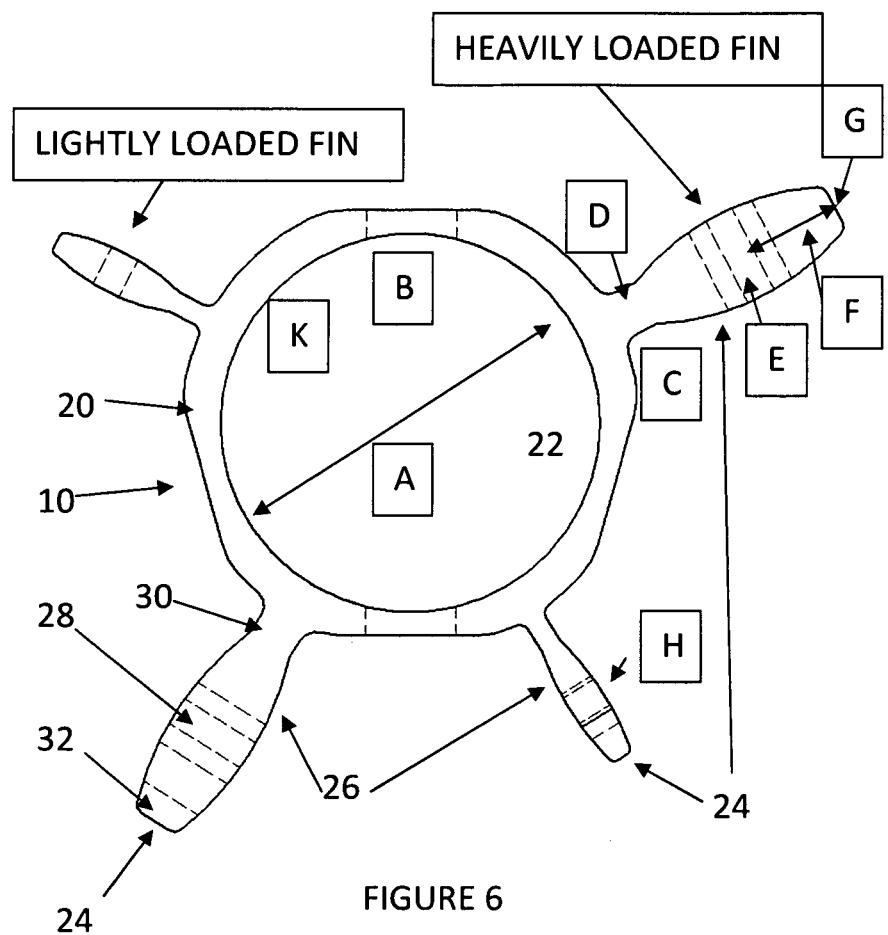
FIG. 6 shows a single fin sleeve designed for tubular chord/strut.

FIG. 6 shows an example of a Single fin 52 Sleeve 10 designed to fit over a tubular strut with outside diameter "A". Note that this particular example has four single fins 52, each designed to withstand different loading from struts/strut end piece assemblies.

Figure 7:
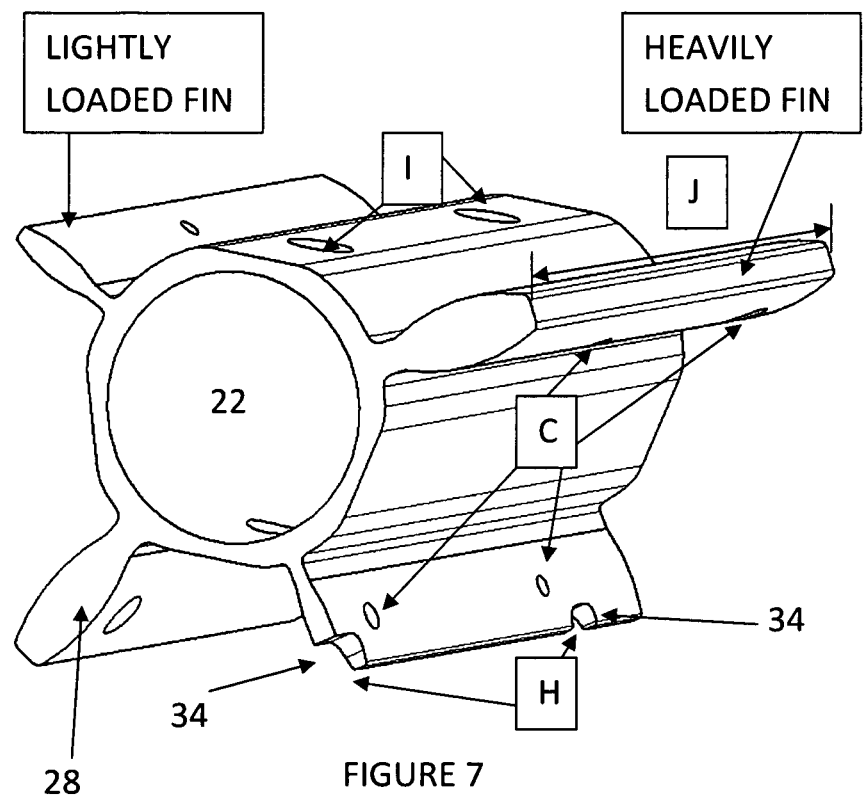
FIG. 7 shows a single fin sleeve designed for tubular chord/strut—3D view.

FIG. 7 shows an example of a Single Fin Sleeve 10 designed to fit over a tubular strut with outside diameter "A" (FIG. 6). Note that this particular example has four single fins, each designed to withstand different loading from struts/strut end piece assemblies.

Figure 8:
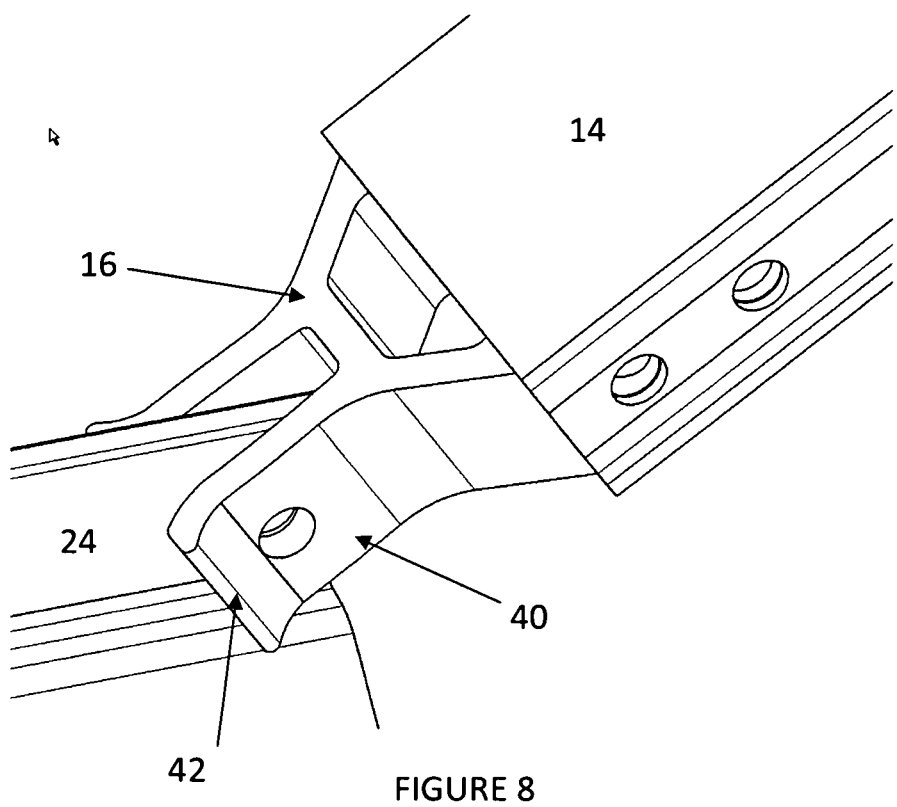
FIG. 8 shows a single fin sleeve, SEP and strut assembly 3D.

FIG. 8 shows a 3 dimensional example of a Single fin 52 Sleeve 10 with the strut end piece 16 inside the strut 14 and over the single fin 52.

A. The chords that run the length of the solar fit inside the sleeves (single fin 52 sleeve 10 shown). The example shows a simple circular opening 22 in the sleeve 10, presumably to fit around a simple tubular chord 12 (although the chord 12 could have other elements, such as flattened portions). The "ID" of the sleeve 10 could actually be shown as customized for a non-tubular shape (other graphics in the patent application show a "D" or other shape).

B. The wall of the sleeve 10 is sized both to handle the fasteners that connect the sleeve 10 to the chord 12 and to withstand the various loads placed onto the fins by the struts or strut end pieces (various combinations of tensile and compressive force). The various dimensions of the sleeve 10 can be calculated and verified through FEA modeling different loading conditions.

C. The fastener diameter connecting the strut end piece 16 or strut to the sleeve 10 fin 24 is sized to have acceptable shear stress on the fastener, given the fastener material, bearing stress on the fin 24 material, tensile stress on the net area of the fin 24 and block shear on the fin end. These fastener locations are also called out on various included graphics.

D. The base of the fin 24 is sized so that the maximum tensile or compressive loads that the fin 24 is subjected through from a combination of struts and strut end pieces allow the stresses on the fin 24 material to fall at or below allowable stresses, taking appropriate safety factors into account.

E. The thickness of the sleeve 10 fin 24 at the fastener location connecting the strut end piece 16 or strut 14 to the sleeve 10 fin 24 is sized to have acceptable shear stress on the fastener, given the fastener material, bearing stress on the fin 24 material, tensile stress on the net area of the fin 24 and block shear on the fin 24 end. In many cases, bearing stresses drive larger diameters and fin 24 width at this point.

F. Per the Aluminum Design Manual, the hole center to edge distance is a minimum of 1.5× hole diameter, although if it is between 1.5 and 2.0× the hole diameter the allowable bearing stresses are reduced by an appropriate formulaic calculation.

G. The thickness at the tip of the sleeve 10 fin 24 is generally sized such that the material stresses from block shear due to tension from the strut 14 or strut end piece 16 are acceptable.

H. The notch shown (which can be seen better in FIG. 7) is there so that when the particular design which uses a strut 14 and strut end piece 16, where the strut end piece 16 of a certain cut length is fastened to the sleeve 10 fin 24 at an angle, the cut length of the strut end piece 16 would interfere with the sleeve 10 fin 24 material, and the unnecessary sleeve 10 fin 24 material is thus removed to avoid the interference.

I. These holes show examples of locations of the fasteners that fasten the sleeve 10 onto the chord 12 to prevent axial movement under load.

J. The cut length of the sleeve 10 extrusion is such that all necessary connecting struts or strut end pieces can be fastened appropriately with the necessary hole center to edge distance (1.5–2.0× hole diameter as discussed earlier (affects allowable bearing stress calculations). The "lines of force" from the struts at the design angles between the struts and the chord 12, combined with the physical dimensions of the sleeve 10 fins and the hole center to edge distance for the strut 14 or strut end piece 16 to fin 24 sleeve 10 fastening point define the cut length of the sleeve 10.

Figure 9:
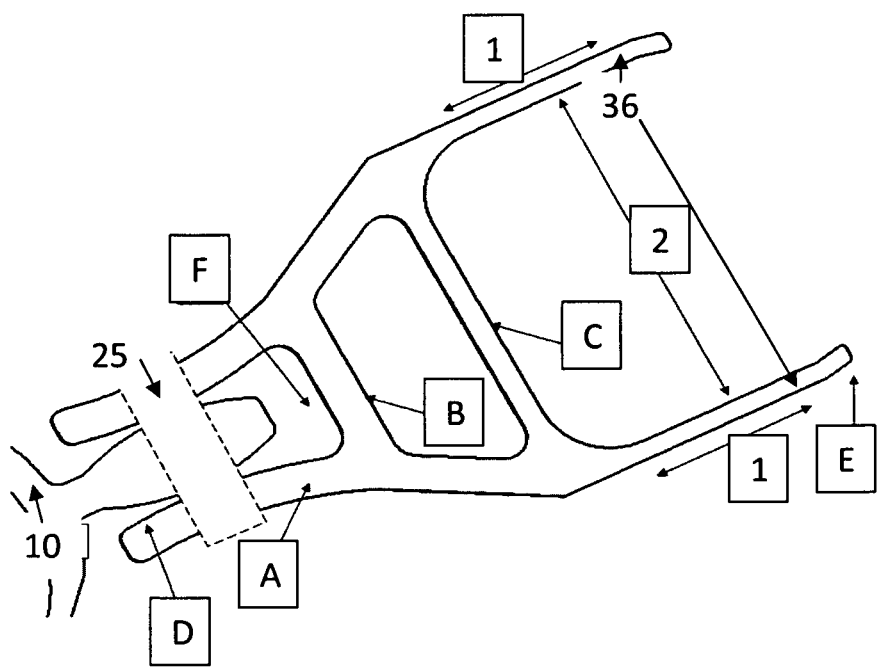
FIG. 9 shows a single fin sleeve & guided insertion SEP.

Single Sleeve 10 Fin and Guided Insertion Strut End Piece Graphic (FIG. 9):

1. Tensile or compressive forces are transmitted from the strut 14 attached to the strut end piece legs, through the strut end piece 16, through shear in the fastener and into the sleeve 10 fin 24.

2. The larger the spacing between the strut end piece legs, the more internal bending moment within the strut end piece 16. Alternate strut designs, such as the "Apple" or "Box" struts reduce this dimension, leading to a more "linear" transfer of force.

A. The curve of the strut end fins efficiently transfers the compressive and tensile loads through the body of the strut 14 and through the strut end piece legs to the strut 14.

B. The base of the strut end piece fins stabilizes the fins. The space between B and C allows the narrower strut end piece fins to "flare out" and efficiently transfer the tensile or compressive forces to the strut end piece legs.

C. The base of the strut end piece legs stabilizes the legs. For narrower struts (with a smaller 2 distance), B and C may be combined into one wall.

D. The curve of the strut end piece fins continues past the fastener to widen the connection point to the sleeve 10 fin—this makes inserting the strut end piece fins over the sleeve 10 fin 24 much easier ("guided insertion").

E. The tips of the strut end piece legs are slanted inwards to allow easier insertion into the struts (except for the box design)—again: "guided insertion".

F. The gap between the strut end piece fins is called the "tongue". The extrusion tool must have metal to create this gap—the "base" of the gap must support the "tongue" without the tongue caving inward or cracking off during extrusion—the "tongue ratio" is important to extrudability and tool service life—too large an area with too narrow a gap=problems.

This "gap" at the very tip of the strut end piece fins is relatively large, but narrows, with the narrowest point being on the centerline of the fastener. The tongue ratios at various distances from the very tip to this centerline; at the worst case (centerline) the tongue ratio is 2.9 (Area/(Base^2)); (under 3 is ideal for extrusion) were checked.

Guided Insertion:

The "Guided insertion strut end piece" flows from the ability to never have more than two fins on the strut end piece 16—the end of the opening 58 is designed to flare outward to simplify assembly even further, "guiding" the insertion of the single fin 52 between the two mating fins. The fins have ideally a 2.0× fastener diameter hole-center-to-part-edge distance (although this can be reduced to 1.5× with appropriate reductions to the bearing capacity calculations per the Aluminum Design Manual).

By never having more than 2 fins with a single fin 52 between them, the gaps between the 2 fins can be such (enhanced further by the flared design) that the tongue ratio is more ideal for extrusion, despite the depth of the space between the fins—this improves extrudability and die life.

The strut end pieces (in all cases) can be extruded and fabricated, die cast or manufactured by other means. With the more numerous, but smaller and lighter components (including the three piece strut end piece/strut/strut end piece assemblies) depicted in patent application 61/190,573, the strut assemblies were light and easily handled and manipulated by the frame assemblers (the assemblies weighed approximately 5 pounds). As fewer but longer, larger and thus heavier components and resulting strut assemblies were contemplated, it became clear that sliding/pivoting the strut end pieces onto the mating sleeves in a precise fashion would become more cumbersome and take longer. The "Guided Insertion" design ideally solves several problems—it allows the desired 2.0× hole diameter—to hole edge (or alternatively 1.5× with reduce bearing capabilities per the Aluminum Design Manual), makes the base "gap" of the strut end piece 16 larger to improve the extrusion tongue ratio of the part and allows the heavier strut assembly to be slid/pivoted onto the mating sleeve 10 fin 24 with "guidance", helping to ensure ease of assembly despite the longer, heavier assemblies contemplated.

By only having a single fin 52 on the sleeve 10, only two fins are needed on the mating strut end piece 16, and thus the ends of the strut end piece fins can curve outwards, away from the center, improving extrusion "tongue" ratio of the part without either adversely affecting what would have been a $3^{rd}$ or $4^{th}$ fin on the strut end piece 16, or likewise causing the strut end piece 16 to become too wide due to these "outward curves".

Note that all discussions have centered around single fins 52 on the sleeves and multiple fins on the strut end pieces, but the parts could be redesigned very simply to have multiple fins on the sleeves and single fins 52 on the strut end pieces, using the many variations shown in this and prior patent applications. See FIGS. 10a, 10b, 10c, 10d and 10e.

Figure 10A:
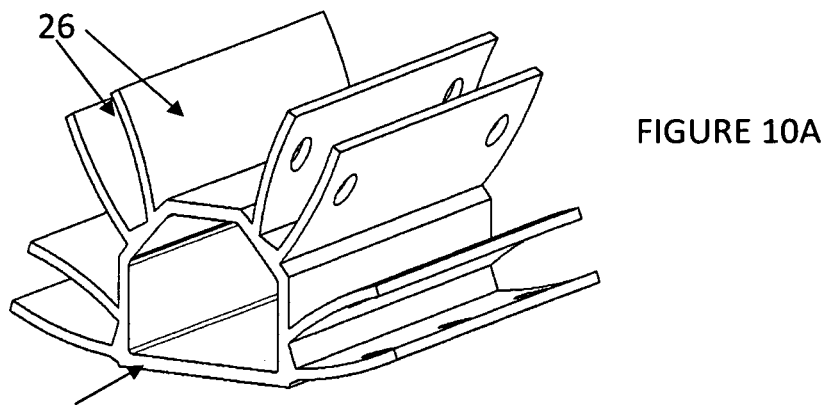
FIG. 10a shows a multi nonstraight nonparallel finned sleeve.

FIG. 10a shows an example of multi, nonstraight, non-parallel finned sleeve 10.

Figure 10B:
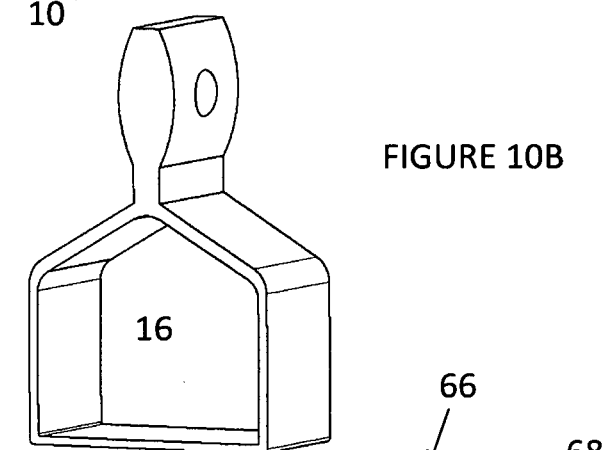
FIG. 10b shows a single fin SEP.

FIG. 10b shows an example of single fin 52 strut end piece 16 to be combined with multi, monstraight non-parallel finned sleeve (10a).

Figure 10C:
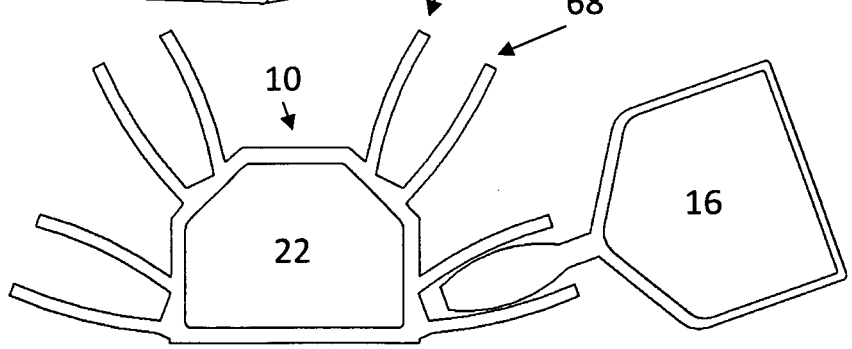
FIG. 10c shows a multi nonstraight nonparallel finned sleeve & single fin SEP.

FIG. 10c shows multi, nonstraight, non-parallel finned sleeve 10 and single fin 52 strut end piece 16 combination.

Figure 10D:
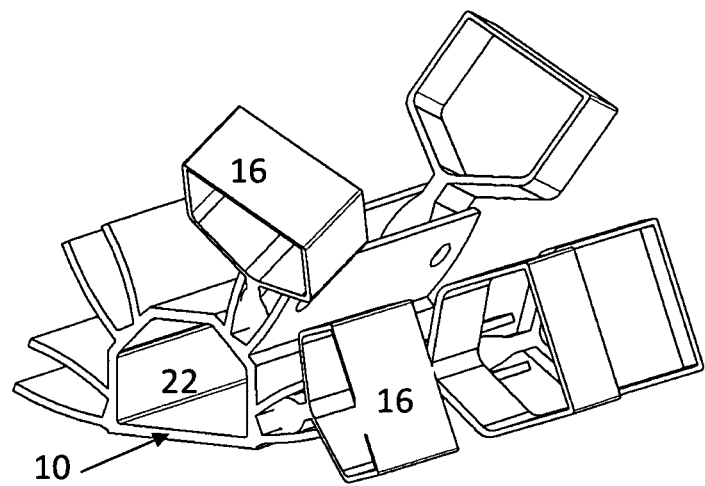
FIG. 10d shows a multi nonstraight nonparallel finned sleeve & single fin SEP—Assembly 3D view.
Figure 10E:
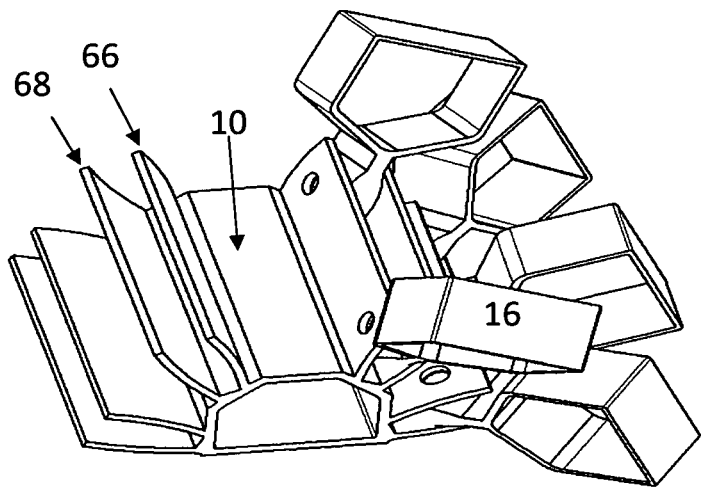
FIG. 10e shows a multi nonstraight nonparallel finned sleeve & single fin SEP—Assembly top 3D view.

FIGS. 10d and 10e show multi, nonstraight, non-parallel finned sleeve 10 and single fin 52 strut end piece 16 combination.

Figure 11:
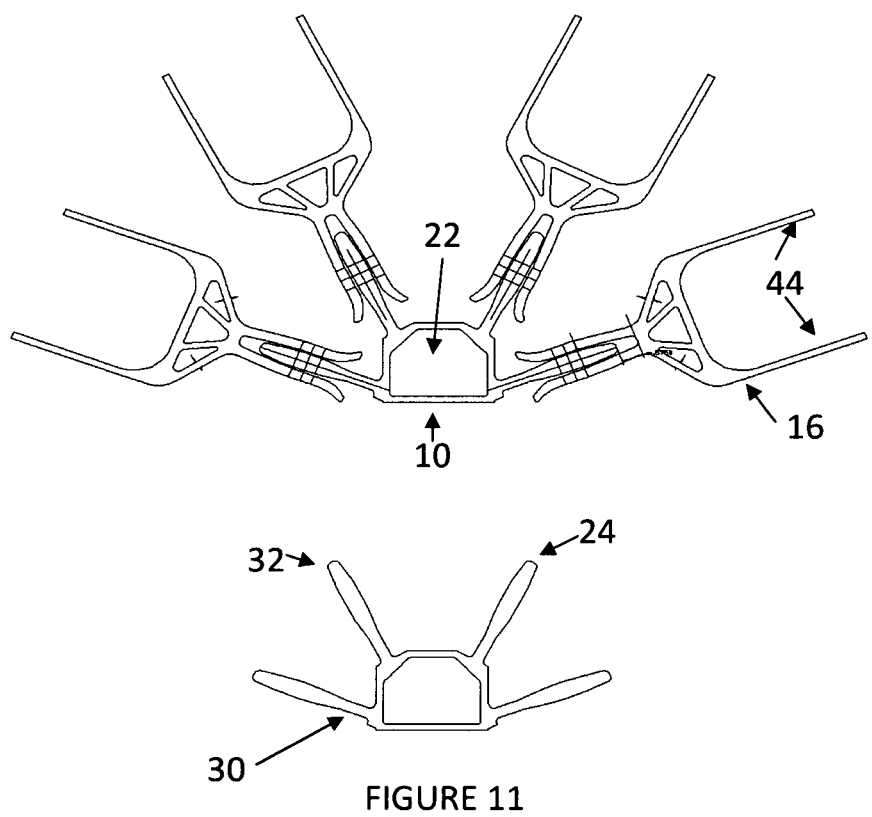
FIG. 11 shows a guided insertion sleeve & SEP.

FIG. 11 shows "Guided Insertion" flared opening 58 curve between the two fins of the strut end piece 16, shown inserted over a "curved" single fin 52 of the sleeve 10.

Figure 12:
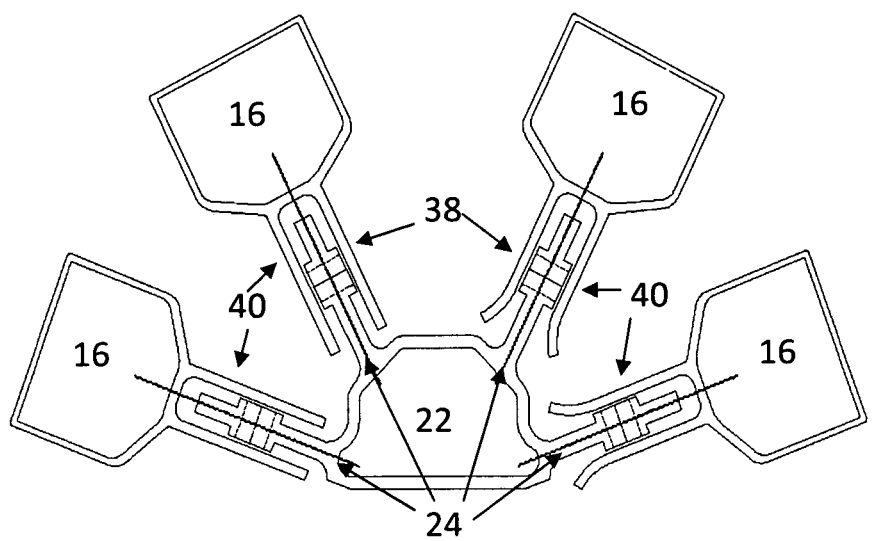
FIG. 12 shows a guided insertion SEP—with stepped single fin sleeve (thickened portion can be nonparallel).

FIG. 12 shows "Guided Insertion" flared opening 58 curve between the two fins of the two right most strut end piece 16s, shown inserted over "stepped" single fins of the sleeve 10.

Figure 13:
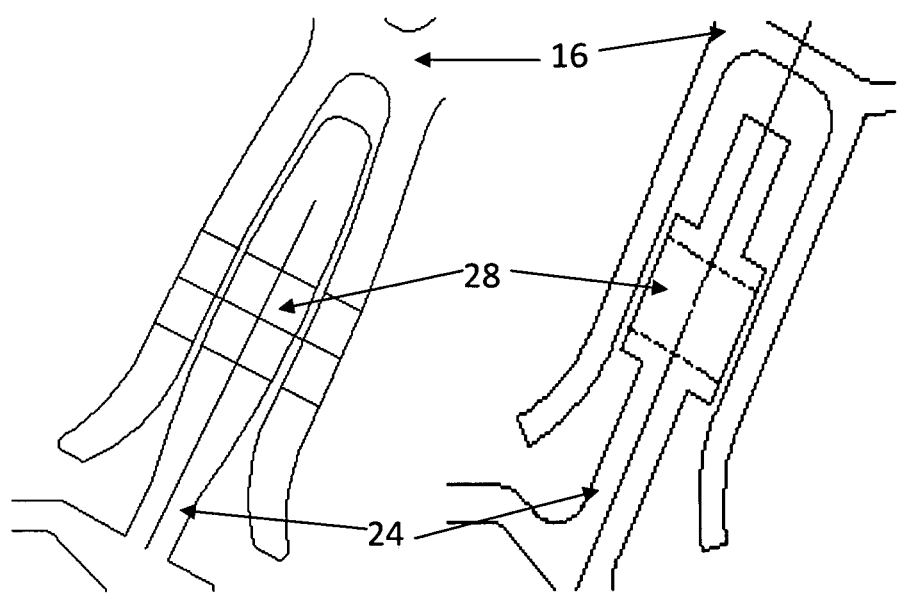
FIG. 13 shows a guided insertion sleeve & SEP and stepped single fin sleeve & SEP.

FIG. 13 shows "Guided Insertion" flared opening 58 curve between the two fins of the strut end piece 16, shown inserted over a "curved" and "stepped" single fin 52 of the sleeve 10. Left graphic shows a guided insertion with two curved, non-parallel, surfaces 26. Note that the curves in the strut end piece 16 flare out to allow much easier insertion over the single sleeve 10 fin 24 (curved as well). The thinnest portion at the base of the single sleeve 10 fin 24 is all that is required strength-wise, the additional thickness is there to provide an acceptable tongue ratio on the mating strut end piece 16 (and additional bearing strength at the pin location). Right graphic shows similar setup but with parallel surfaces 26 and an alternative to the curved surface single sleeve 10 fin 24.

The Single fin 52 Sleeve 10 and Guided Insertion Strut end piece 16 designs were carried through to actual part designs for several example load cases. One strut assembly is highly loaded (FIGS. 14-21), with over 10,000 lbs of compression or tension, and moderately long, thus able to avoid compressive buckling despite the moderate strut tube diameter and wall thicknesses. The other strut assembly is more moderately loaded (FIGS. 22-28), with over 1,000 lbs of compression or tension, but shows a likely design for a very long strut assembly, requiring a comparatively larger strut diameter—vs—load as compared to the highly loaded figures. These two cases (HL and ML) were chosen to demonstrate the different design philosophies that various real life situations will drive.

The combination of minimum moment of inertia and area (with resulting radius of gyration) is needed for the member to perform re: compressive buckling due to the loads and effective member length contemplated.

When considering different design philosophies for this part, marrying the single fin 52 sleeve 10 and the guided insertion strut end piece 16 with an associated strut 14, and iterating through various cases to determine the effect on the weight/ft and circle size of the associated sleeve 10 and strut end pieces, and that of the strut tubes, a minimum hole to edge distance of 1.5 was chosen, as this, combined with a higher strength (Aluminum 2024T4 pin—shear strength of 37 ksi), allowed for the use of a 0.650" pin between the strut end piece 16 and the single fin 52 of the sleeve 10. This in turn yielded a strut end piece 16 cut length of approximately 2", and allowed the use of smaller diameter (for example, say 0.64") multiple pins of 6061T6 alloy (shear strength of 24 ksi) fastening the strut 14 and strut end pieces together. This in turn yielded a minimum strut end piece fin thickness of 0.4", with the minimum single fin 52 of the sleeve 10 required at 0.825", the "leg" thickness of the strut end piece 16 at 0.2" and a minimum wall thickness on the strut of 0.14"

For the load case and design philosophy chosen, the single pin joining the strut end piece 16 dual fins and the single fin 52 of the sleeve 10 diameter was determined by the shear strength of the pin. The cut length of the strut end piece 16 was determined by the 1.5 hole to edge distance (1.5*2*0.65=1.95"). The strut end piece fin thickness (of the dual fins) was limited, in this case, by the bearing strength of the strut end piece material (factored down by 1.5/2.0 per the Aluminum Design Manual, as required), not by the tension on the net area or block shear. The single fin 52 sleeve 10 thickness at the thickest point, where the pin passes through it, was determined by the bearing stress of the material, not by the block shear. The strut end piece leg wall thickness was determined by the tension on the net area calculation, not by block shear or bearing, while the wall thickness of the strut itself was determined by the bearing strength of the strut material.

All of the calculations and decisions were driven by the 1.5× pin diameter calculation, chosen to minimize the circle size of the sleeve 10 and the strut end piece 16 (to ensure that the parts could be easily extruded on 10" diameter extrusion presses).

Moderately Loaded Strut Assembly:

With over only 1,000 lbs of tension or compression, a tube with properties of minimum Moment of Inertia of over 4.5 in^4 and Minimum Radius of Gyration of over 1.5 in^2 was required. The combination of minimum moment of inertia and area (with resulting radius of gyration) is needed for the member to perform re: compressive buckling due to the loads and effective member length contemplated. Since these profile properties are the same as for the much more highly loaded part enduring over 10,000 lbs of tension and compression, that the more moderately loaded strut is of course thus much longer.

Because of the lower load capacity required, a different design philosophy from that of the highly loaded strut assembly was employed.

When considering different design philosophies for this part, marrying the single fin 52 sleeve 10 and the guided insertion strut end piece 16 with an associated strut 14, and iterating through various cases to determine the effect on the weight/ft and circle size of the associated sleeve 10 and strut end pieces, and that of the strut tubes, a minimum hole to edge distance of almost 1.8 was chosen, as this, combined with a even moderate material strength (Aluminum 6061T6 pin—shear strength of 24 ksi), allowed for the use of a pin of just over 0.25" pin between the strut end piece 16 and the single fin 52 of the sleeve 10. This in turn yielded a relatively short strut end piece 16 cut length of less than 1", although 1" was chosen for fabrication purposes. The strut end piece 16 to strut pins was sized at approximately 0.2" and are of 6061T6 alloy (shear strength of 24 ksi). This in turn yielded a minimum strut end piece 16 fin thickness of under 0.1", with the minimum single fin 52 of the sleeve 10 required at just over 0.175", the "leg" thickness of the strut end piece 16 at 0.04" and a minimum wall thickness on the strut of 0.04"

For the load case and design philosophy chosen, the single pin joining the strut end piece dual fins and the single fin 52 of the sleeve 10 diameter was determined by the shear strength of the pin. The cut length of the strut end piece 16 was determined by the 1.5 hole to edge distance (1.8*2*0.28=1.0"). The strut end piece 16 fin thickness (of the dual fins) was limited, in this case, by the bearing strength of the strut end piece 16 material (factored down by 1.8/2.0 per the Aluminum Design Manual, as required), not by the tension on the net area or block shear. The single fin 52 sleeve 10 thickness at the thickest point, where the pin passes through it, was determined by the bearing stress of the material, not by the block shear. The strut end piece 16 leg wall thickness was also determined by bearing stress, not by tension on the net area calculation or block shear, while the wall thickness of the strut 14 itself was determined by the bearing strength of the strut material.

All of the calculations and decisions were driven by the 1.8× pin diameter calculation, chosen to keep the circle size and wall thicknesses reasonable (the sleeve 10 circle size is determined by the more highly loaded assembly).

Figure 14:
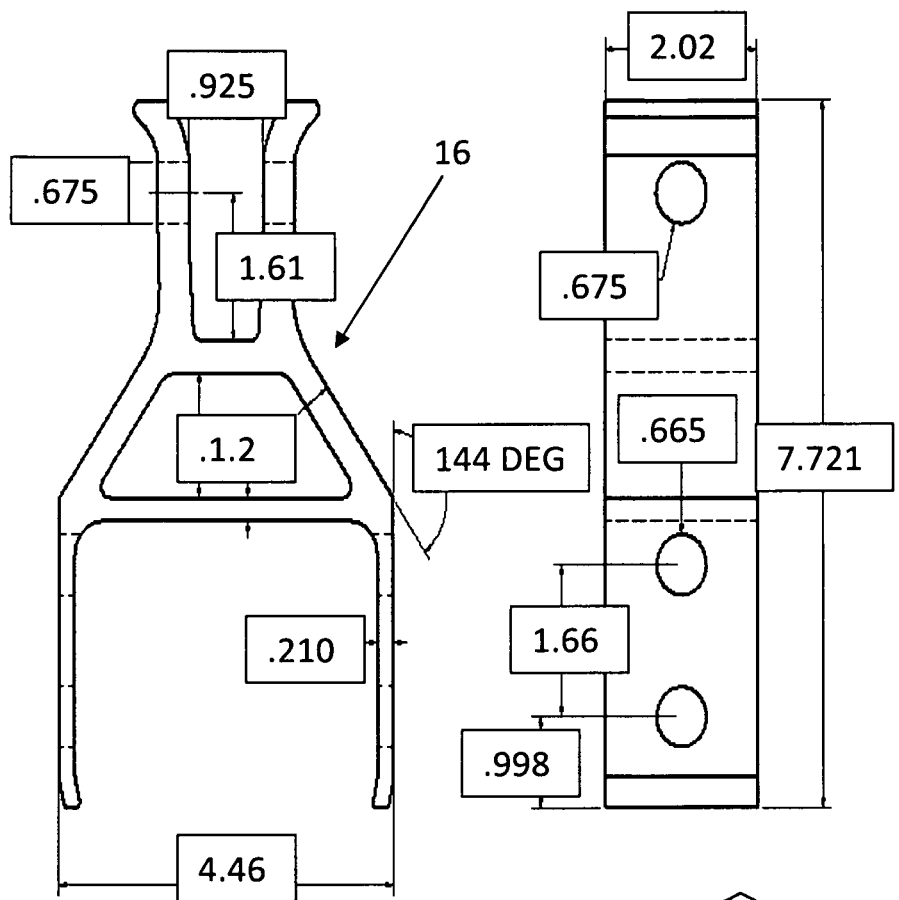
FIG. 14 shows a highly loaded SEP—Print.
Figure 14:
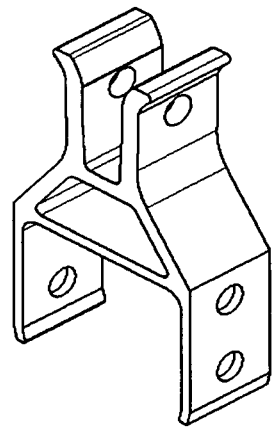

FIG. 14 shows a highly loaded strut end piece 16.

Figure 15:
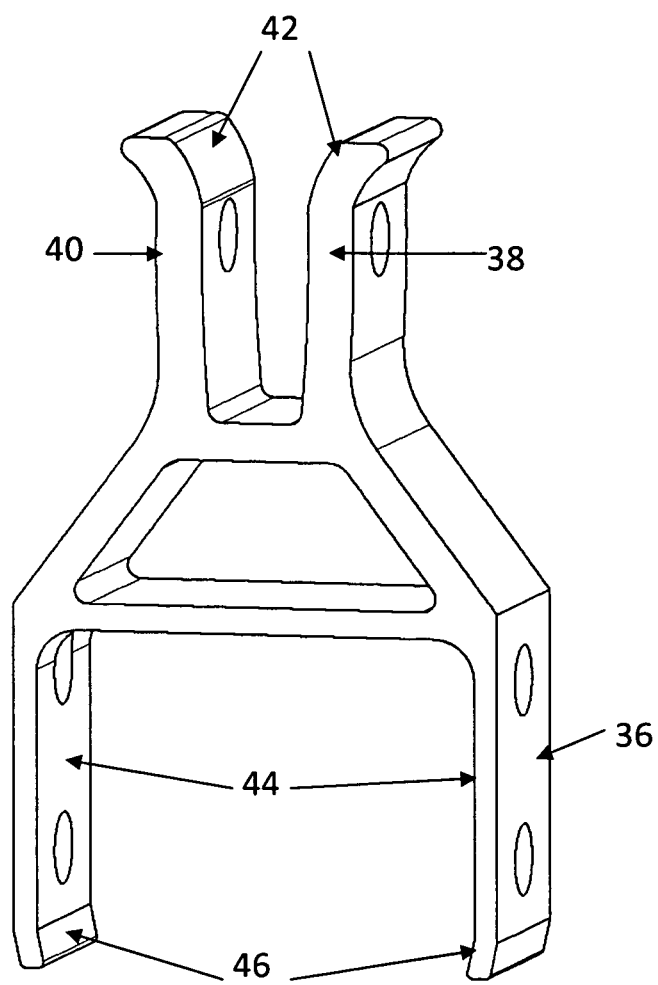
FIG. 15 shows a Highly Loaded SEP—3D.

FIG. 15 shows a highly loaded strut end piece 16. Note that the bottom left and right legs tilt inward to ease insertion into the strut 14, which eases/speeds assembly of the strut 14/strut end pieces.

Figure 16:
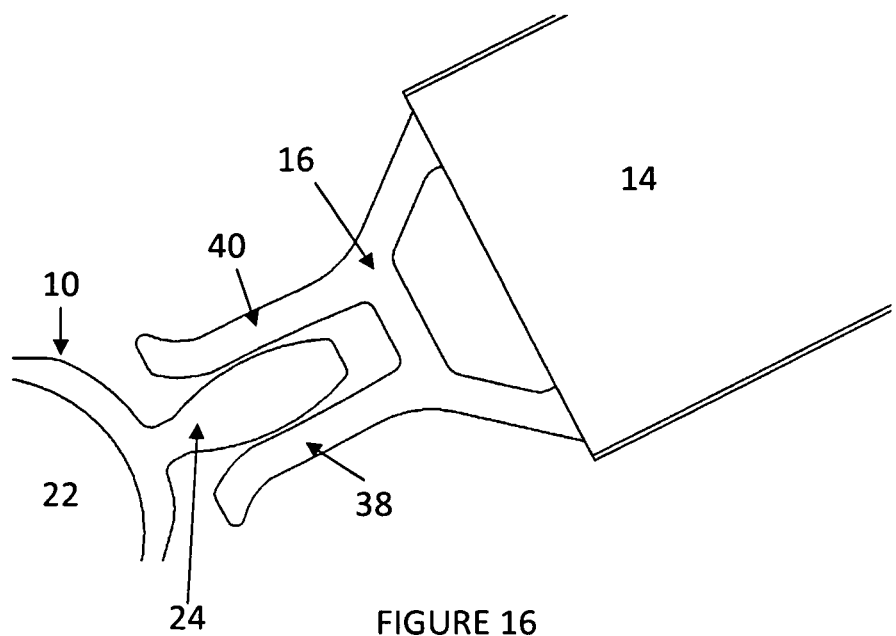
FIG. 16 shows a tubular strut on an SEP & single fin sleeve.

FIG. 16 shows a tubular strut 14 on strut end piece 16 over sleeve 10 single fin 52.

Figure 17:
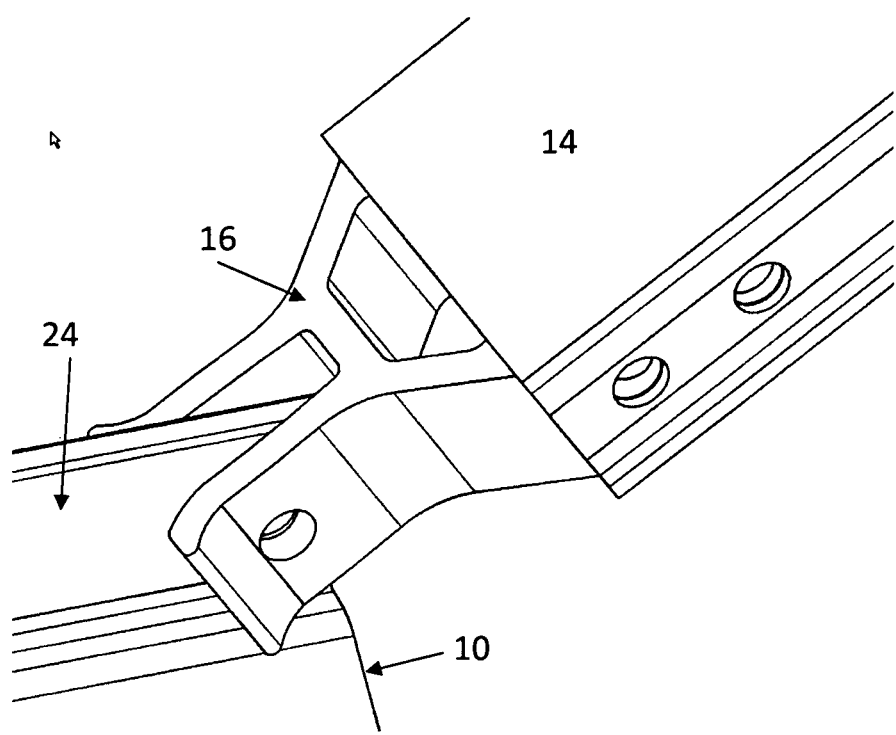
FIG. 17 shows a tubular strut on an SEP & single fin sleeve-3D.

FIG. 17 shows a tubular strut 14, showing bulged flat to increase bearing area where the two pins connect it to the strut end piece 16, which is inserted over the single fin 52 of the sleeve 10.

Figure 18:
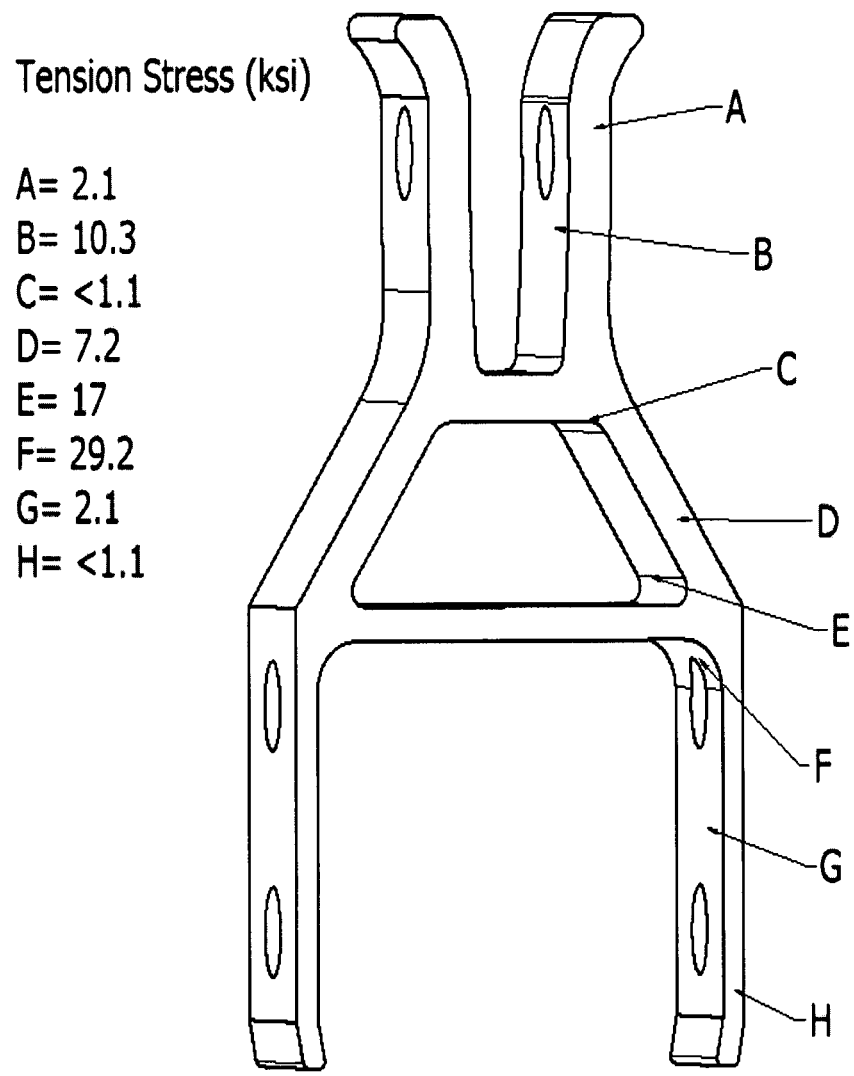
FIG. 18 shows an FEA on a highly loaded SEP showing Principal stress in tension.

FIG. 18 is an FEA showing Principal Stress of highly loaded strut end piece 16 with over 10,000 lbs of tension. NOTE: (next FIG. 19 shows that they are 0.00548" (just over the thickness of a dollar bill) at the worst.

Figure 19:
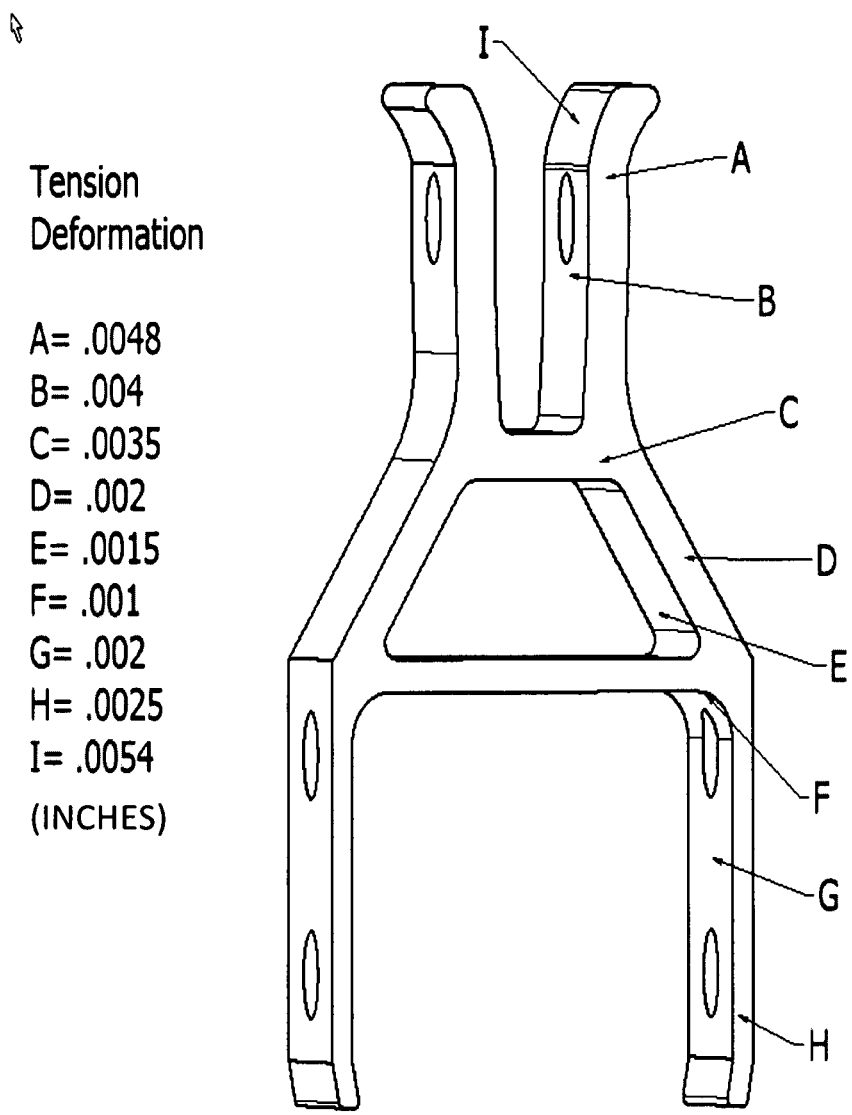
FIG. 19 shows an FEA on a highly loaded SEP showing deformation in tension.

FIG. 19 shows a deformation from over 10,000 lbs of tension. Note that legs pull in under 0.003".

Figure 20:
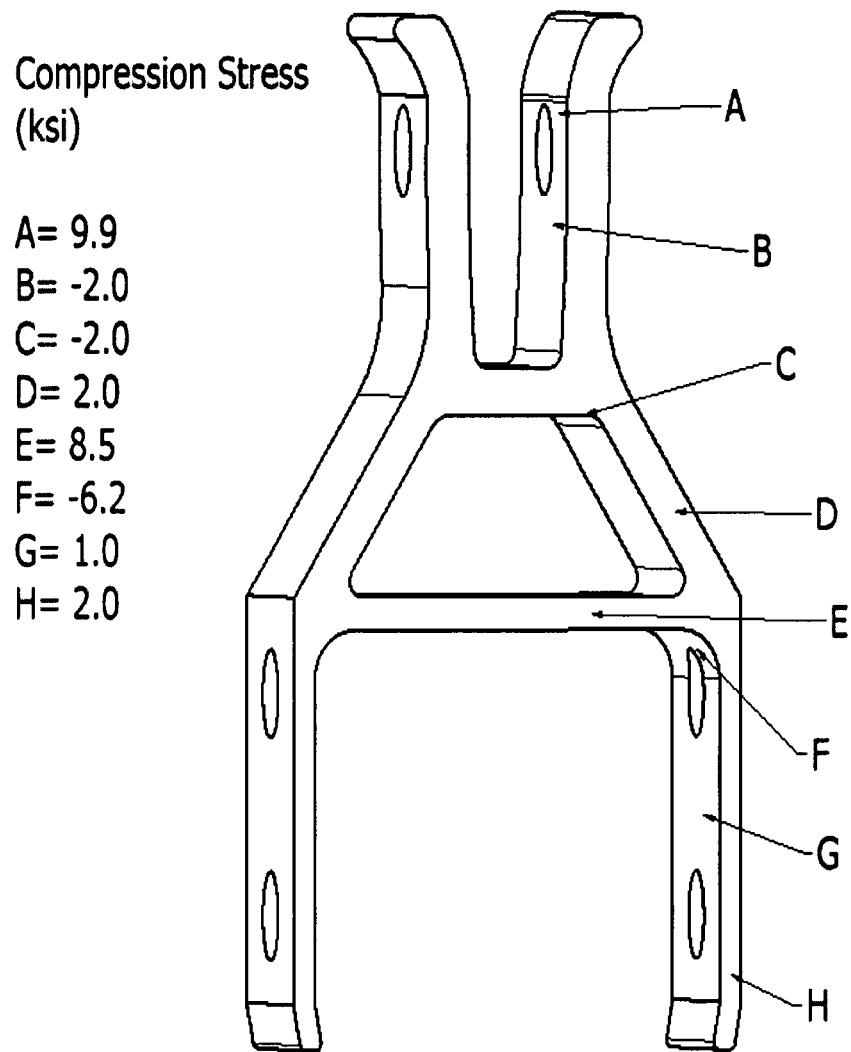
FIG. 20 shows an FEA on a highly loaded SEP showing Principal stress in compression.

FIG. 20 is an FEA showing principal stress. Highly loaded strut end piece 16 with over 10,000 lbs of compression—well under safety factor stress level at all pts.

Figure 21:
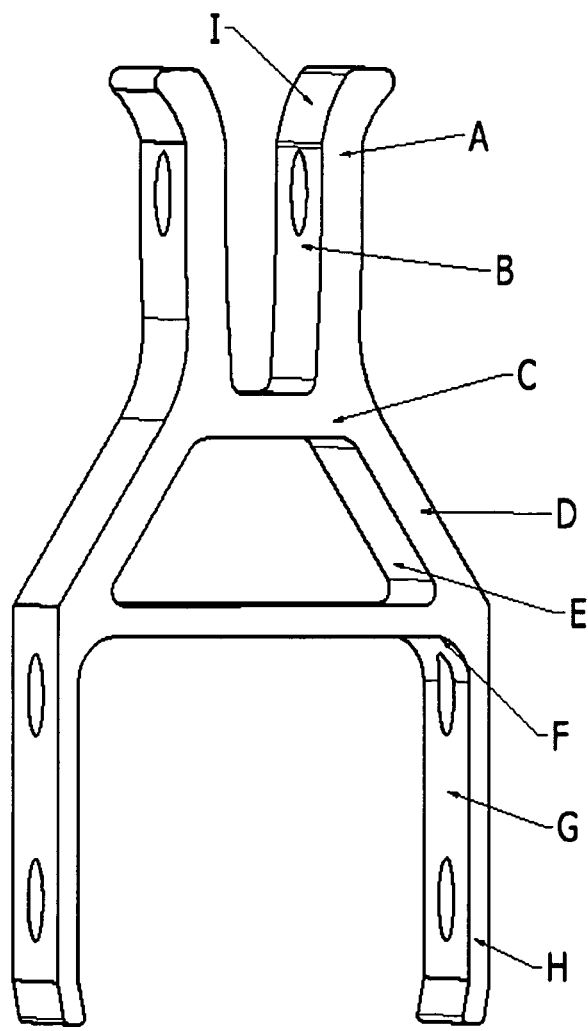
FIG. 21 shows an FEA on a highly loaded SEP showing deformation in compression.

FIG. 21 shows a deformation of highly loaded strut end piece 16 with over 10,000 lbs of compression.

Figure 22:
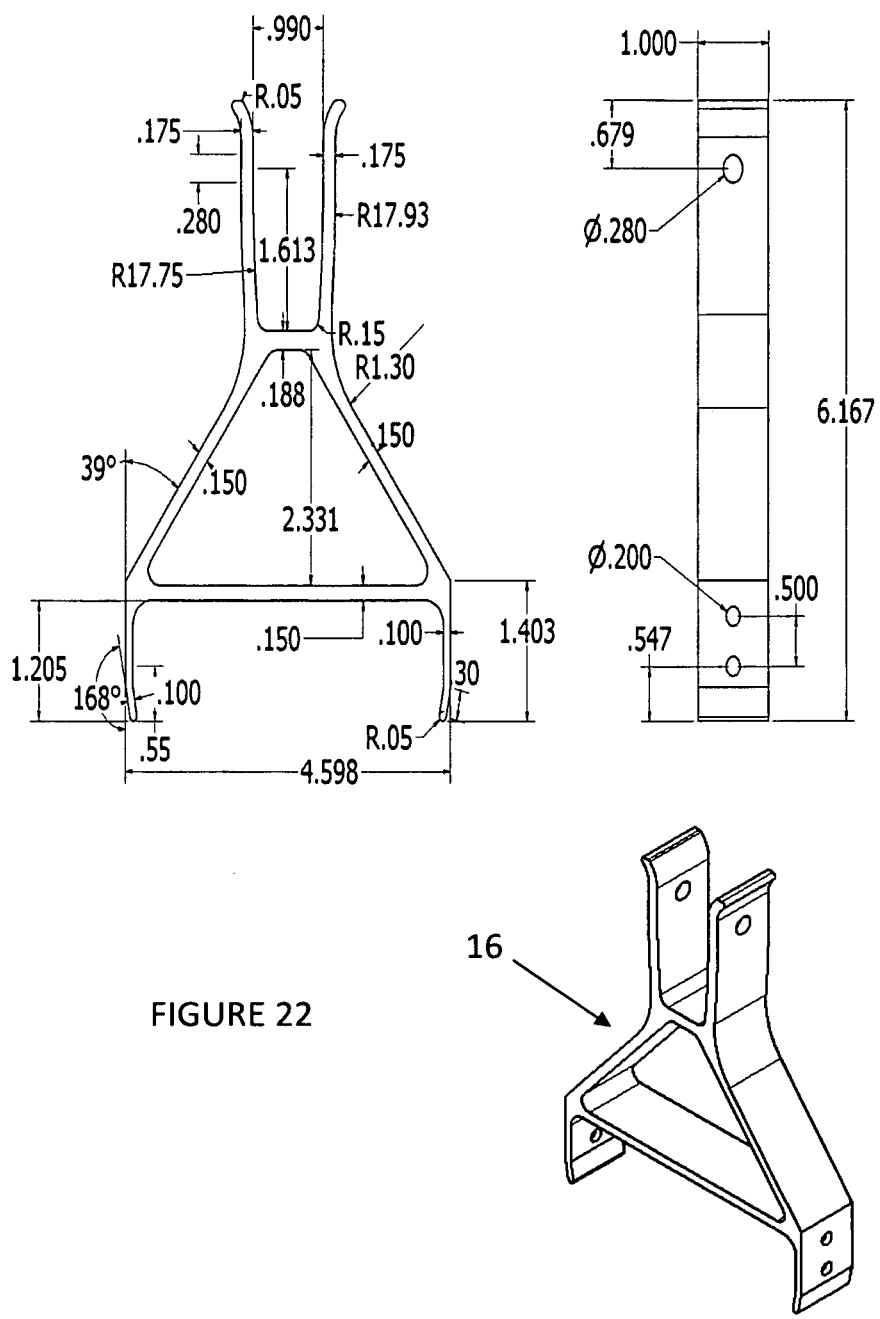
FIG. 22 shows a moderately loaded strut—Print.

FIG. 22 shows a moderately loaded strut end piece 16 (>1,000 lbs of tension or compression).

Figure 23:
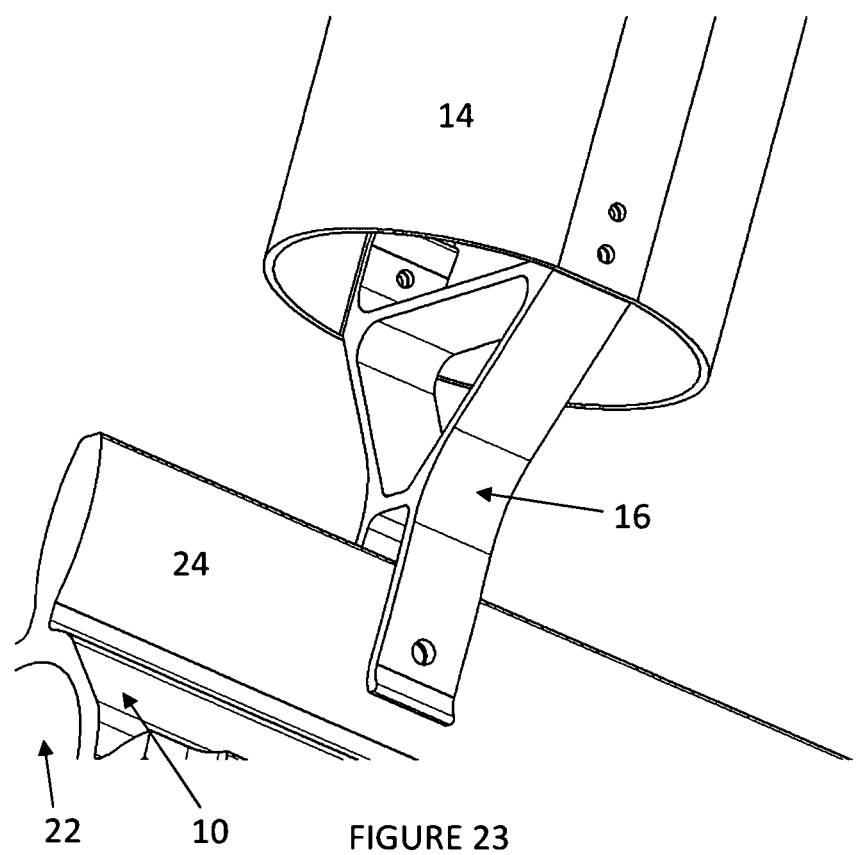
FIG. 23 shows a moderately loaded tubular strut connection to SEP 3D.

FIG. 23 shows a tubular strut 14 with flat showing 2 fastener holes connecting it to strut end piece 16 with one fastener hole connection it to the single fin 52 of the sleeve 10.

Figure 24:
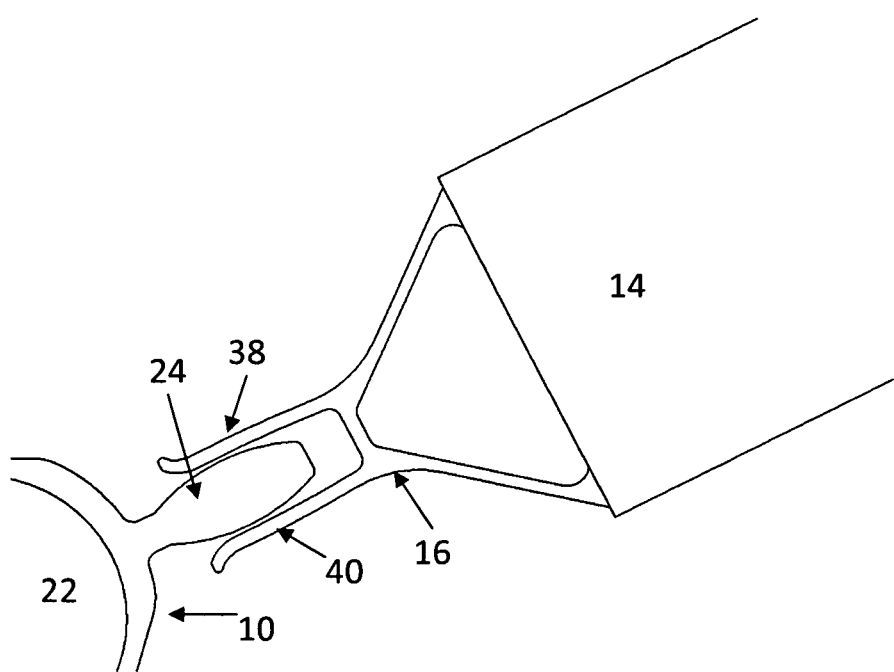
FIG. 24 shows a moderately loaded tubular strut over SEP connected to single fin sleeve.

FIG. 24 shows a tubular strut 14 over strut end piece 16 over single fin 52 of sleeve 10.

Figure 25:
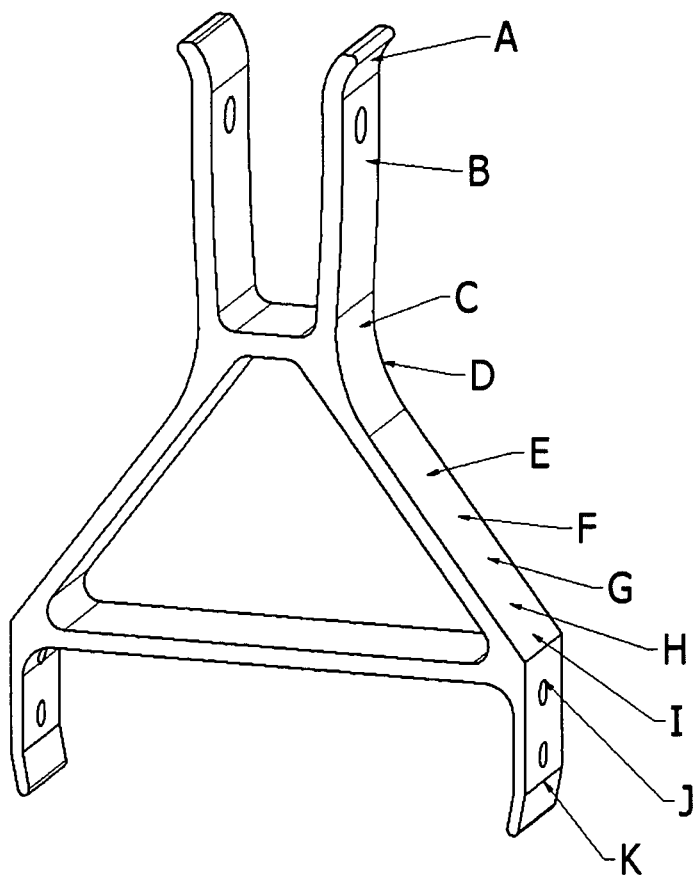
FIG. 25 shows an FEA on a moderately loaded SEP showing principal stress in tension.

FIG. 25 shows an FEA showing Max Principal Stress with moderately loaded strut end piece 16 under 1,000 lbs of tension, still only 12 ksi (—vs—allowable 19.4).

Figure 26:
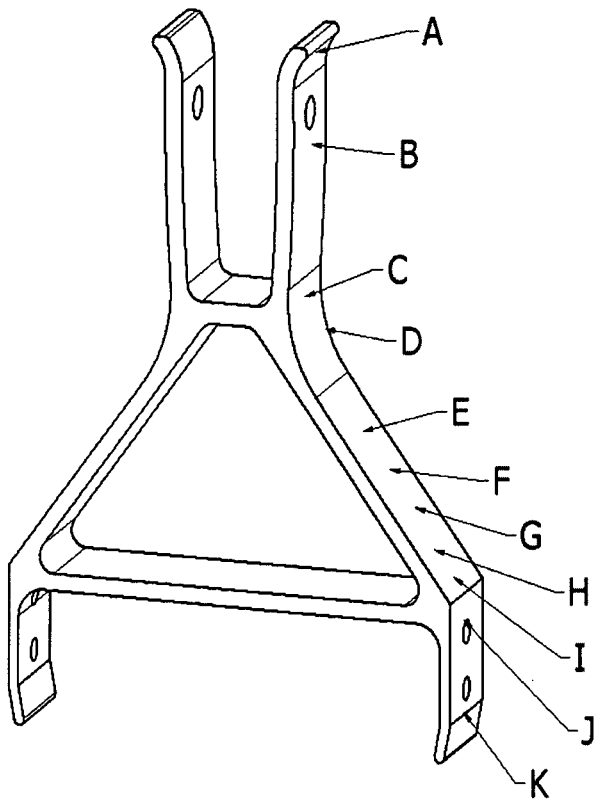
FIG. 26 shows an FEA on a moderately loaded SEP showing deformation in tension.

FIG. 26 shows a deformation under 1,000 lbs of tension.

Figure 27:
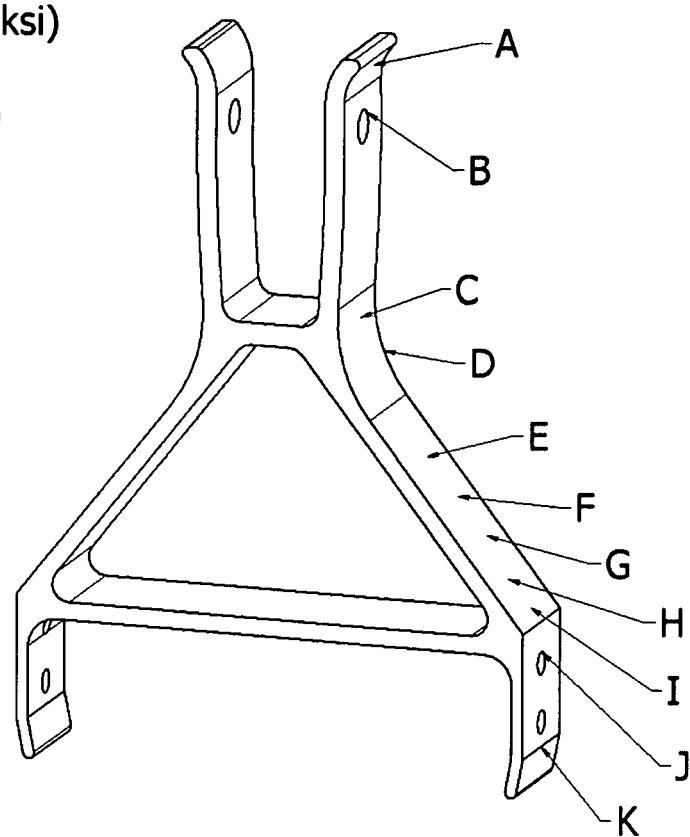
FIG. 27 shows an FEA on a moderately loaded SEP showing principal stress in compression.

FIG. 27 shows an FEA showing principal stress. Low resulting principal stress levels under 1,000 lbs of compression.

Figure 28:
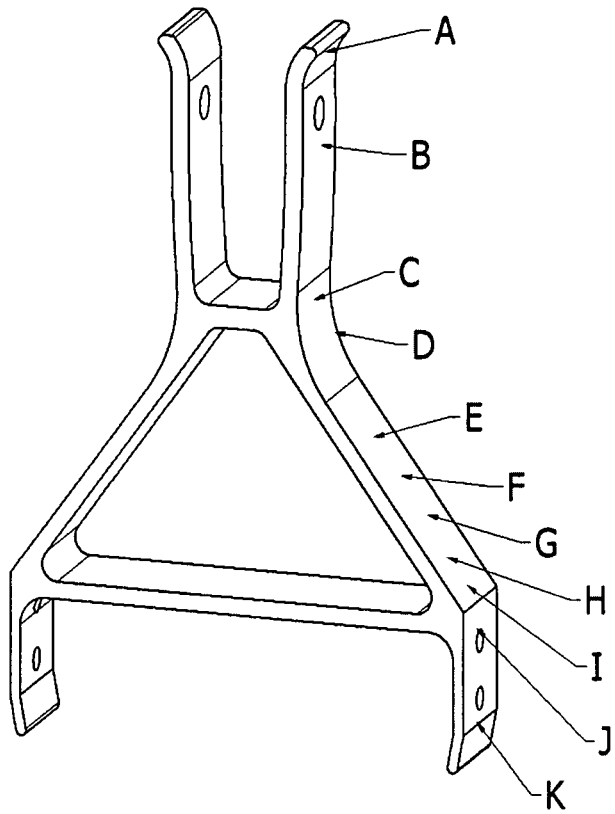
FIG. 28 shows an FEA on a moderately loaded SEP showing deformation in compression.

FIG. 28 shows a low deformation under 1,000 lbs of compression.

Very Highly Loaded Strut Assembly.

The design parameters were run through for a VERY HIGHLY LOADED STRUT ASSEMBLY (20,000 lbs of compression or tension) (FEA's were run on Strut end piece 16). The basic designs looked similar to the Highly Loaded Strut Assembly, but the elements were larger (in part thickness, weight/ft and circle size). The smaller 1,000 and 10,000 lb parts could be produced on a 10" diameter extrusion press. Because of the larger parts required to handle the 20,000 lb loads, the parts would really require a 12" extrusion press. The simple chart below highlights, directionally, the part characteristics for the moderately loaded, highly loaded and very highly loaded designs.

| APPROX. LOAD CAPACITY (LBS) | Strut End Pc. Weight (lbs/ft) | Strut End Pc. Circle Size (in) | Sleeve Weight (lbs/ft) | Sleeve Circle Size (in) |
| --- | --- | --- | --- | --- |
| 1,000 | 3.6 | 6.8 | 5.22 | 6.6 |
| 10,000 | 6.76 | 8.2 | 9.76 | 9.1 |
| 20,000 | 12.48 | 10 | 20.308 | 11.9 |

For the purposes of this patent application detailed analysis including FEA was performed on pieces capable of 1,000 and 10,000 lb. maximum compression or tensile capacity. For the 20,000 lb case, only the detailed calculations were performed.

Using a known 2500 ton press, capable of 8" diameter billets and a maximum weight/ft of 6.4 lbs/ft (also constrained by the stretcher tonnage (44 US Tons in this case), what equipment would be necessary for the cases listed in the above table was "sized". Please note that the table can be easily extended or interpolated as needed, based on someone skilled in the art of extrusion. It is obvious that for the 1,000 lb. "moderately loaded" case, the parts could be EASILY extruded on the 2500 ton, 8" press with a 44 ton stretcher (8" circle size and 6.4 lbs/ft capability). For the highly loaded, 10,000 lbs maximum load, the Strut End Piece can possibly be extruded on an 8" press, certainly on a 9" press, while the sleeve 10 would really need to be produced on a 10" press, approximately 3500-4000 tons, with approximately a 69 ton stretcher. For the VERY highly loaded 20,000 lb case, the strut end piece could likely be extruded on a 12" press (5000-6000 ton) with about a 100 ton stretcher, but the sleeve 10 would need this size or larger (may be possible on a 12" press IFF the stretcher size is sufficient (approx. 135 tons)—may require a 14" or larger press).

Note that there are alternatives contemplated to allow larger circle size and/or weight/ft parts to be produced on smaller capacity extrusion operations. For example, one or more of the "fins" of the sleeve 10 could be produced as an "insertable" part (see FIGS. 29 *a* & *b*). By having one or more of the "fins" extruded separately, the circle size and or weight/ft would be reduced, enabling the sleeve 10 components to be produced on a lower capacity extrusion system. The designs shown in FIGS. 29 *a* & *b* are meant to depict a simple extruded "fin" slipped into a mating opening 22 on the sleeve 10, with pins either inserted through the ID of the sleeve 10 up into the body of the associated fin or through a side member of the sleeve 10 into and possibly through the base of the fin 24.

Figure 29A:
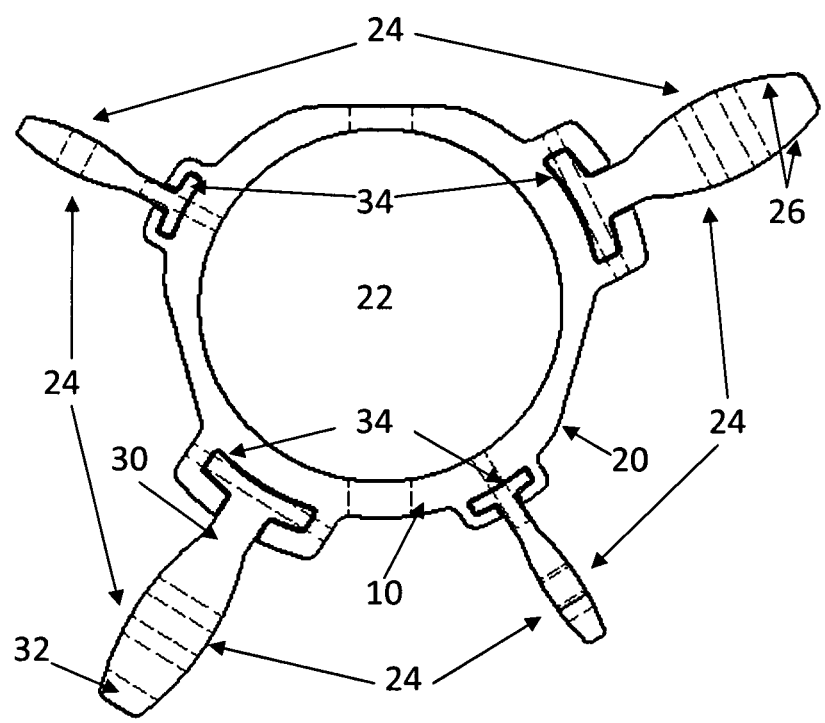
FIG. 29a shows an inserted single fin sleeve—End view.

FIG. 29*a* shows an end view of sleeve 10 with all four "fins" shown as if they were extruded as separately pieces to be inserted and fastened later (to reduce the circle size and/or weight/ft so that the part can be produced on a wider variety (smaller capacity) of extrusion presses).

Figure 29B:
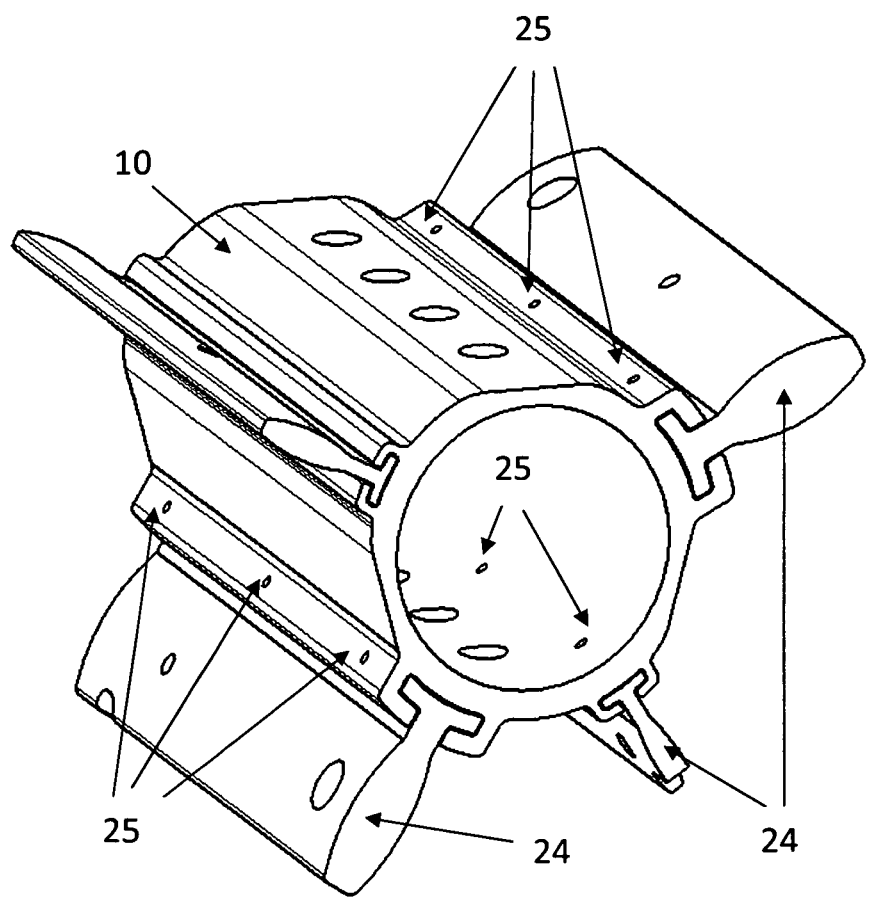
FIG. 29b shows an inserted single fin sleeve—3D End view.

FIG. 29*b* shows a sleeve 10 with all four "fins" shown as if they were extruded as pieces to be inserted and fastened later (to reduce the circle size and/or weight/ft so that the part can be produced on a wider variety (smaller capacity) of extrusion presses). The location of fastening pins, screws or other fasteners to positively locate the "fins" along the length of the sleeve 10 is shown.

Alternative Concepts for Strut End Pieces:

Depending on the design criteria, alternative concepts can be considered (two are shown in FIGS. 30*a-b* & 33*a-b*). These use a different curve to transfer the load from the pin connecting these to the sleeves through the strut end pieces and down to the strut 14. Depending on the criteria, these designs have larger extrusion tongue ratios, but transfer loads directly, which is preferable, if the tongue ratios are acceptable. The two top fins on the strut end pieces shown in FIGS. 30*a* and 30*b* deliver the tensile and compressive loads more directly to the bottom left and right legs of the strut end piece shown, where it directly attaches to the struts. Note that as with all of the parts in the patents, they can be sized larger or smaller to most optimally meet the performance requirements.

Efficient Load Transfer (if Extrusion Tongue Ratio is Acceptable)

Figure 30A:
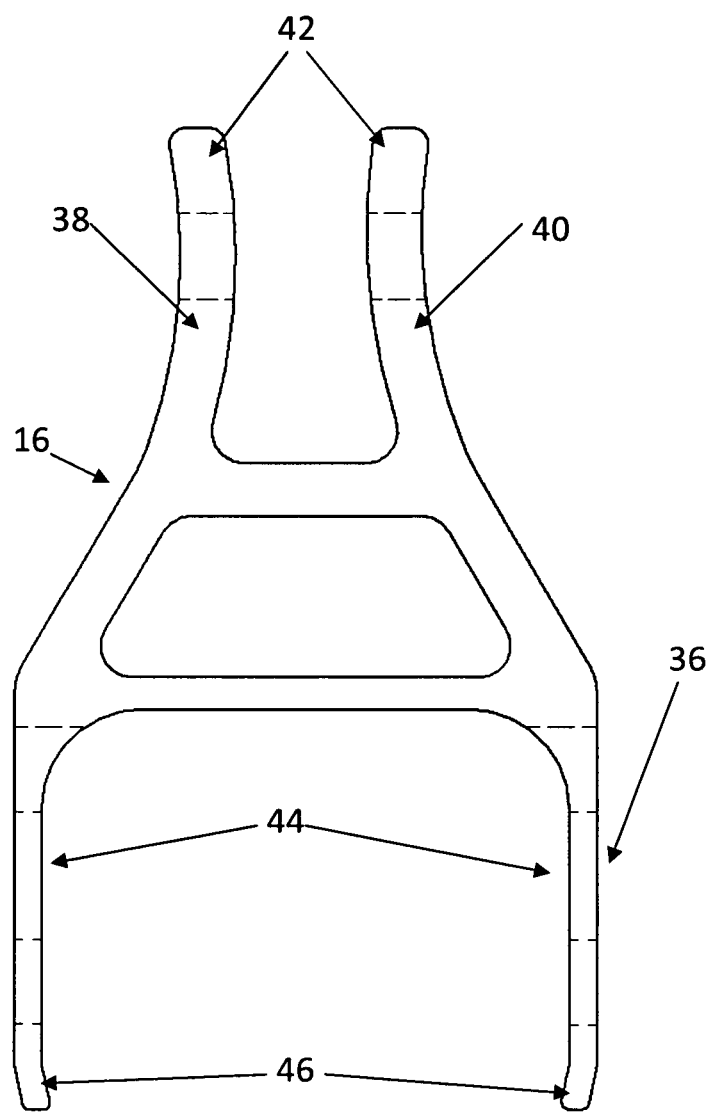
FIG. 30a shows an SEP with load transfer curve.

FIG. 30*a* shows a strut end piece 16 design modification which, if extrusion tongue ratio is acceptable, can more elegantly transfer loads form the sleeve 10 to strut end piece fins to the strut 14.

Figure 30B:
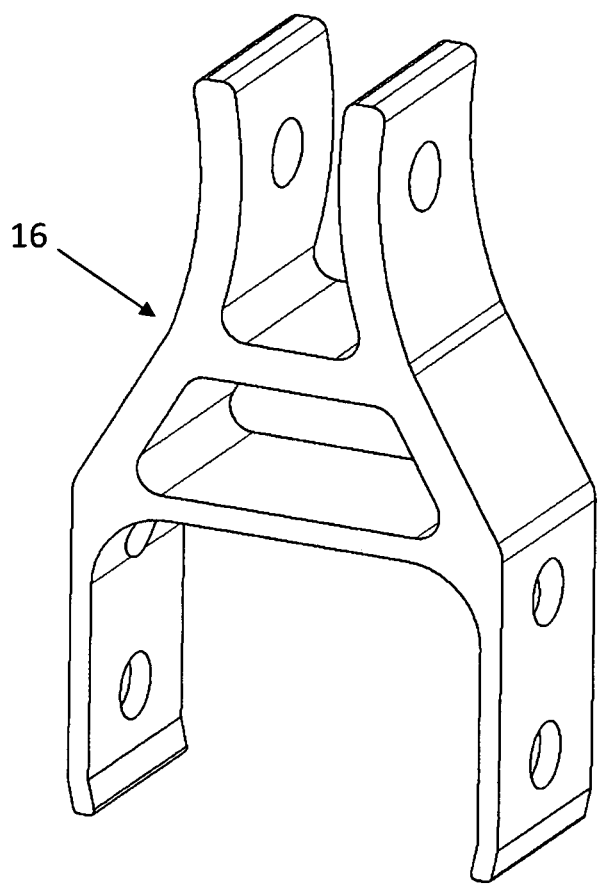
FIG. 30b shows an SEP with load transfer curve—3D.

FIG. 30*b* shows a 3D view of strut end piece design modification which, if extrusion tongue ratio is acceptable, can more elegantly transfer loads form the sleeve 10 to strut end piece fins to the strut 14.

Figure 31:
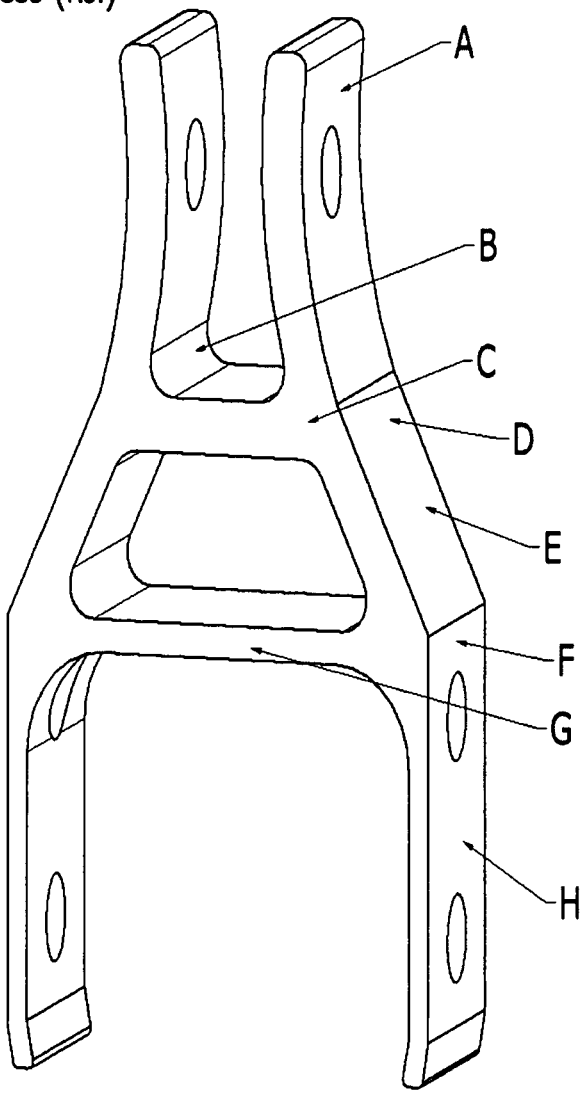
FIG. 31 shows an FEA on SEP with load transfer curve showing principal stress in compression.
Figure 32:
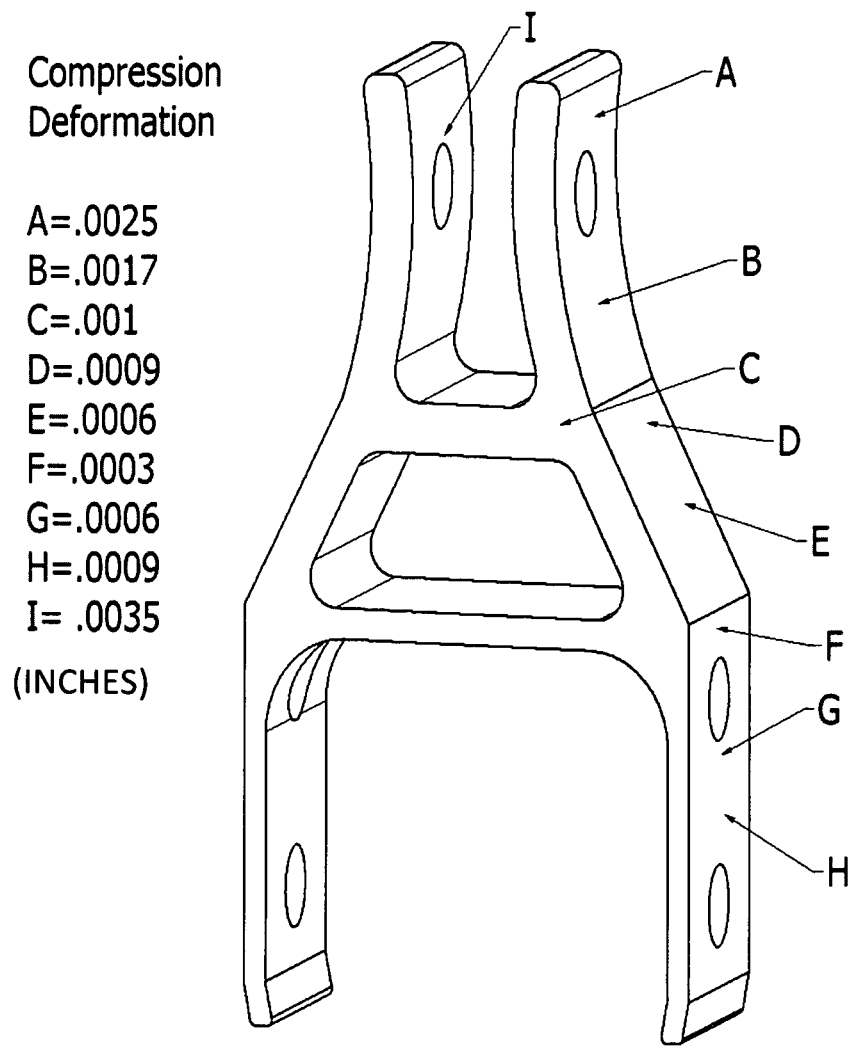
FIG. 32 shows an FEA on SEP with load transfer curve showing deformation in compression.

FIG. 31 is an FEA showing principal stress. Note the EXTREMELY low Max. Principal stress—vs—prior designs. Note that there are not even large "peaks" around the singularities/mesh around the holes (these are typical anomalies from FEAs).

Figure 33A:
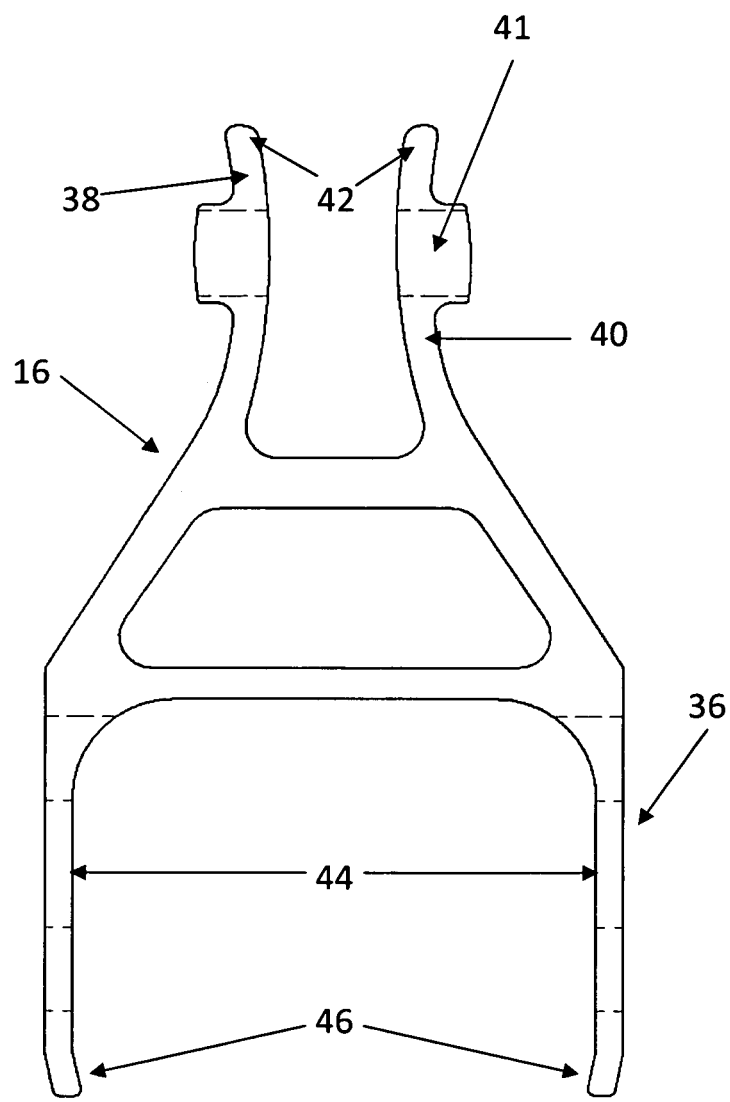
FIG. 33a shows an SEP with thicker (and nonparallel) bearing area.

FIG. 33*a* shows a strut end piece design modification which, if extrusion tongue ratio is acceptable, can more elegantly transfer loads form the sleeve 10 to strut end piece fins to the strut 14—shown with additional strut end piece fin thickness if higher bearing loads are required.

Figure 33B:
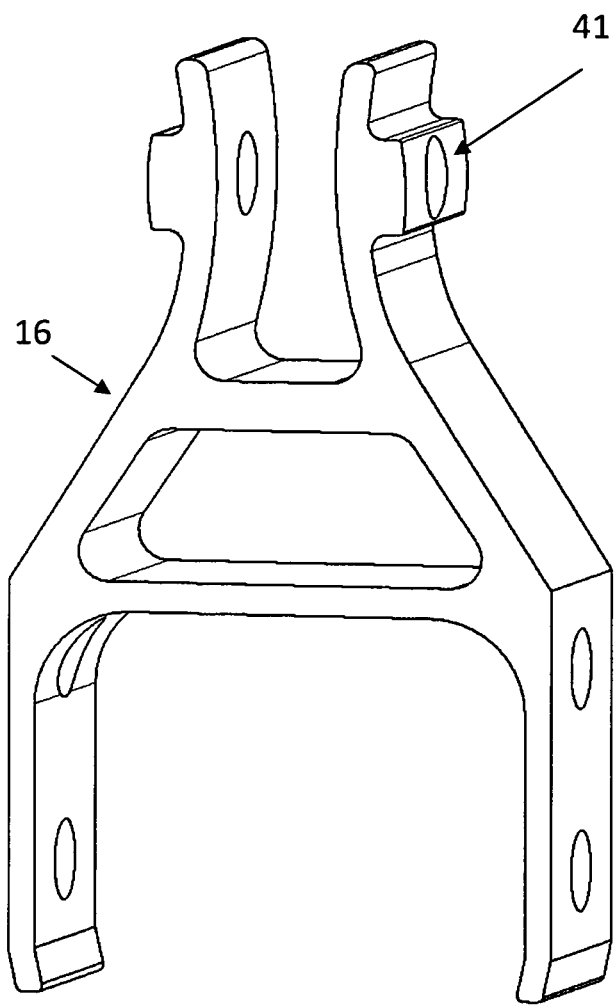
FIG. 33b shows an SEP with thicker (and nonparallel) bearing area—3D.

FIG. 33*b* shows a strut end piece design modification which, if extrusion tongue ratio is acceptable, can more elegantly transfer loads form the sleeve 10 to strut end piece fins to the strut 14—shown with additional strut end piece fin thickness 41 if higher bearing loads are required.

Swage Connection Strut End Connection Design Graphics and Photos:

The technique is to "swage" the tube onto the strut end piece 16 (extruded, die cast or other)—vs—using fasteners. It has proven to be a fast, cost effective, reliable joint for use in scaffolds. For the solar frame use, depending on the tensile and compressive load requirements, different designs might be needed. In any case, the process could use extruded tubing, unaged, swaged onto the unaged, cut (or die cast) strut end piece 16 or potentially aged components could be swaged (as they are in the Werner scaffold system).

The "swage connection" end piece is die cast, for the solar frame components, but it is also possible that an extruded strut end piece 16, as drawn in one of the figures, would work well also. This design concept would require equipment design and manufacturing for the swaged joint. It is believed that this type of joint could be an excellent alternative to the fastening (pin, rivet, bolt, welding) etc. of the strut end piece 16 (referring back to the prior patent application 61/190,573).

Figure 34:
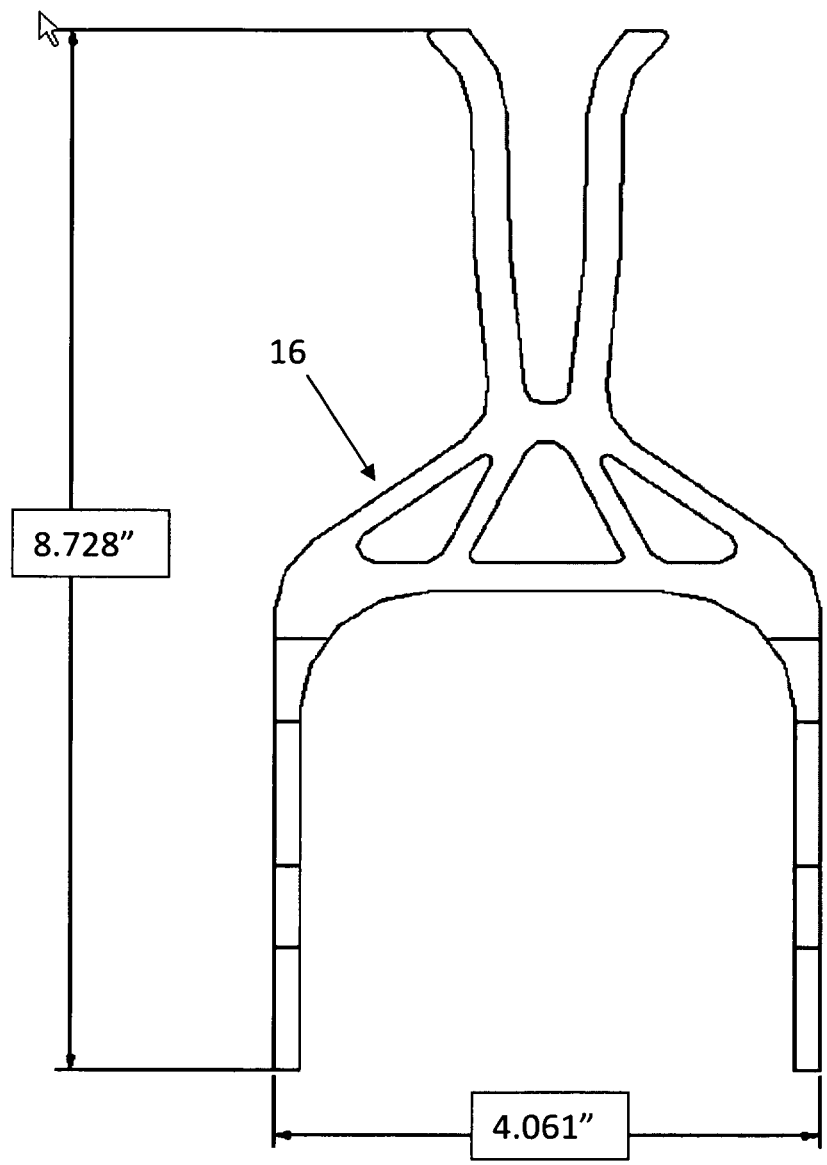
FIG. 34 shows a strut end piece for 11,000 load.
Figure 35:
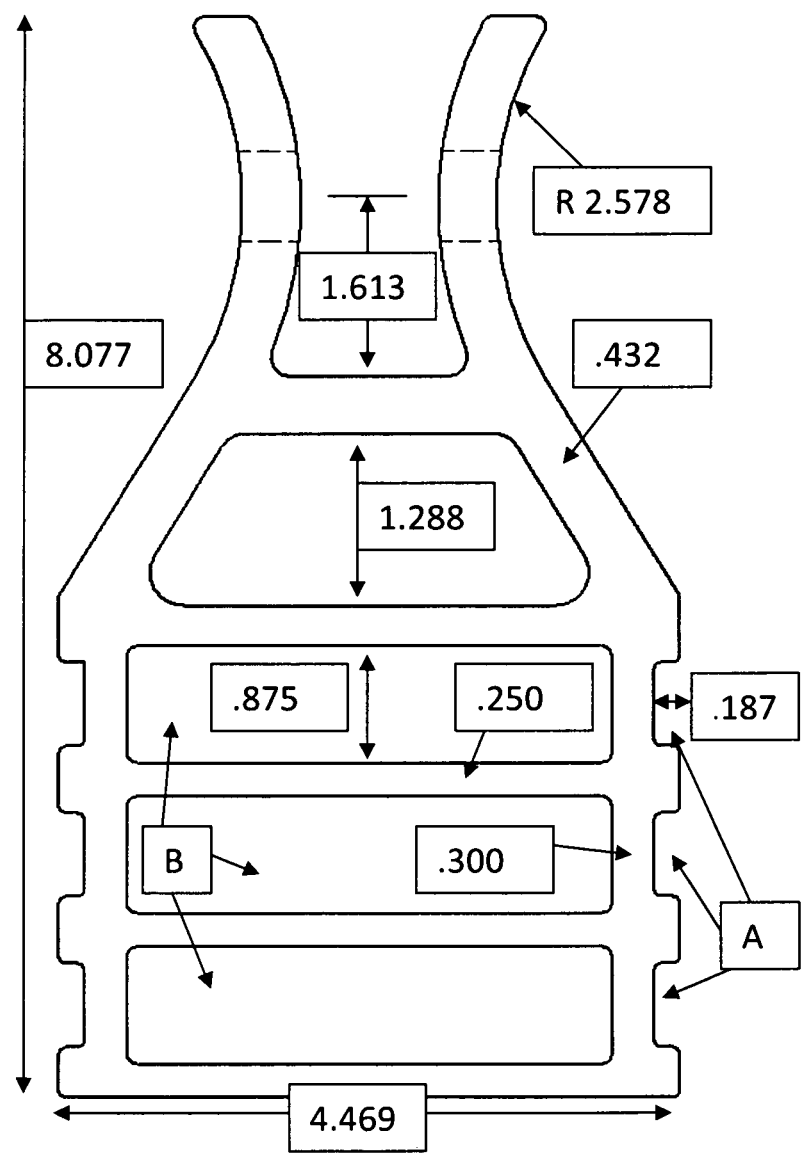
FIG. 35 shows an SEP for swage connection—Print.

Note that FIG. 34 shows a 11,000 lb. capacity strut end piece 16 designed to be attached to the strut 14 with fasteners, while FIG. 35 shows a concept of an extruded version designed to be attached with a swage connection-type fastening system. The swage connection style would be designed so that the strut 14 attached to the bottom of the strut end piece 16 (slid over the strut end piece 16) would be swaged (crimped) with appropriate tooling such that the small extruded side ripples and larger horizontal rectangular rectangles of the hand drawn right graphic would interface with the strut 14, "locking" it onto the strut end piece 16.

The other designs of strut 14/strut end piece assemblies utilize fasteners to connect the strut 14 to the strut end pieces. In the swaged connection joint, the strut end piece 16 is designed such that there are surfaces 26 and/or indentations on as many of the sides as necessary to create the joint between the strut 14 and strut end piece 16 (all four sides in the illustrations below are designed to provide attachment means).

The Manufacturing Process can Take on Several Forms:

The Strut End Pieces may be extruded and sawn to length, or produced by die casting or other means (the examples shown below are extruded). If extruded (a 6000 series alloy would be a common one to consider, perhaps 6005, although other alloys could certainly be used depending on strength considerations), normally the extrusion will be artificially aged to T5 or T6 prior to sawing to length (once "aged" to a higher strength level, it is generally easier to saw the parts; unaged parts may certainly be fabricated, but tend to create larger saw burrs due to softer base material).

The Strut 14 will most likely be extruded from a 6000 series aluminum alloy (such as 6005), and either aged immediately after the extrusion process (T5 or T6) or, to improve formability and reduce sensitivity to cracking upon forming, it is possible that the unaged strut 14 and likely unaged strut end pieces may be assembled into a strut 14/strut end piece(s) assembly, and "swaged", with artificial aging following this process (the "softer" strut 14 will be more easily formed into the crevices, hollows and indentations of the strut end piece 16 if unaged).

The fixturing of the strut 14 and two strut end pieces allows very accurate length control of the final assembly, as the distance between the fasteners extending through the fins on the strut end pieces defines the effective length of the strut assembly, and this in turn defines the accuracy of the geometry of the solar frame.

The swaging process can occur in one motion or multiple. These sorts of swaging operations are generally performed in parts which are fixtured or otherwise clamped, with the hydraulic, pneumatic, mechanical or otherwise actuated swaging action powering either hard metal swage tools or hard/tough (yet elastic under swaging loads) elastomeric "dies".

Looking at the figures below, for example, the swage tooling creating the "C" swage indentations will likely occur simultaneously on both "C"s, and those creating the "D" swage indentations will likely occur simultaneously on both "D"s. The "C" and "D" swages may occur one after another or at the same time, depending on the design of the system (hydraulic system capabilities for example).

A. The example shown is an extruded and sawn to length strut end piece 16 but could be die cast or manufactured by other means. The side indentations shown at the "A" locations are designed so that a tubular (likely rectangular) strut 14, slid over the strut end piece 16 could be swaged from the left and right as shown to "lock" the tubular strut 14 onto the strut end piece 16. This could be done hot or cold, immediately after extrusion and sawing to length, perhaps followed by artificial aging, or after extrusion, sawing to length and aging had already occurred.

The Aluminum Design Manual does not have equations to define how much force this sort of connection would support, which would require samples and experiments to determine statistically supported joint strength.

The swaging dies could be actuated pneumatically, hydraulically, mechanically or by other means, and could have hard surfaces 26, or somewhat yielding elastomeric surfaces 26 designed to "dent" the material into the indentations.

B. The hollows are extruded into the strut end piece 16 so that the strut 14 can also be swaged onto the front and back surfaces 26 into these indentations, further strengthening the total swaged joint.

C. These surfaces 26 of the extruded strut (shown as a rectangular extrusion) are to be indented by the swaging tools into the "A" indentations on the strut end piece 16.

D. These surfaces 26 of the extruded strut 14 (shown as a rectangular extrusion) are to be indented by the swaging tools into the "A" indentations on the strut end piece 16.

Note that the example strut end piece 16 and strut 14 shown are designed for a 10,000+ lb strut joint, although as noted under "A", the connection strength must be verified by testing and statistical analysis. For example, the tensile and compressive stress on the strut 14 is under 7,500 psi with a capability for 6005T6 of almost 20,000 psi.

FIG. 35 shows an example of extruded strut end piece 16 designed for swaged.

Figure 36:
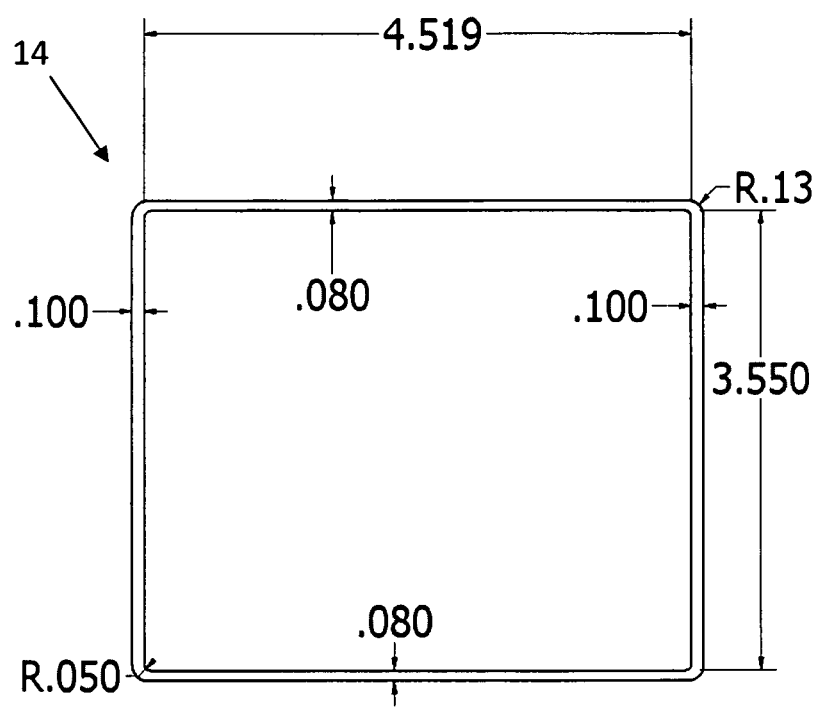
FIG. 36 shows an extruded rectangular strut.

FIG. 36 shows an example of rectangular extruded strut.

Figure 37:
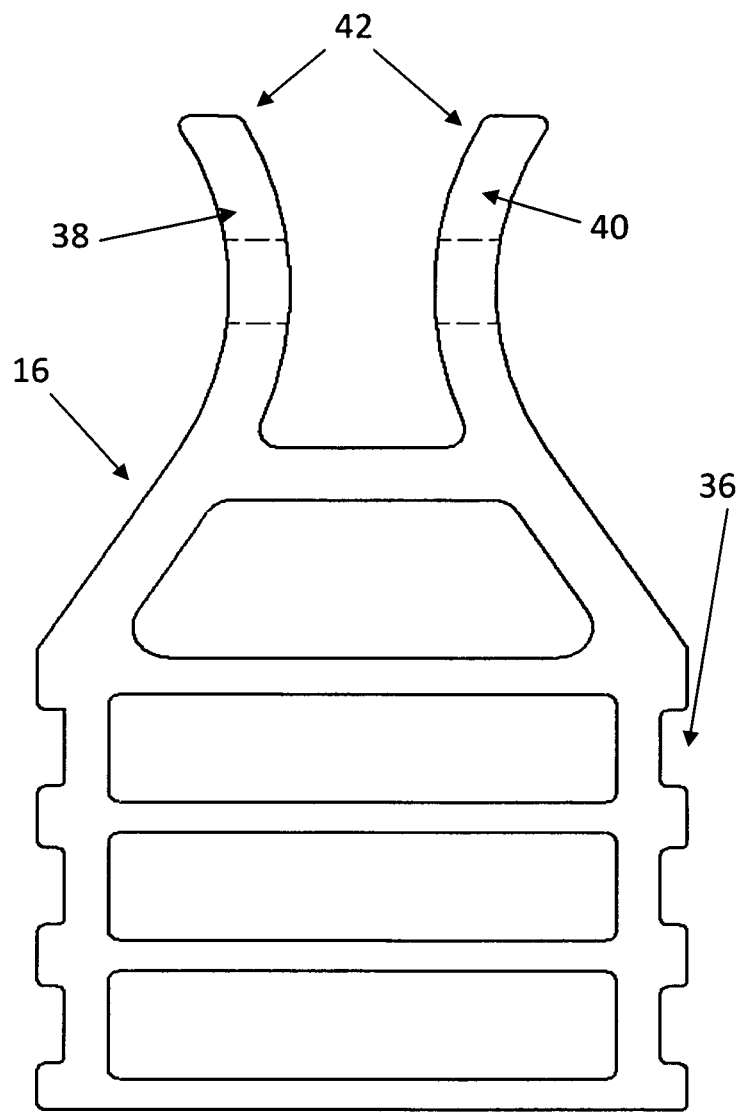
FIG. 37 shows an SEP for swage connection.

FIG. 37 shows an example of cross section of strut end piece 16 designed for swaged connection.

Figure 38:
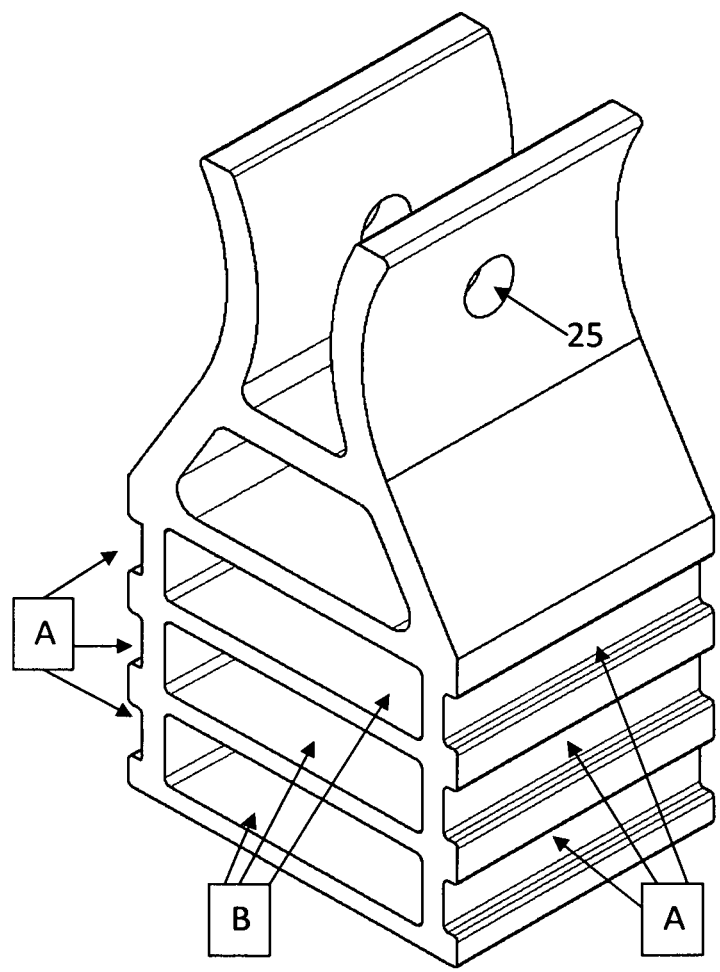
FIG. 38 shows an SEP for swage connection—3D.

FIG. 38 shows an example of 3D view of cut to length strut end piece 16 designed for swaged connection.

Figure 39:
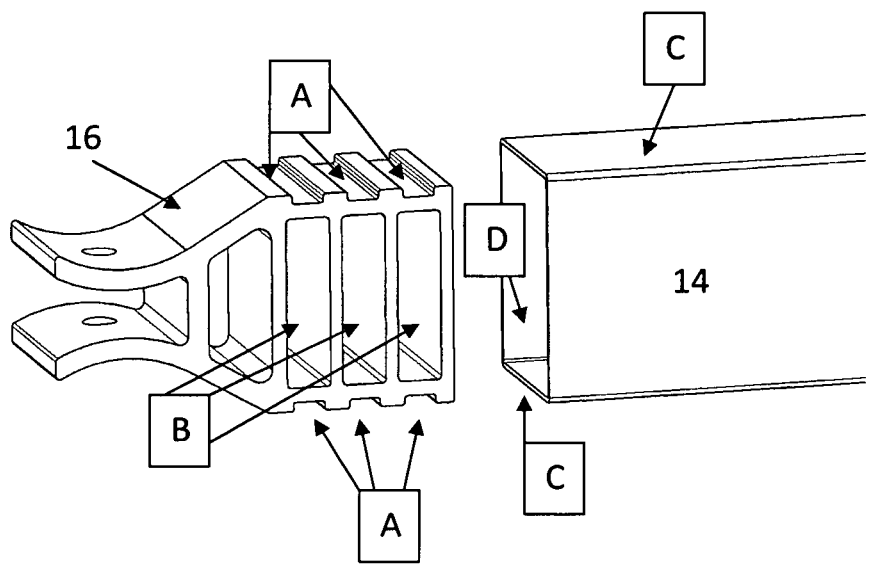
FIG. 39 shows a Swage SEP & rectangular strut—3D.

FIG. 39 shows a 3D graphical representation of strut end piece 16 designed for swaged connection about to be inserted into rectangular strut.

Figure 40:
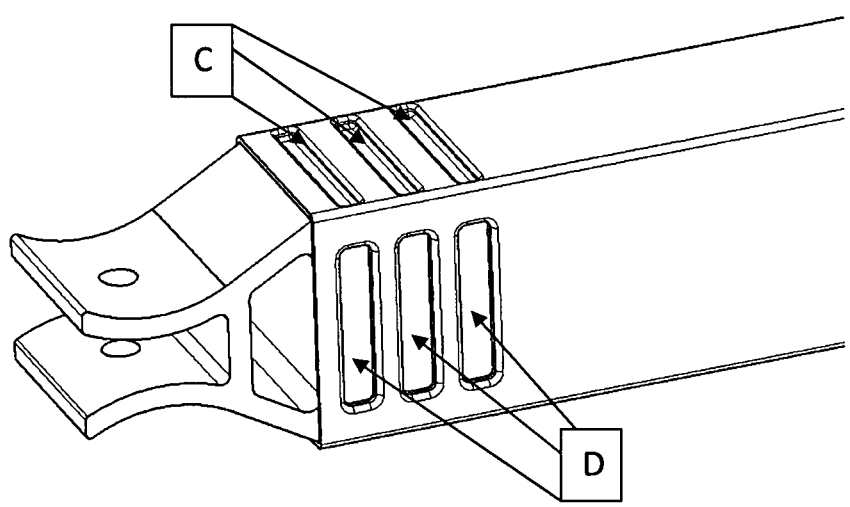
FIG. 40 shows a Swage SEP & rectangular strut assembly post-swaging—3D.

FIG. 40 shows a Strut end piece 16 designed for swaged connection inside strut after swaging dies have formed the strut (C&D) into the cavities (A&B) in the strut end.

Figure 41:
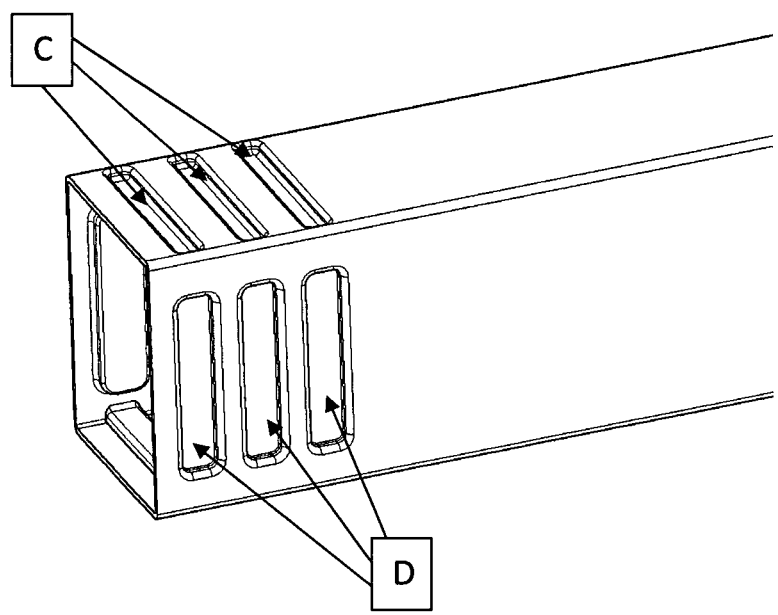
FIG. 41 shows a rectangular strut with swage deformations (SEP removed in drawing for clarity)—3D.

FIG. 41 shows the strut swaged onto the strut end piece 16 with the strut end piece 16 removed so that the effect of the swaging pushing the strut material (C&D's) into the cavities (A&B's) of the strut end piece 16 can be visualized (so that the ID of the strut can be seen)—note that in the real world this could not be seen without carefully cutting out the strut end piece 16 without damaging the swaged strut.

Angled "Knuckle" Hinge Connector:

The strut end piece 16 concept discussed in patent 61/190, 573 design used one, two or three "fins" (parts I1, I2, I3, I4, I5, I6 and I7) to connect to the support sleeves (Parts D, E, G & H; see FIGS. 1a, 1b and 2). This design concept used two strut end pieces fastened to either end of each strut 14, with single holes pierced through the strut end piece 16 to match the hole pierced in the corresponding support sleeve 10. The fins on the strut end piece "layer" with the fins on the support sleeve 10. For example, three fins on the strut end piece 16 might match up with two fins on the corresponding support sleeve 10, creating four fastener shear points.

Figure 42:
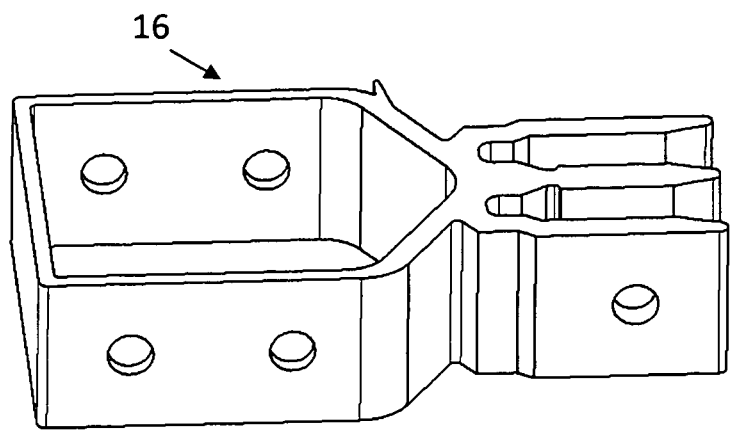
FIG. 42 shows a three fin Strut End Piece (SEP)—3D.

FIG. 42 shows an example of a three finned strut end piece 16.

Figure 43:
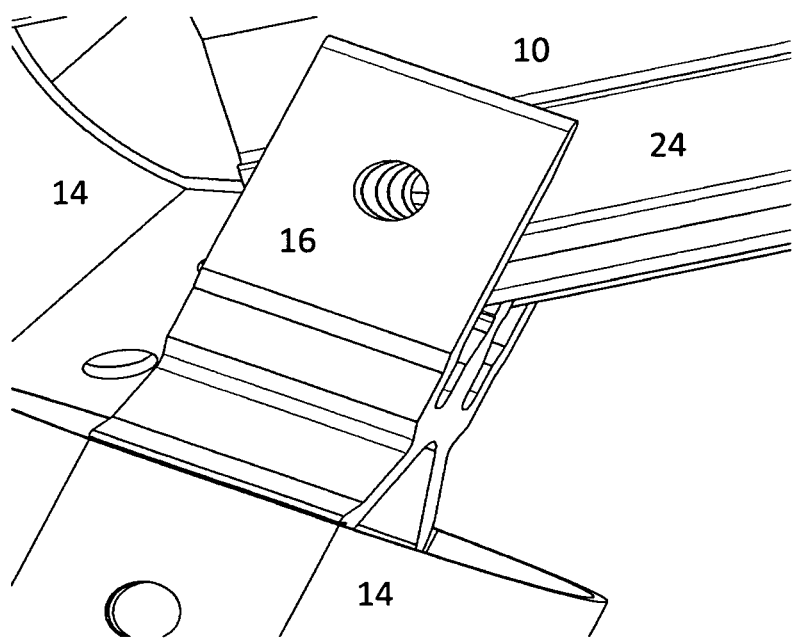
FIG. 43 shows a three fin strut end piece with 2 two fin sleeve assembly—3D.

FIG. 43 shows a three finned strut end piece 16 shown slid into two finned support sleeve 10 (not yet fastened to allow "layering" to be seen).

Figure 44:
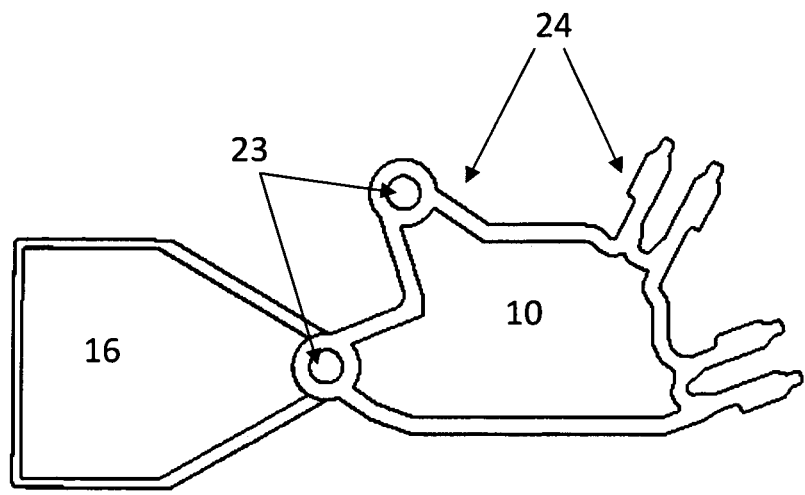
FIG. 44 shows a knuckle sleeve connection—front.
Figure 45:
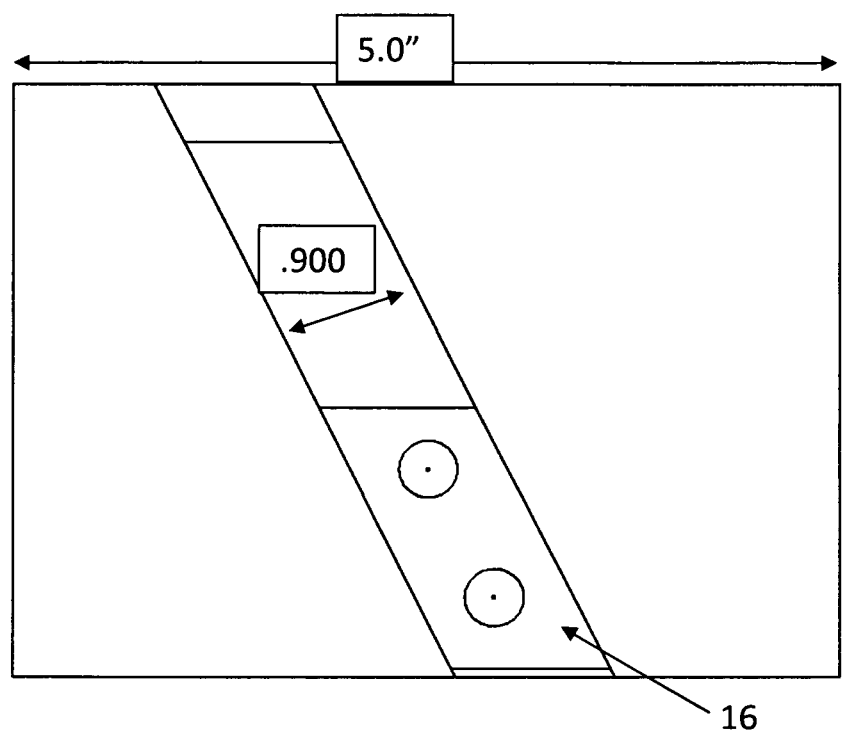
FIG. 45 shows an SEP for knuckle and how it could be miter cut with fastener holes added.

FIG. 44 shows an end view of Angle Cut "Knuckle" and Support Sleeve (Part G in this case) extrusion, joined with a pinned connection. Note that the right half of Part G has the original "fins" while the left hand demonstrates the, likely extruded, connection method described as the "Knuckle" hinge.

NOTE THAT THIS FIGURE AND MANY THAT FOLLOW SHOW BOTH THE "KNUCKLE" DESIGN AND THE PRIOR MULTIPLE SLEEVE FIN DESIGN ON THE SAME PART, SO THAT THE "KNUCKLE" CONCEPT CAN BE UNDERSTOOD; THEY WILL NOT NECESSARILY BE USED ON THE SAME PARTS OR EVEN ON THE SAME SOLAR FRAMES

The Angled "Knuckle" hinge connector is designed as an alternative to the finned connections designed in the various designs, where appropriate and advantageous. The sleeve 10 is angle slotted, while the strut end pieces are extruded and cut on an angle.

Potential advantages of this design concept is that the circle size of the components is minimized, as the necessary "hole-to-edge" distances are different (smaller circle sizes are able to be extruded on smaller presses; on the other hand, the components have more voids, making extrusion slightly more difficult and tooling more expensive. Another advantage is that a single pin fastener can be used to attach multiple strut end pieces to a common sleeve 10, reducing parts and perhaps assembly time.

Compared to the patent application 61/190,573, the angled "Knuckle" hinge connector allows the strut 14 to be automatically placed at the proper angle and has the main advantage of providing extra bearing surface for the pin to strut end piece 16 and back to "ground" connections. This connection allows a single, but larger diameter pin to be used—vs—one fastener for each connection with the fastener often requiring finned connections to achieve multiple shear points to carry the load. While these finned connections can also use larger diameter pins to thus require fewer shear points, the fabricated hole-to-edge requirements cause the "fins" to lengthen, hindering extrudability (the die "tongue" ratio increases).

The additional, likely extruded, holes in the support sleeves and strut end pieces and the fabrication required (miter/angled cutting the strut end piece 16 and "notching" the support sleeve) is marginally more difficult than the straight cuts and piercing operations for patent application 61/190,573 but the reduction in bearing loads and the use of single pins for one, two or three connections may offset this.

Figure 46:
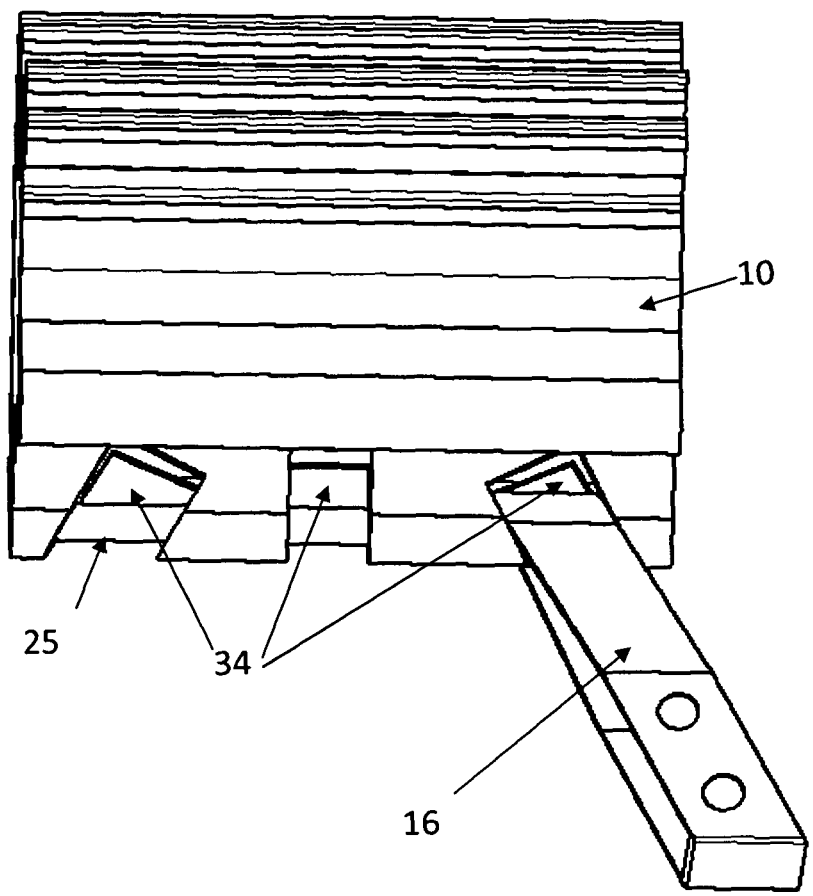
FIG. 46 shows Part G with slots for knuckle joint—3D.

See FIG. 46 for an example of a strut end piece 16 pinned to a support sleeve (Part G). Please note that the support sleeve 10 is drawn with both the original "two fin" design for the right most and top right connection point but with the new "knuckle" configuration for the left most and top left connection point. For purposes of illustration, a solid fastener is shown connecting the two. The strut end piece 16 is at the left of the illustration.

The "Knuckle" hinge connector uses a single pin inserted through a hole (likely extruded, but could be added later) in the support sleeve 10 and the corresponding holes (again, likely extruded but could be added later) in the one, two or three strut end pieces connected to that particular support sleeve 10 plane.

Figure 47:
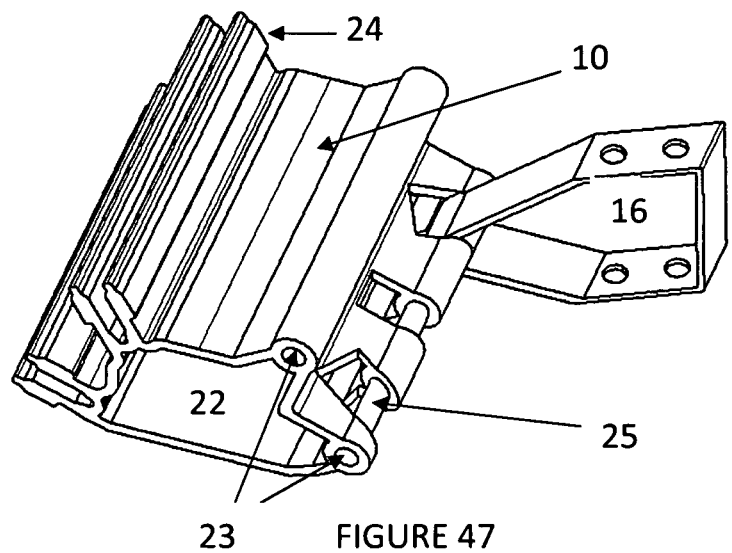
FIG. 47 shows Part G with slots for knuckle joint—top/side 3D view.
Figure 48:
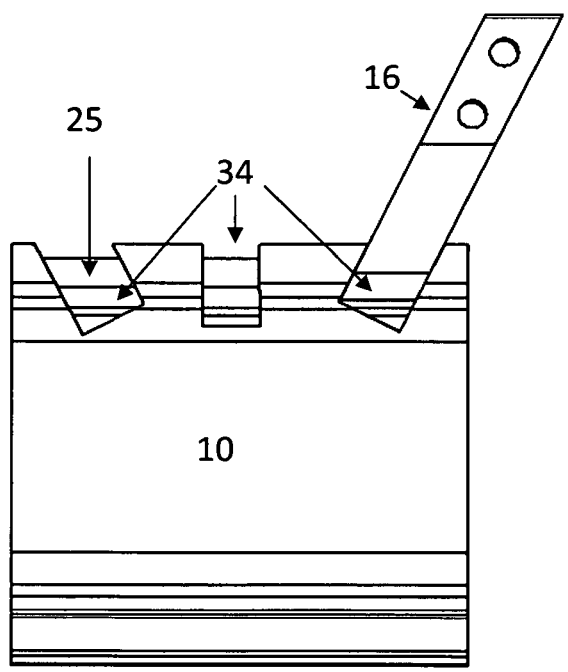
FIG. 48 shows Part G with slots for knuckle joint—bottom view.
Figure 49:
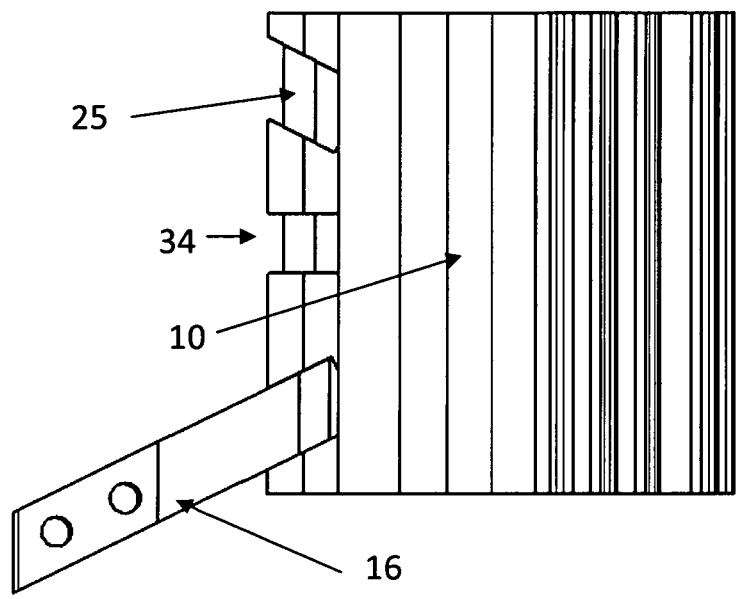
FIG. 49 shows Part G with slots for knuckle joint—top view.
Figure 50:
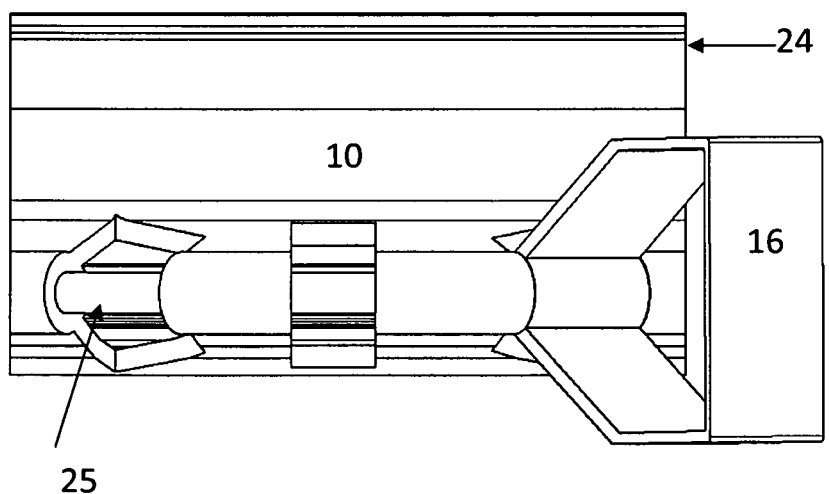
FIG. 50 shows Part G with slots for knuckle joint—side view.
Figure 51:
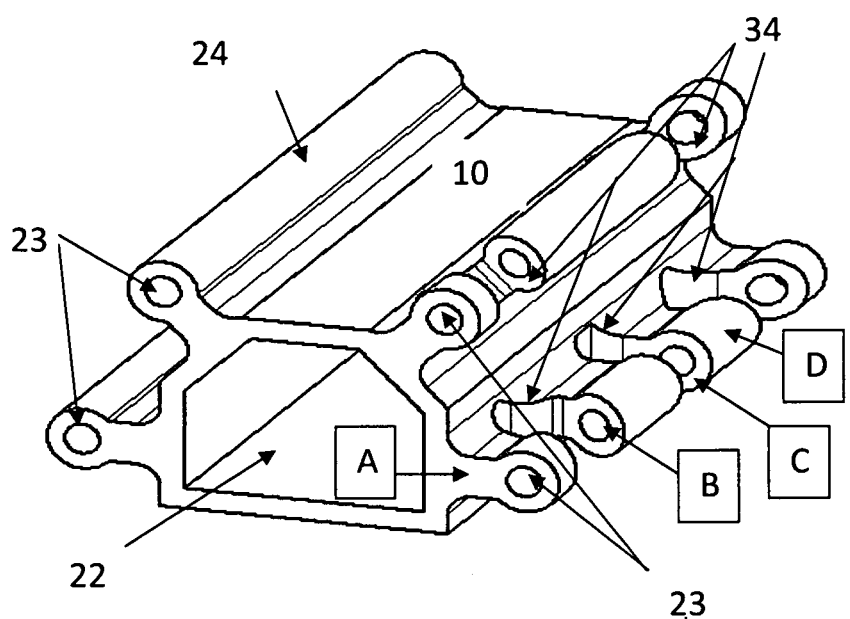
FIG. 51 shows modified Part G hollow for knuckle joint top/side view.
Figure 52:
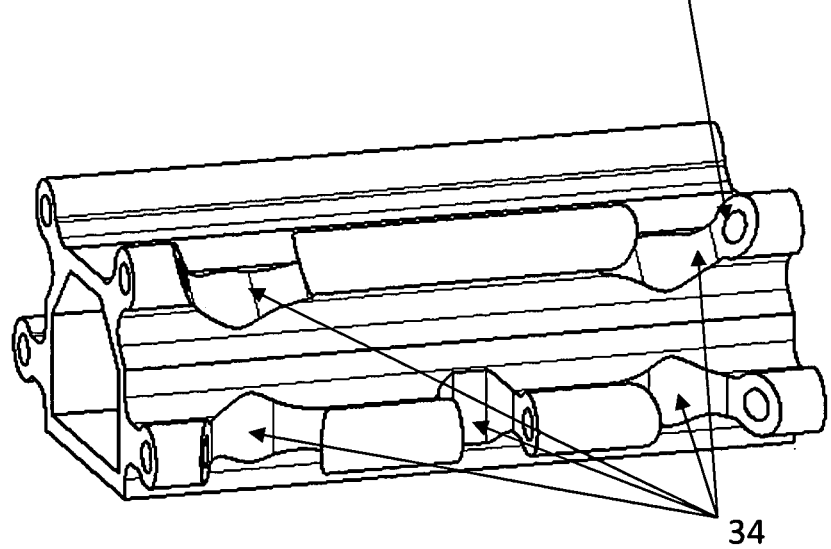
FIG. 52 shows modified Part G hollow for knuckle joint side view.
Figures 53, 54:
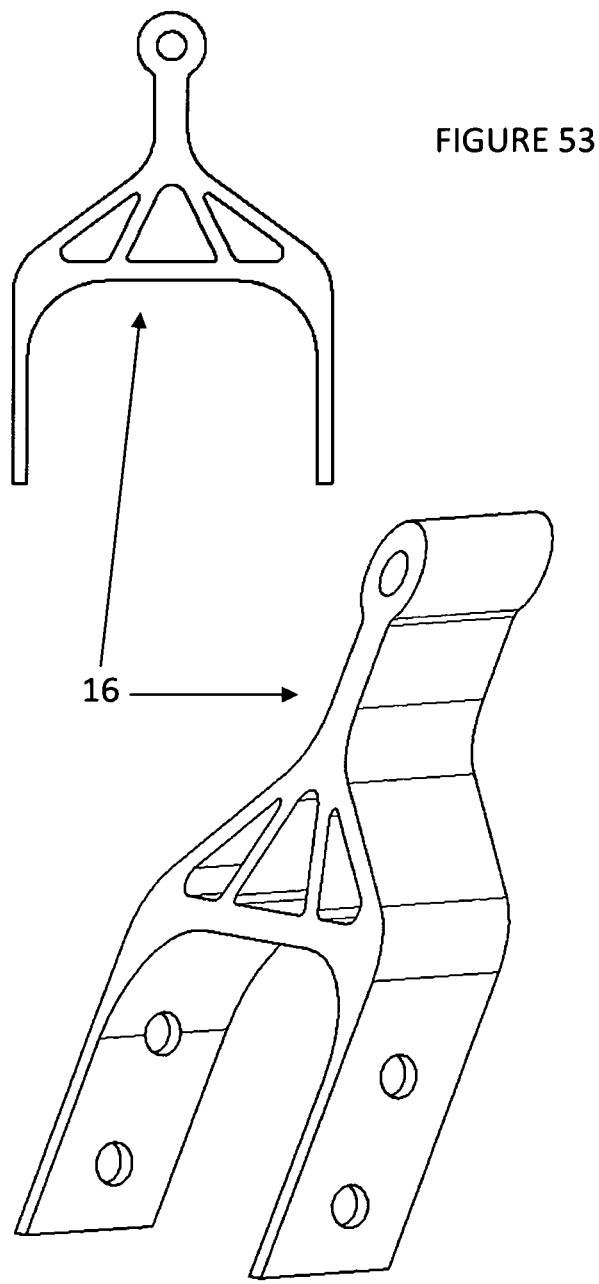
FIG. 53 shows an SEP for knuckle joint.
FIG. 54 shows an SEP for knuckle joint—side 3D view also showing miter cut.
Figure 55:
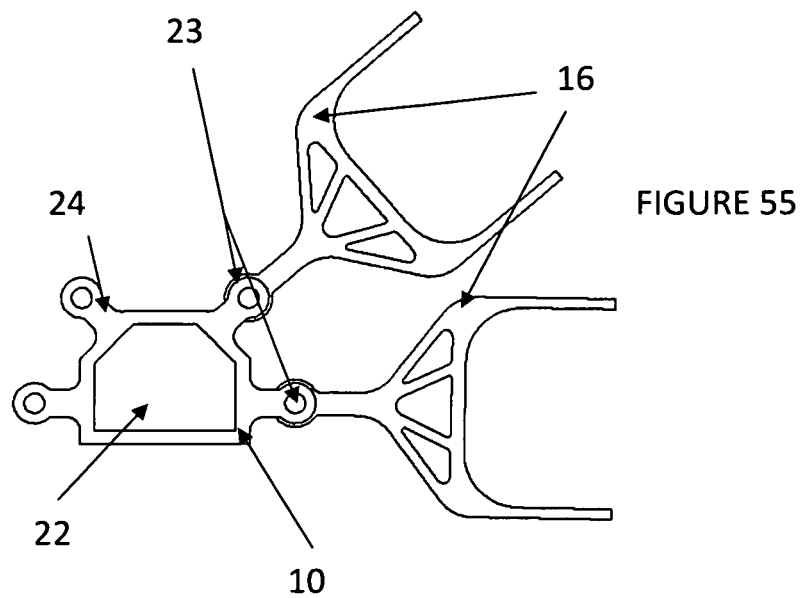
FIG. 55 shows modified Part G hollow fin knuckle joint assembly—front view.
Figure 56:
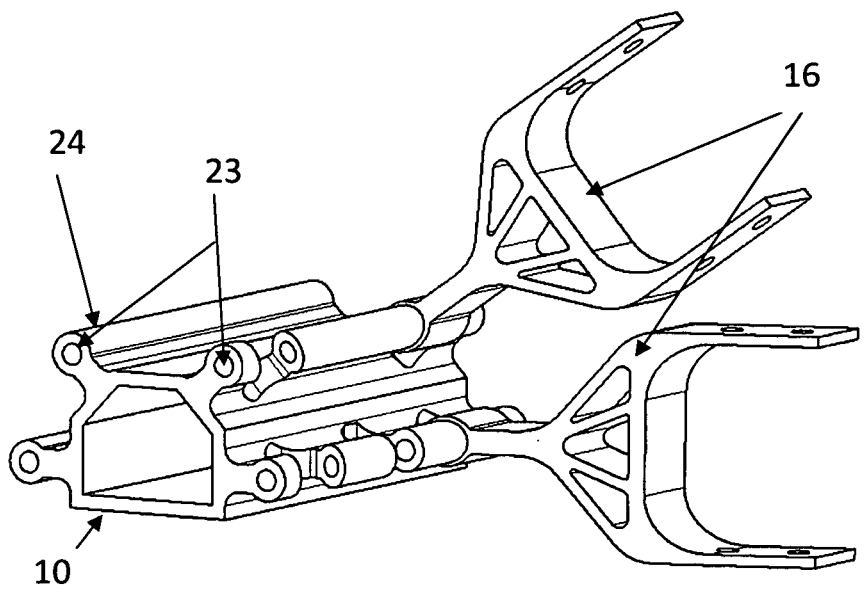
FIG. 56 shows modified Part G hollow fin knuckle joint assembly—side 3D view.
Figure 57:
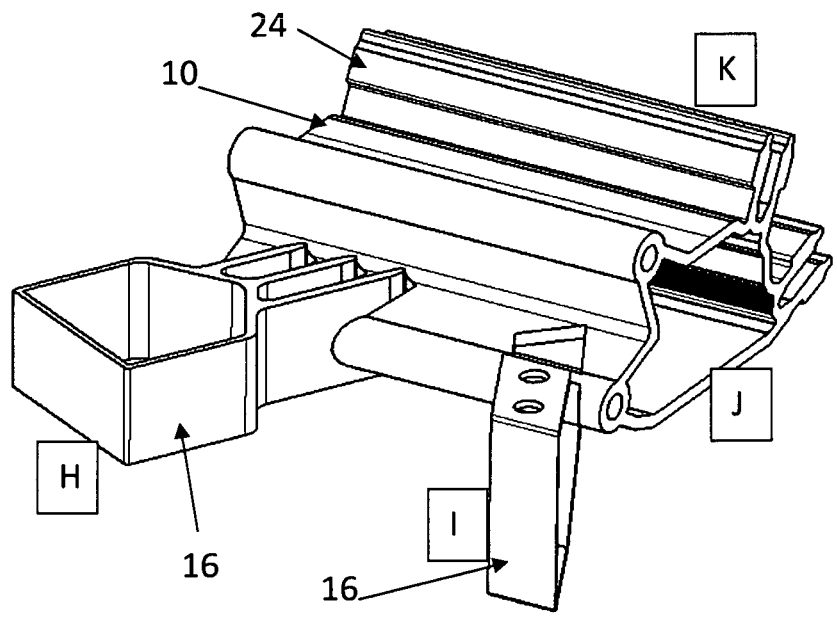
FIG. 57 shows Part G hollow fin knuckle joint variant—3D.
Figure 58:
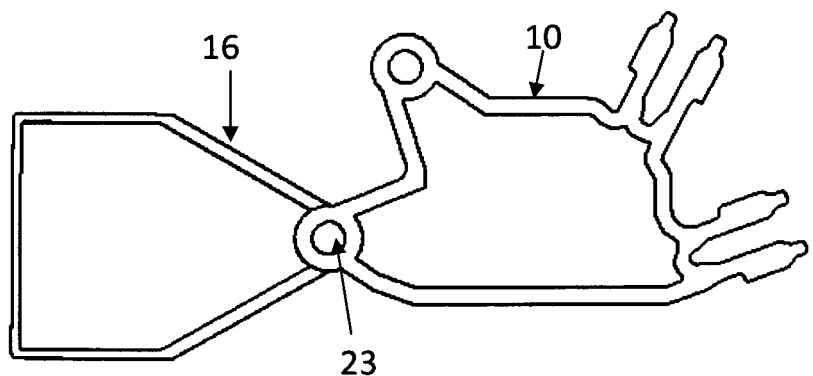
FIG. 58 shows Part G hollow fin knuckle joint variant—front view.

The strut end pieces are extruded and then angle cut to the appropriate angle to match the required angle for the solar frame assembly (see FIG. 46). Note that while the cut strut end piece 16 is thus angled, the hole through the "hinge" portion remains in the proper orientation for connection to the corresponding support sleeve 10. The support sleeves are extruded and cut to length. They then go through a secondary "slotting" operation (milling or a series of saw blades appropriately angled will create the proper slot configuration)—see FIG. 47 for a representation of these slots and an assembly of the support sleeve G, strut end connector and pin.

Inserting the angle cut strut end piece 16 into the strut end and fastening is straightforward; as in the prior patent design, the strut end pieces are inserted with their flat portions matched to the corresponding flat portions of the strut ID's. The strut 14 and two strut assemblies are placed onto a jig/fixture, which lines up the existing (likely extruded) holes in the strut end pieces and locates the strut end pieces axially along the strut 14 to accurately space them apart, such that the hole-to-hole distances in the (likely extruded) holes of the strut end pieces create a strut assembly of exactly the proper length.

The three pieces (strut 14 and two strut end pieces) are clamped and the fastening holes are drilled through the strut 14, through both flat fastening portions of the strut end piece 16 and through the opposite wall of the strut 14. The drills retract and fasteners are inserted and actuated (bolts, rivets, interference pins or other fastening devices), while the assembly is still clamped.

During the frame assembly, the support sleeves are slid onto and fastened to the main support members in the proper orientation. One, angle cut, end of the strut assembly is slid into the appropriate slot 34 on the support sleeve 10, and a fastener is inserted through the (likely extruded) hole in the support sleeve 10 and through the (likely extruded) hole in the angle cut (some pieces are straight cut) strut end piece portion of the strut assembly. Subsequent strut assemblies can be attached to the same support sleeve 10 by then sliding their strut assemblies into the next slot 34, engaging the fastener through it, etc. . . .

FIGS. 47-50 show alternate view angles of the assembled miter/angle cut strut end piece 16, slotted support sleeve (Part G) and pin.

Other graphics showing the "Knuckle" hinge strut end piece 16 connections, showing the sleeve 10, strut end piece 16 and fastener (labeled as "pin"). Note that the strut end piece 16 angle—vs—the axis of the sleeve 10 is determined by the angle notch in the sleeve 10 and the strut end piece angle cut, while the angle "up and down" rotated around the fastener adjusts to meet the requirements of the other end of the strut end piece/strut/strut end piece.

Knuckle Graphics Explanations (see FIGS. 51-58):

Rather than having fins on the chord 12 or on the sleeve 10 each fastened to the fins on the strut end piece 16, the concept is to use extruded and/or drilled/reamed/otherwise fabricated holes in the extrusion direction fastened through a similarly formed hole in the sleeve 10 (or chord 12 if it includes its own fin(s)).

The sleeve 10 would be extruded and cut to length with milled/sawn/otherwise fabricated slots angle cut (angle COULD be 90 degrees for certain struts) to accept the extruded and miter/angle cut strut end pieces. A common fastener is inserted through the matching "holes", fastening the sleeve 10 to one or more strut end pieces.

A. The fin 24 on the sleeve 10 would have to be designed such that the stress on the net area from tension pulling the attached strut end pieces away from the center of the sleeve 10 would resist the tensile forces.

B. When the strut end piece 16 is being pulled away from the sleeve 10 in tension, this area would have to be sized to resist the block shear failure.

C. When the strut end piece 16 is being pulled away from the sleeve 10 in tension, this area would have to be sized to resist tension on net area failure.

D. The remaining material and associated fastener diameter would need to be sized to ensure that the bearing stresses at the fastener contact point from tension or compression are below allowable material limits.

E. The thickness of walls and the cut length of the angle cut strut end piece 16 would need to be sized to resist tension on net area failure under maximum tensile load.

F. The thickness of the walls and the cut length of the angle cut strut end piece 16 would need to be sized to resist block shear failure under maximum tensile load.

G. The fin 24 wall thickness and cut length of the angle cut strut end piece 16 would need to be sized for tension on gross area (tension) and buckling considerations (compression).

H. This is an alternative strut end piece 16 concept where are one or more extruded fins on the strut end piece 16 which fit into fabricated slots in the sleeve 10—a fastener joins the two as in prior explanations.

I. This is the type of strut end piece 16 described in A-H.

J. The sleeve 10 is shown with a combination of the finned (K=multiple in this case, not single) attachment means and the "knuckle" just to see the two varieties.

The other graphics illustrate how the sleeve 10 with cut slots and the angle cut strut end pieces fit together.

Figure 59:
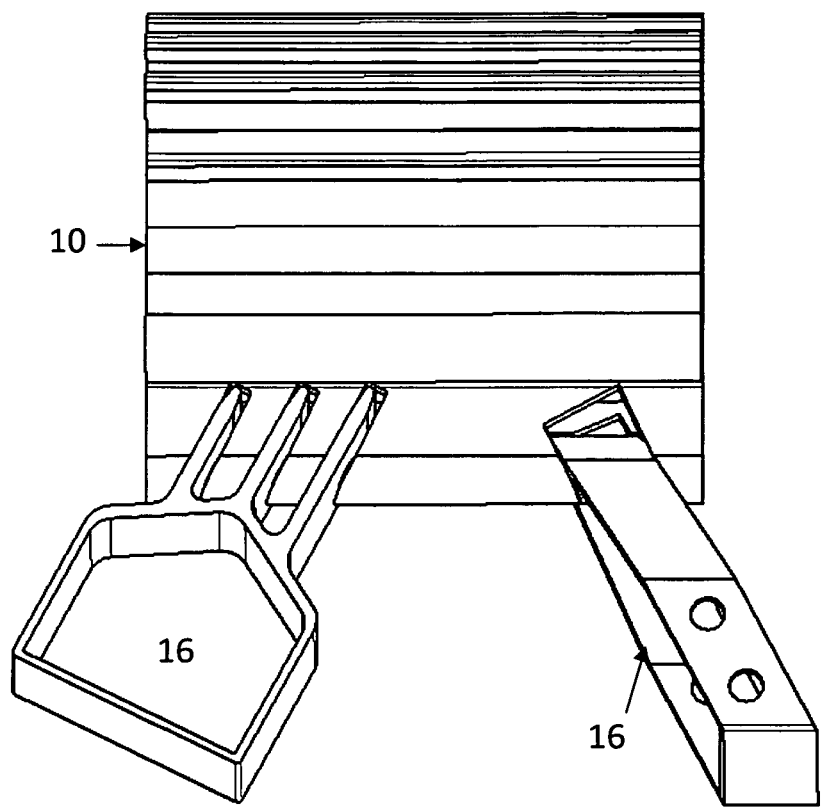
FIG. 59 shows Part G hollow fin knuckle joint variant—top view.
Figure 60:
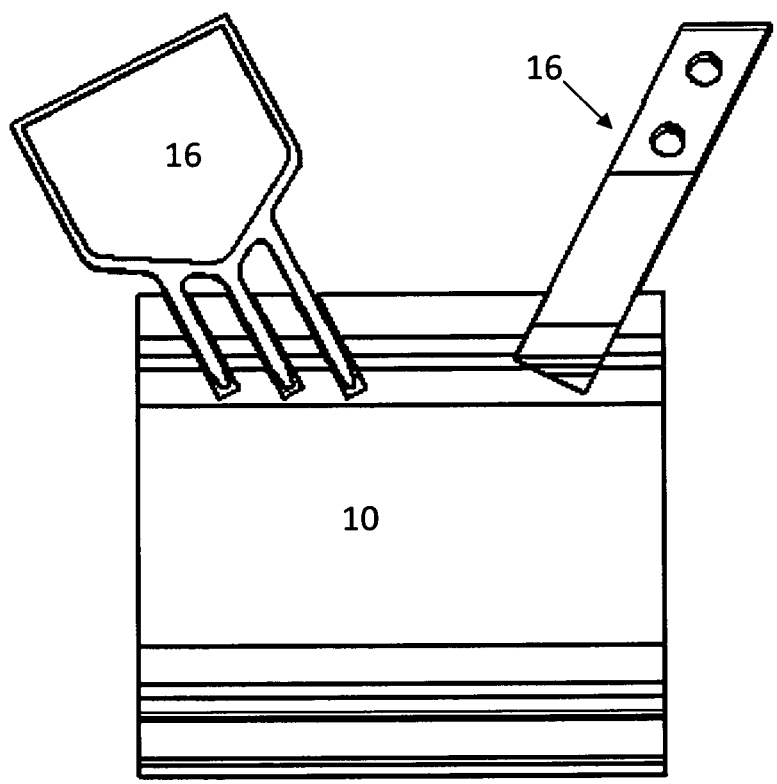
FIG. 60 shows Part G hollow fin knuckle joint variant—bottom view.

FIGS. 59 and 60 show an alternative design, where multiple shear points are created on a multi-finned strut end piece 16 (shown with the "Knuckle" design for contrast).

Figure 61:
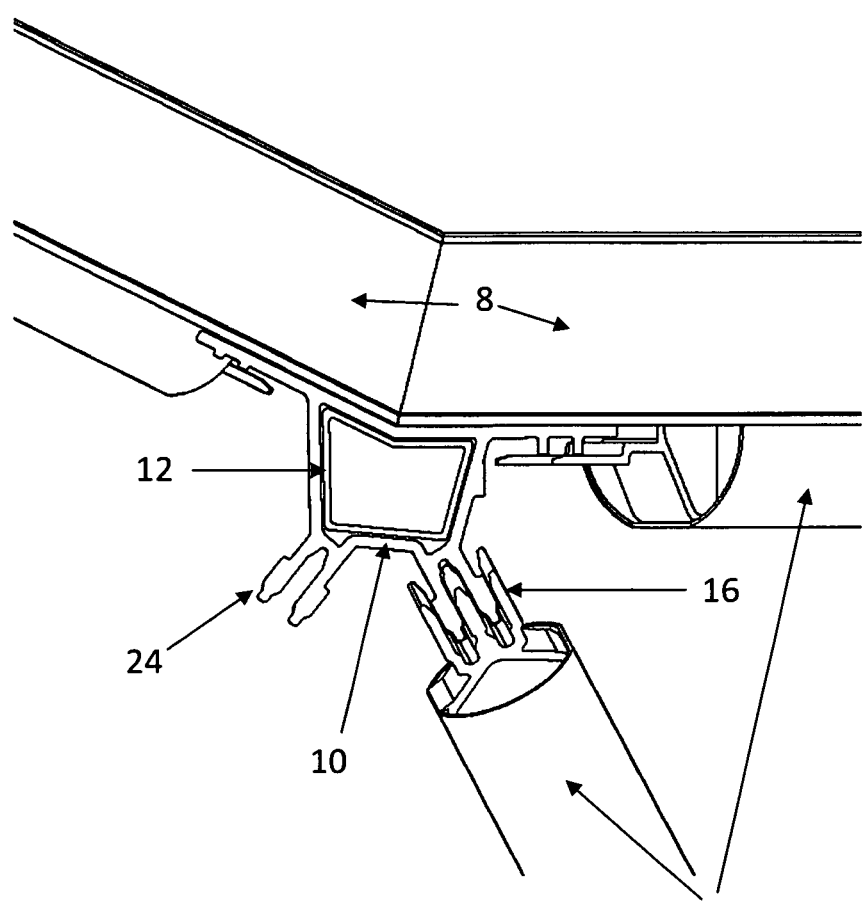
FIG. 61 shows prior patent component names.

FIG. 61 shows named components of the prior patent application Series 5 multifinned sleeve 10 and strut end piece design—useful to refer to re: nomenclature of the rest of this patent application. Note that this figure also shows the multiple parallel fins of the sleeve 10 and/or strut end piece 16. Depending on load characteristics and fasteners, the number of fins on the sleeve 10 or strut end piece 16 can be modified; for example, later in this patent application the single fin 52 sleeve 10 is discussed, with one or more fins on the mating strut end piece 16. In the original WES patent and frame design, single finned strut end pieces were shown inserted into a dual fin sleeve 10 arrangement.

Additional Alternative Struts and Strut End Piece Designs:

The use of the strut end piece 16 to join the strut 14 to the sleeve 10 allows additional design flexibility re: the mating surface of the strut 14 in terms of geometry and part design. Because the strut end piece 16 bridges the gap between the strut diameter and the sleeve 10 connection, each of these elements can thus be "optimized". For example, the strut end piece 16 to strut connection can be made via a "flat-to-flat" pinned, riveted, bolted or otherwise fastened, or it can be a curve-to-flat (or potentially even a curve-to-curve connection). This flexibility allows the struts to be optimized—for example, struts can be designed with thicker areas (flat or curved) through which the strut 14 to strut end piece fasteners pass, allowing the proper tension on net area, block shear and bearing stress allowable stresses to exist, allowing the strut 14 to be extruded in a lower lb/ft cross section while still handling these necessary design stresses AND allowing for the strut area and minimum moment of inertias to be optimized to handle compressive buckling (depending on the compressive force and the effective length of the strut 14, a minimum I and resulting minimum radius of gyration is required). Another example of this would be to use a strut 14 with either a flat or curved contact area for the strut end piece connection, and a modification to the tube to provide enhanced bearing area (a thickened subregion of the connection area) and means to transfer these loads efficiently to the remainder of the strut 14 to avoid localized failures due to overloading (bearing, block shear or even net tensile area).

By using the strut end piece 16 philosophy, the strut 14, strut end piece 16 and associated sleeve 10 geometries can be optimized. This patent application shows examples of various strut end piece 16 designs which can be used: standard strut end piece 16 inside a modified strut (with flats), "apple" shaped strut, "X-shaped" struts with extruded strut end piece 16 fastener holes to connect it to the strut 14, "knuckle" design (refers to the end which connects to the sleeve 10—the strut end piece 16 to strut connection is virtually the same as the standard strut end piece 16 inside a modified strut (with flats).

Apple Strut (FIGS. 62*a*, 62*b*, 62*c* and 62*d*):
A. In extrusion minimum wall thicknesses are established for various reasons, including handling of the not yet aged extrusions which can be very delicate while emerging hot from the extrusion process.
B. The thickened portions of this shape allow thinner overall wall thicknesses while still providing secure points to support the hot extrusion during production.
C. The indented portion 60 of the strut 14 can have thicker walls to provide additional bearing support for the strut 14 to strut end piece 16 fasteners. The design is "balanced" regarding Ix/Iy (moments of inertia), optimizing compressive buckling resistance of the strut tube while minimizing strut weight. The indented portion 60 also allows for a narrower strut end piece 16 (see D).
D. The narrower strut end piece 16 allows for more "linear" transfer of tensile and compressive loads between the strut end piece legs and strut end piece fins, improving load transfer and minimizing bending moments in the strut end piece 16, reducing overall deformation and stresses within the part.

Figure 62A:
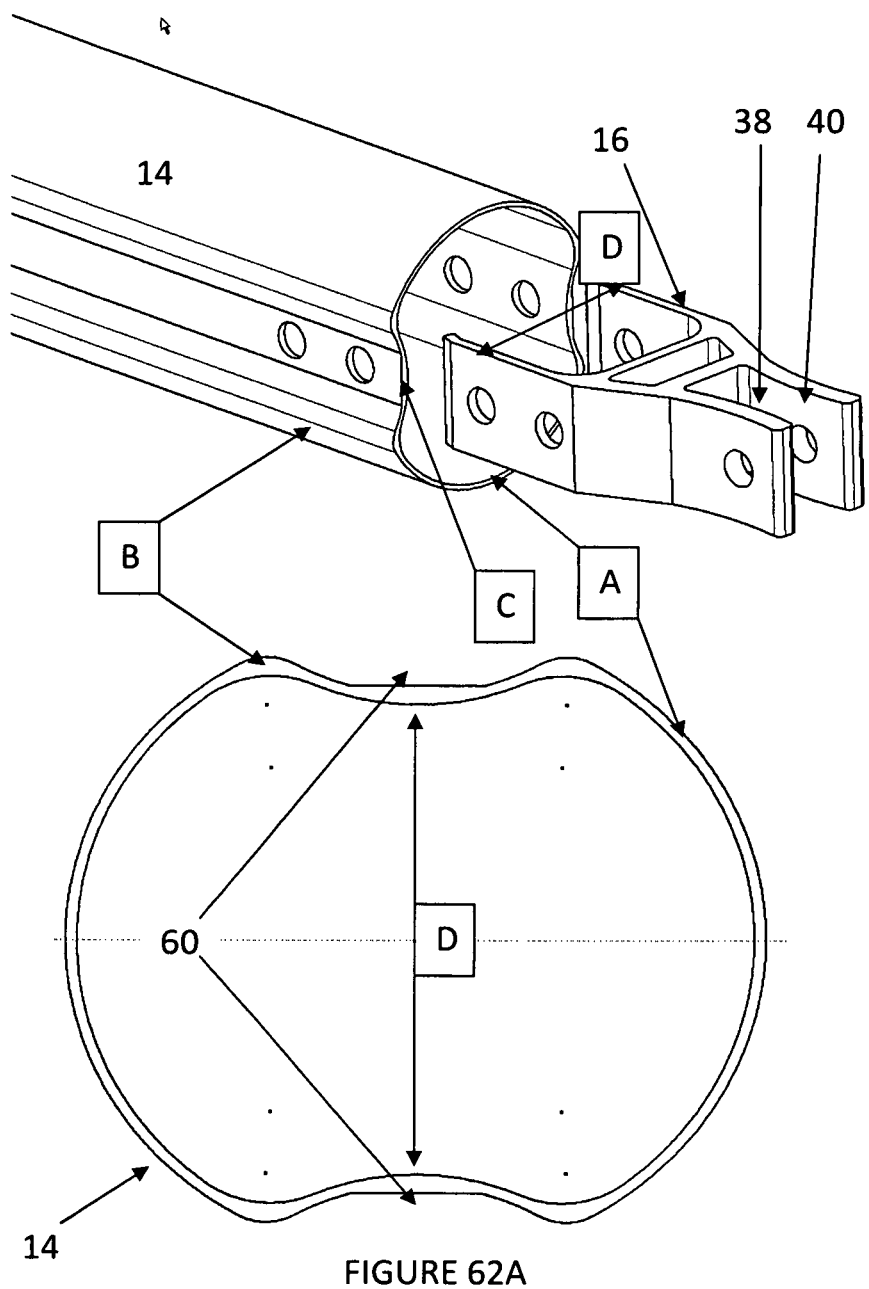
FIG. 62a shows an Apple Strut with SEP and 3D.
Figure 62B:
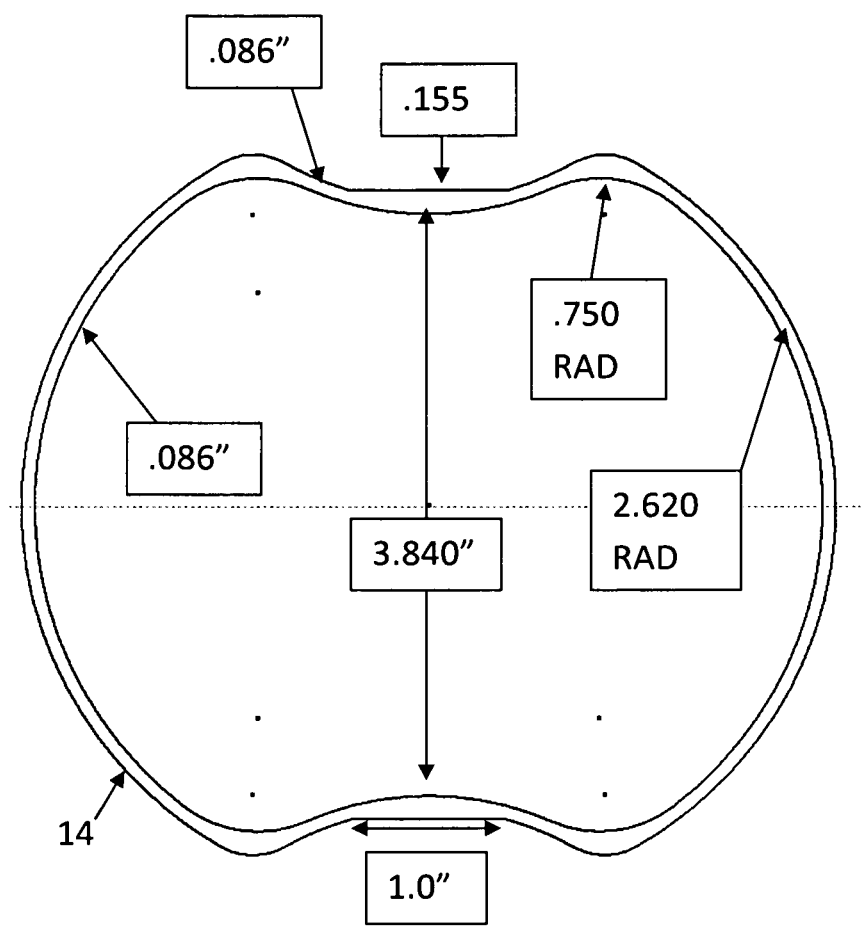
FIG. 62b shows an Apple Strut—print.

FIG. 62*b* shows the "Apple" Strut shape. This design "balances" the Ix/Iy and minimizes the lbs/ft of the shape. The design uses a larger basic OD and slightly smaller wall thickness than a simple tube design—the smaller wall thickness is acceptable from an extrusion viewpoint because the shape is designed to run out on the heavier "tips", which eliminates the denting issues of concerns with lighter walls on tubular shapes. The top and bottom have thickened walls to provide the necessary bearing strength from the fasteners connecting the strut end piece 16 to the "apple" strut.

Another advantage of the "Apple" strut shape is that a smaller strut end piece 16 width can be used, leading to a more "direct" transfer of loads from the sleeve 10 to the strut, via the strut legs more "in line" with the sleeve 10, limiting internal deformation of the strut end piece 16.

Figure 62C:
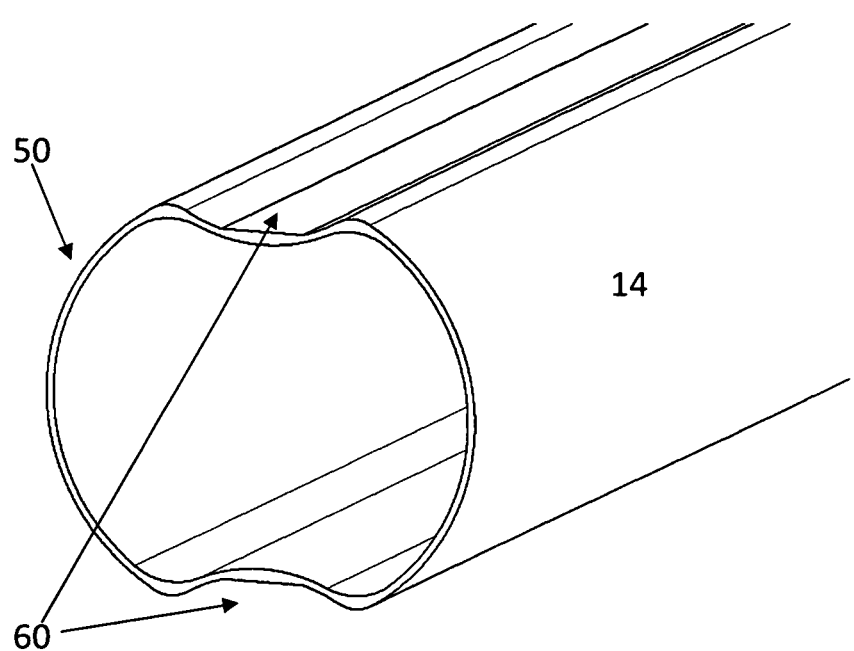
FIG. 62c shows an Apple Strut—3D.
Figure 62D:
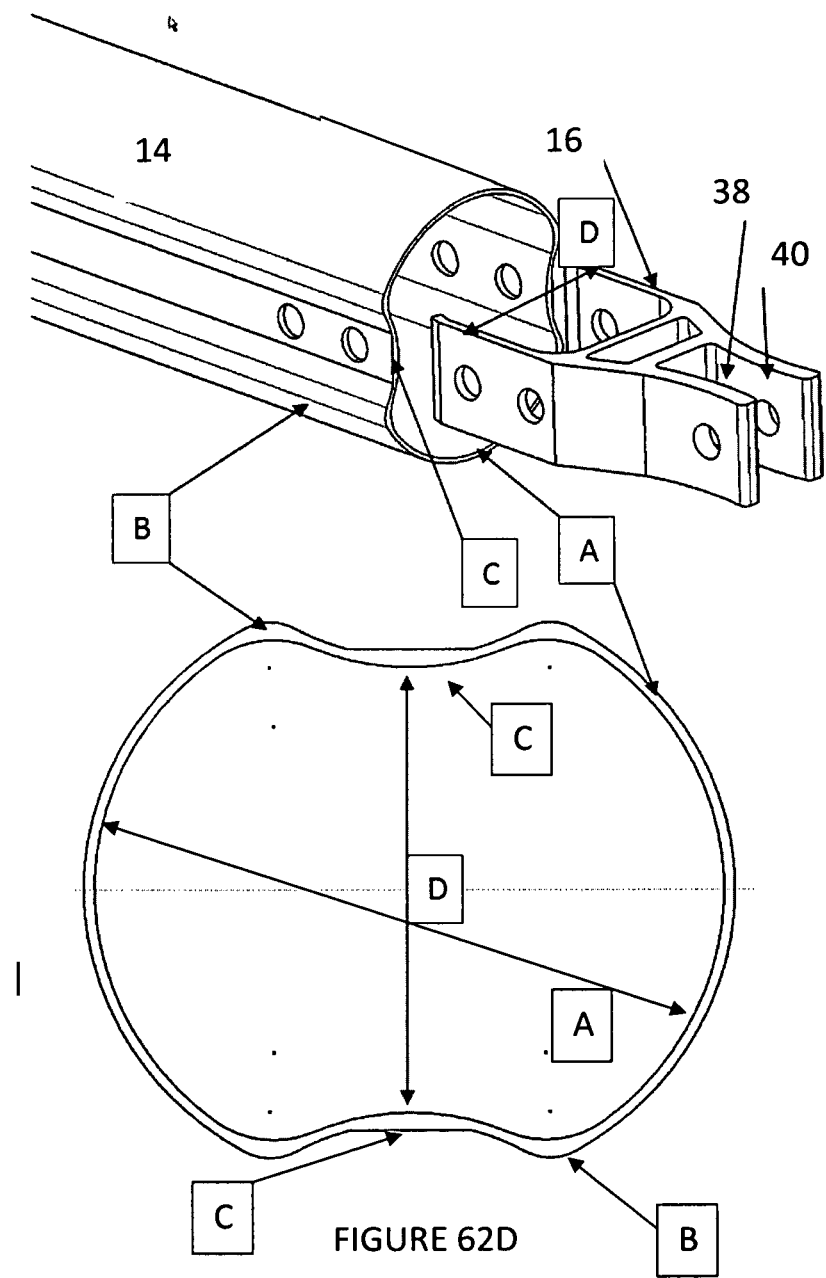
FIG. 62d shows an Apple Strut with SEP and 3D.

FIG. 62*c* shows the "Apple" Strut shape. This design "balances" the Ix/Iy and minimizes the lbs/ft of the shape. The design uses a larger basic OD and slightly smaller wall thickness than a simple tube design—the smaller wall thickness is acceptable from an extrusion viewpoint because the shape is designed to run out on the heavier "tips", which eliminates the denting issues of concerns with lighter walls on tubular shapes. The top and bottom have thickened walls to provide the necessary bearing strength from the fasteners connecting the strut end piece 16 to the "apple" strut.

E. In extrusion minimum wall thicknesses are established for various reasons, including handling of the not yet aged extrusions which can be very delicate while emerging hot from the extrusion process. As the profiles get larger and heavier, larger wall thicknesses are desired to ensure that as the hot, softer, not yet aged extrusions are handled across the extrusion handling system, they do not dent. For example, one prominent extruder prefers wall thicknesses of over 0.100" for tube diameters greater than 4".
F. The thickened portions of this shape allow thinner overall wall thicknesses while still providing secure points to support the hot extrusion during production.
G. The indented portion 60 of the strut 14 can have thicker walls to provide additional bearing support for the strut 14 to strut end piece fasteners. The design is "balanced" regarding Ix/Iy (moments of inertia), optimizing compressive buckling resistance of the strut tube while minimizing strut weight. The indented portion 60 also allows for a narrower strut end piece 16 (see D).
H. The narrower strut end piece 16 allows for more "linear" transfer of tensile and compressive loads between the strut end piece legs and strut end piece fins, improving load transfer and minimizing bending moments in the strut end piece 16, reducing overall deformation and stresses within the part. The narrower this part is (the "D" dimension), the more linear the force transfer, the less the bending moments and thus the less deflection and material stress. The "Apple strut" allows the use of a much narrower strut end piece 16 compared to a simple tubular strut 14.
I. The "nominal" tube dimension is much greater than the narrowed "D" dimension. A strut end piece 16 designed to span the "E" dimension would be MUCH wider than that for the "D" dimension, causing greatly increased bending moments in the strut end piece 16, leading to greater part deflection and material stresses. Simply put, the strut end piece 16 would need to be MUCH heavier (thicker walls, etc. . . . ) if required to carry the same load if it was used in the "E"—vs—"D" location.

Figure 63A:
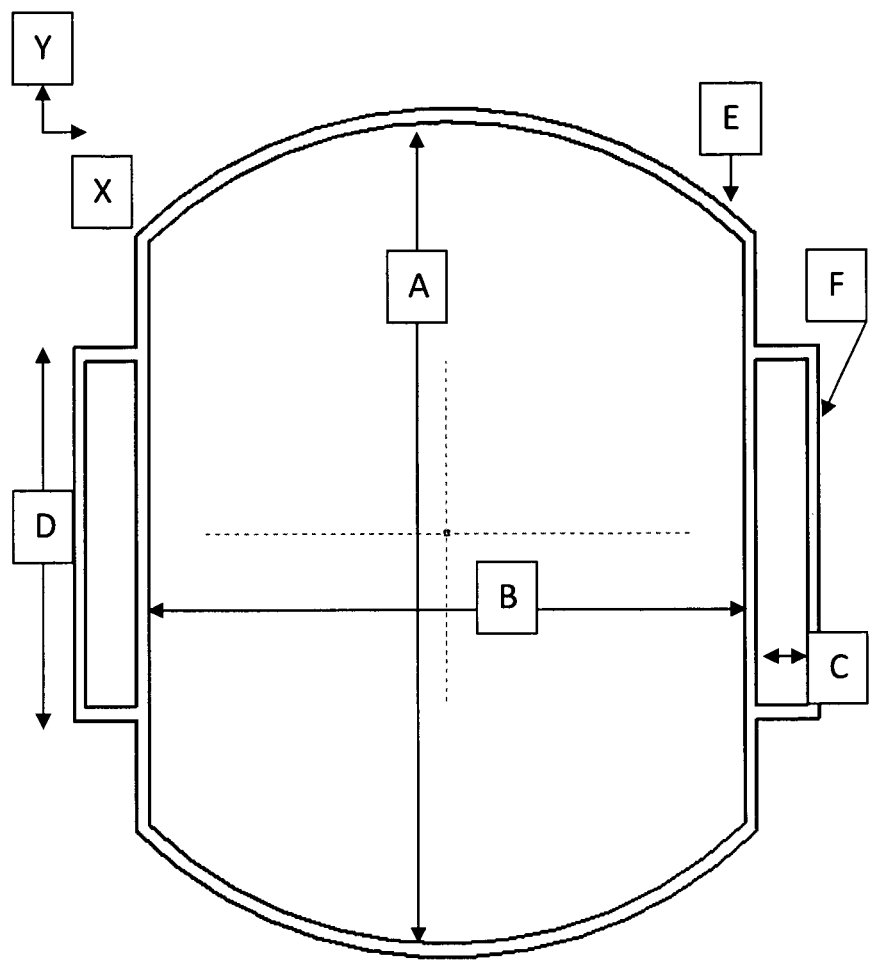
FIG. 63a shows a Box Strut—Print.
Figure 63B:
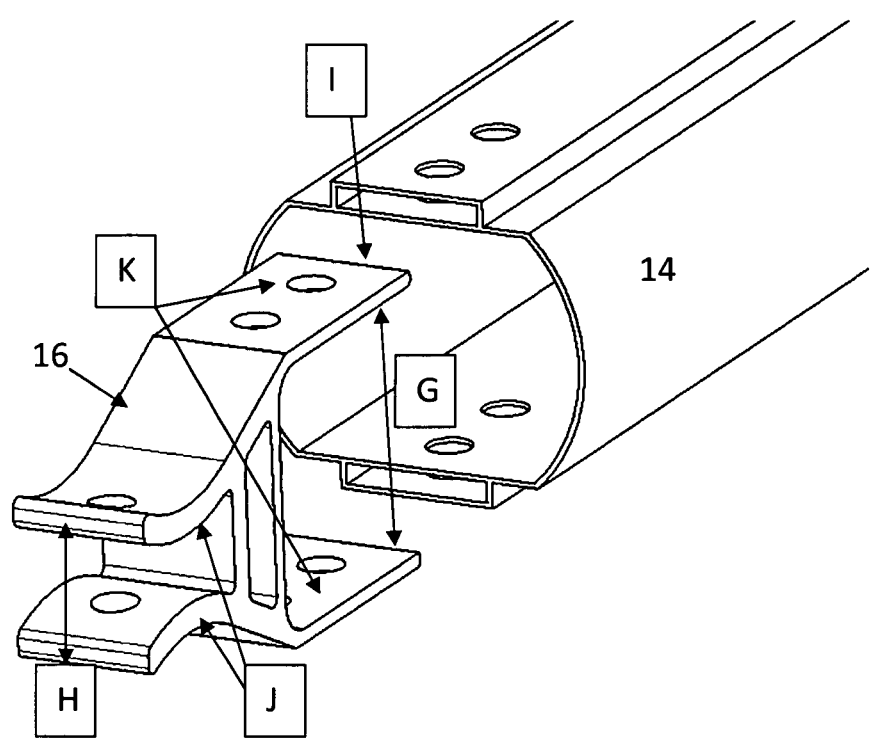
FIG. 63b shows a Box Strut & SEP 3D.
Figure 64:
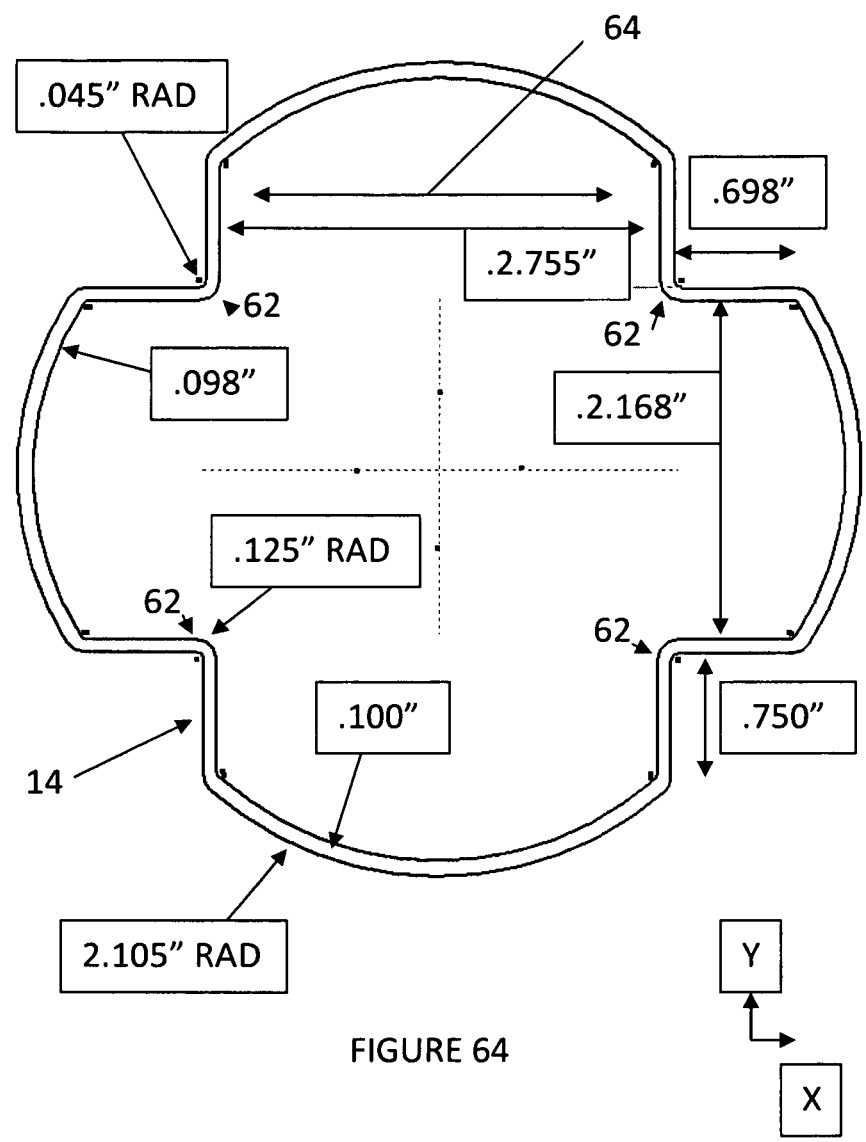
FIG. 64 shows an X Strut—Print.

Box Strut Graphic (See FIGS. 63a and 63b):
A. The base strut diameter for proper moment of inertia and radius of gyration (Ix&r) to support the necessary compressive buckling given the loads and equivalent strut lengths is mostly controlled by this dimension and the associated base wall thickness E (also, of course, the configuration of the "boxes" on the left and the right)
B. Because of the extra wall thicknesses from the "boxes" on the left and the right, this dimension can be much smaller while still providing a "balanced" Ix/Iy (moments of inertia about the X & Y axis, minimizing part weight while meeting compressive buckling criteria)
C. The wall thicknesses of the "boxes" and the gap (C) where the strut end piece legs are inserted are important to the Iy calculations.
D. The width of the "box" must be sufficient for the cut length of the strut end piece 16
E. Base Strut Wall Thickness
F. "Box" wall thickness
G. Note from the graphic that "B" is substantially less than "A", allowing for a narrower strut end piece 16. This is important because a narrower gap between the legs (K) allows for a more "linear" and efficient transfer of force within the strut end piece 16 between the fins (J) and the legs (K), resulting in less deformation and much lower stresses.
H. Note that the gap between the strut fins where it connects to the sleeve 10 single fin 52 is still "flared" ("Guided Insertion")
I. Note that because the Strut End Piece Legs (K) must fit into the Strut gap (C), these are NOT of the "guided insertion" design discussed earlier. However, the tips of the legs can be beveled or radiused to achieve part of the benefit of easier insertion.
J. Strut End Piece Fins
K. Strut End Piece Legs X Strut Graphical Explanations (see FIGS. 64, 65, 66, 67, 68, 69a, 69b, 69c, 69d, 69e, 70a, 70b, 70c, 70d, 71a, 71b, 72, 73, 74, 75, 76):

The X strut is designed to be "balanced" re: Ix and Iy around the X and Y axis to minimize aluminum content (cost) while optimizing resistance to compressive buckling. The wall thicknesses are designed to withstand the maximum tensile and compressive forces given the multiple fasteners (4—vs—the normal 2).
A. The wall thickness and cut length will need to be sized to ensure that there aren't failures due to tension at net area
B. The wall thickness and cut length will need to be sized to ensure that there aren't failures due to tension at net area.

The strut end piece 16 was designed with both extruded and/or fabricated holes and extruded and/or fabricated screw bosses 48. Initial FEA analyses showed that both work well—the screw bosses 48 would be much easier to extrude and depending on the final load characteristics for the particular frame geometry and other criteria (wind load for example) used, either can be considered.

Note that the horizontal cross member shown is a common feature with other strut end pieces in this patent application, but initial FEA analyses showed that the X strut means of attachment to the strut end piece 16 makes this less critical re: deformation and part stresses. It is MUCH less expensive to tool extrusion dies for solid shapes (the strut end piece 16 without horizontal cross member and with extruded and/or fabricated fastener screw bosses 48 is a solid—any of the shapes with the $2^{nd}$ horizontal cross member or with extruded fastener holes are hollow dies).

Figure 65:
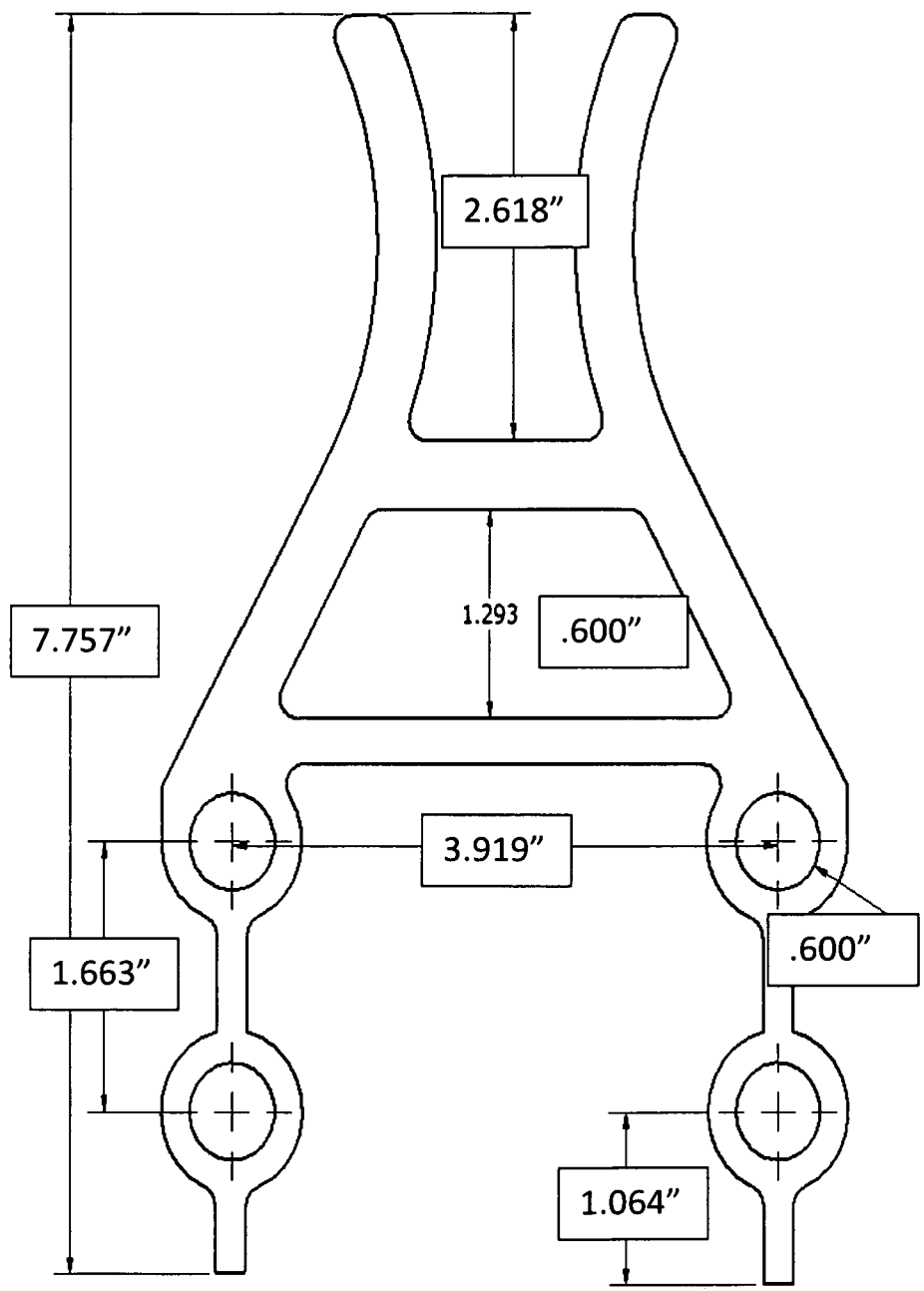
FIG. 65 shows an SEP with extruded fab holes (although these could be added after extrusion).

FIG. 65 shows a strut end piece 16 with extruded and/or fabricated fastener holes.

Figure 66:
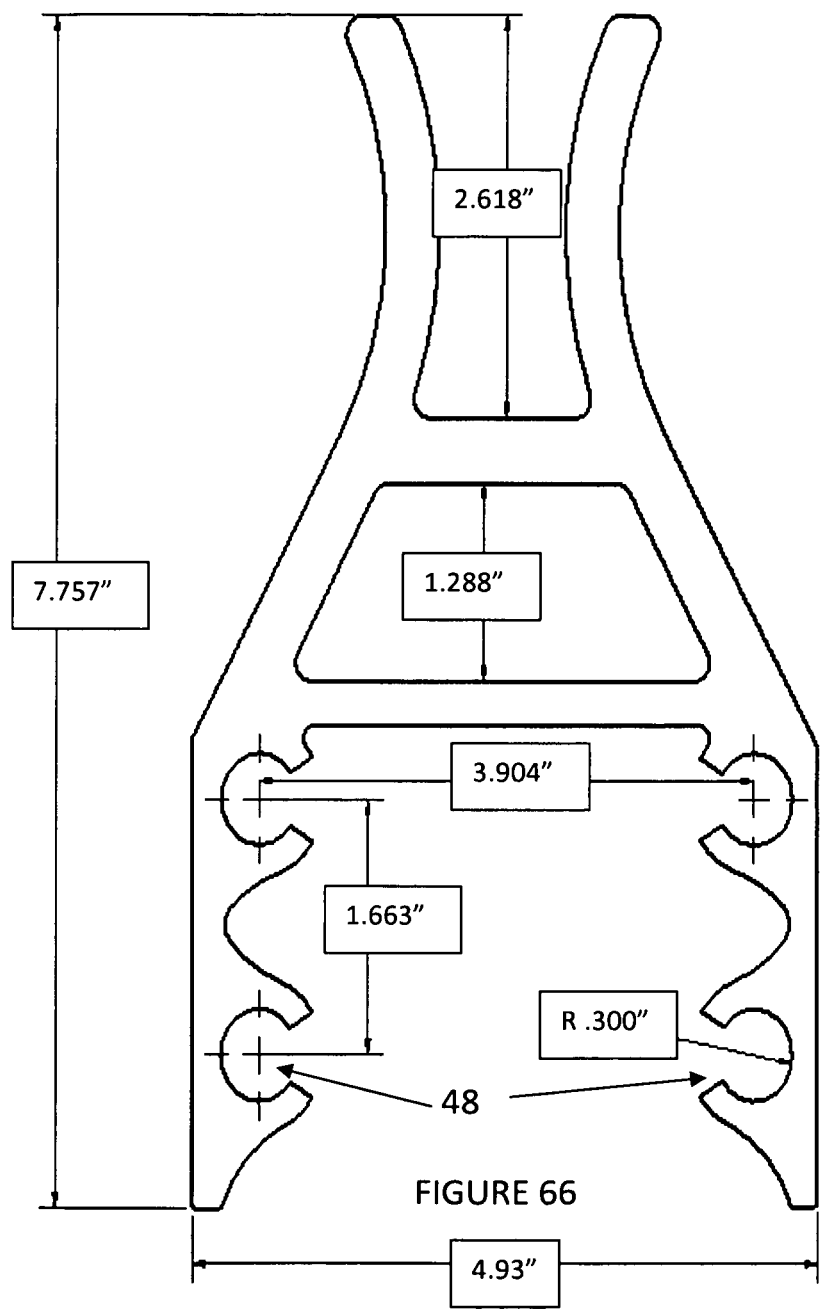
FIG. 66 shows an SEP with screw bosses 48.

FIG. 66 shows a strut end piece 16 with extruded and/or fabricated fastener screw bosses 48.

FIG. 67 shows a strut end piece 16 with extruded and/or fabricated fastener screw bosses 48.

FIG. 68 shows a strut end piece 16 without horizontal cross member with extruded and/or fabricated fastener screw bosses 48.

Figure 69A:
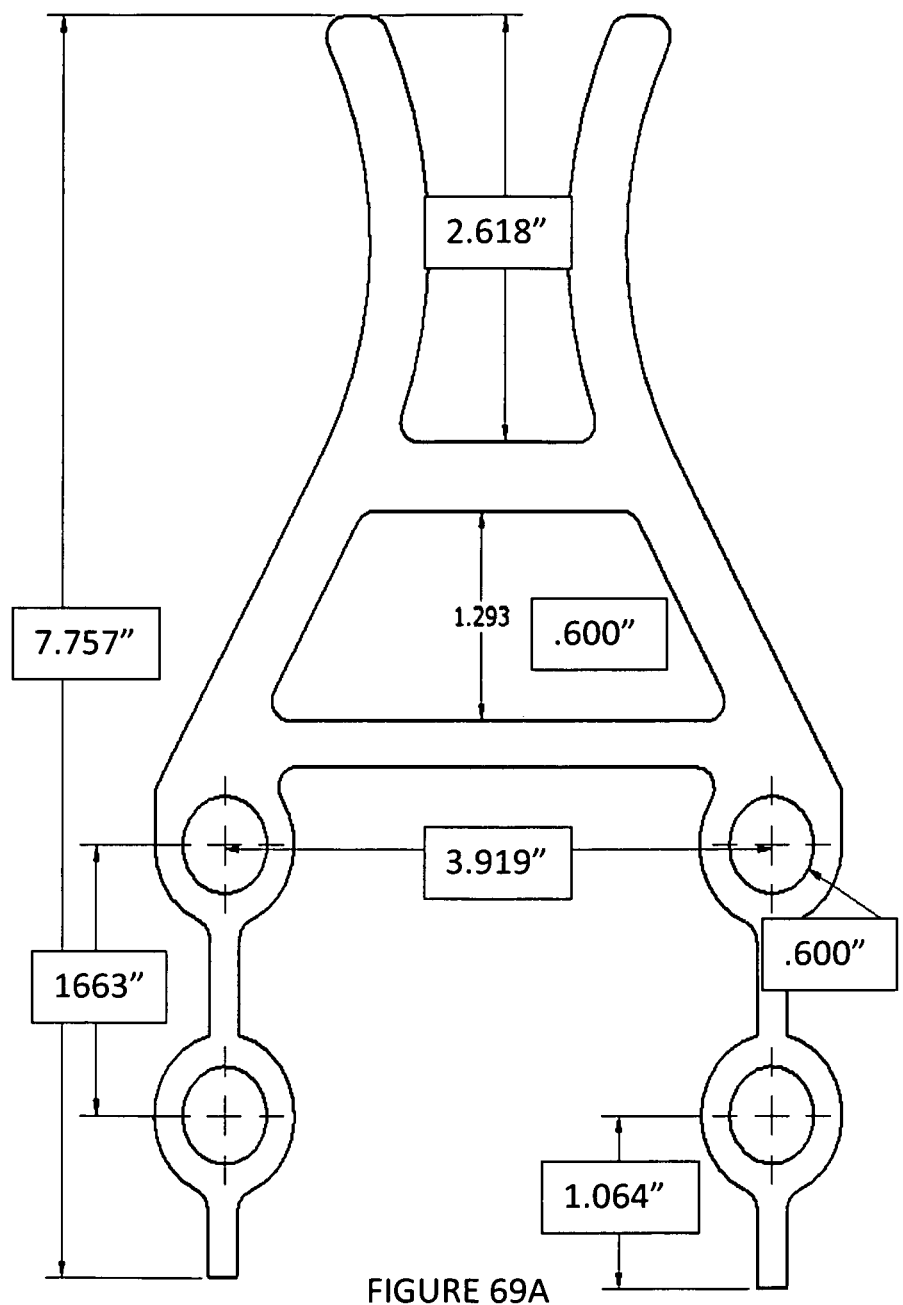
FIG. 69a shows an SEP with extruded fabrication holes.

FIG. 69a shows an "X Strut" strut end piece 16 with extruded holes. Note that the extruded holes may be drilled or otherwise pierced—vs—extruded, and may be extruded with a smaller diameter than the fastener, to be drilled to the final size once inserted into the "X Strut"; this will reduce the tolerance buildups for the three piece strut end piece/strut/strut end piece assembly.

Figure 69B:
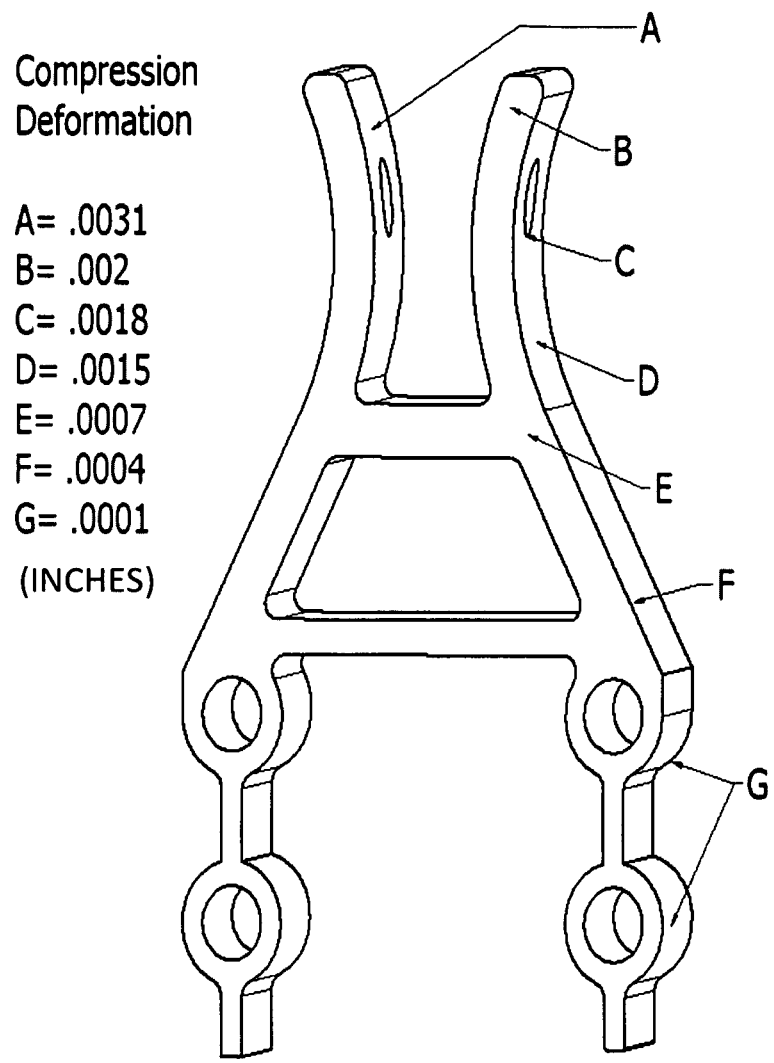
FIG. 69b shows an FEA for SEP with extruded holes showing deformation in compression.

FIG. 69b shows a Strut end piece 16 with holes for "X Strut" FEA showing maximum deformation under compressive load (10,000+ lbs) (very low deformation).

Figure 69C:
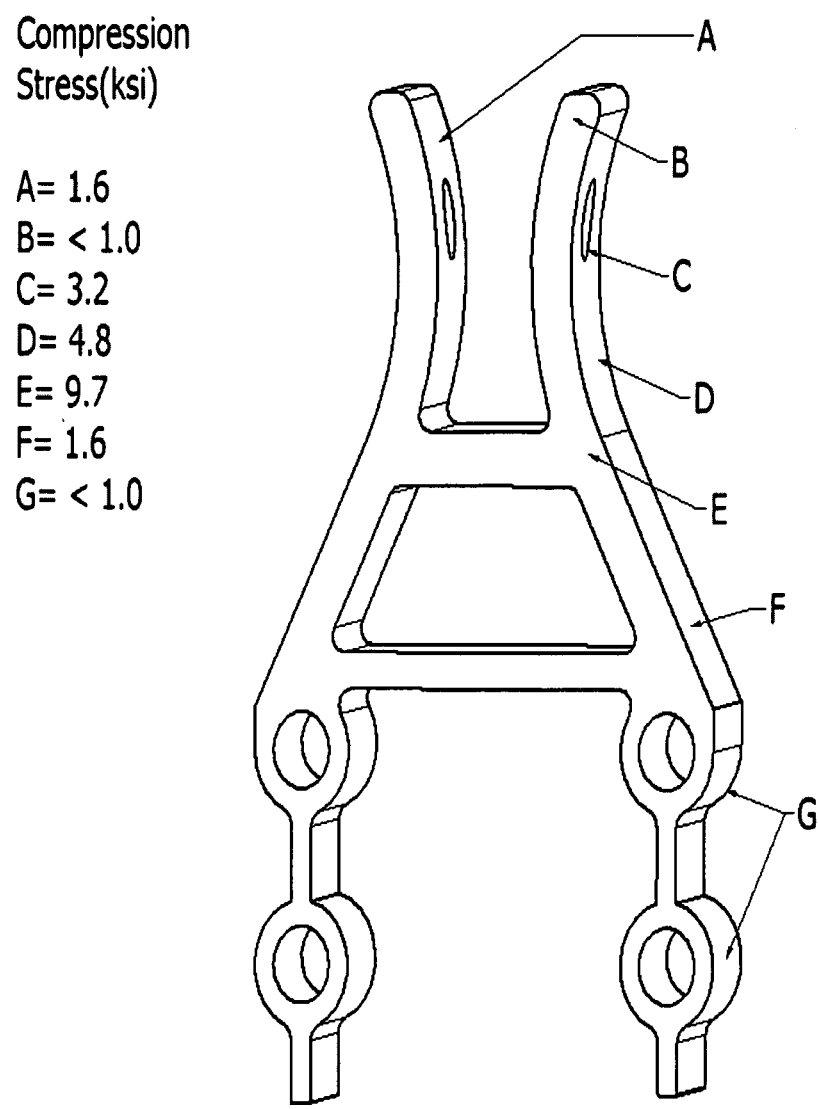
FIG. 69c shows an FEA for SEP with extruded holes showing principal stress in compression.

FIG. 69c shows a Strut end piece 16 with holes for "X Strut" FEA showing maximum principal stress under compressive load (10,000+ lbs) (very low stresses).

Figure 69D:
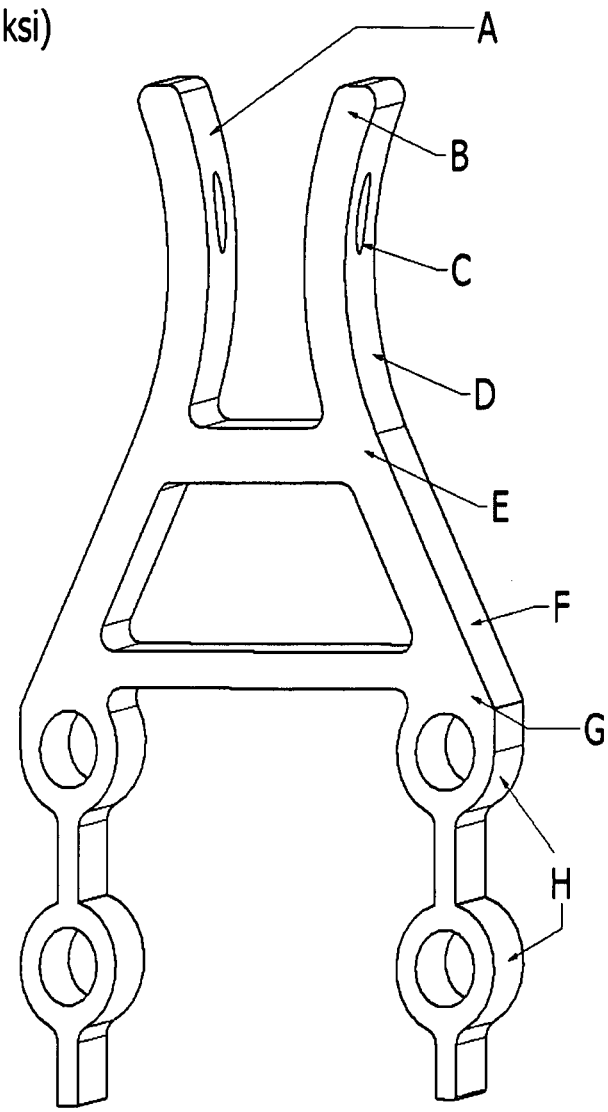
FIG. 69d shows an FEA for SEP with extruded holes showing principal stress in tension.

FIG. 69d shows a Strut end piece 16 with holes for "X Strut" FEA showing maximum principal stress under tensile load (10,000+ lbs).

Figure 69E:
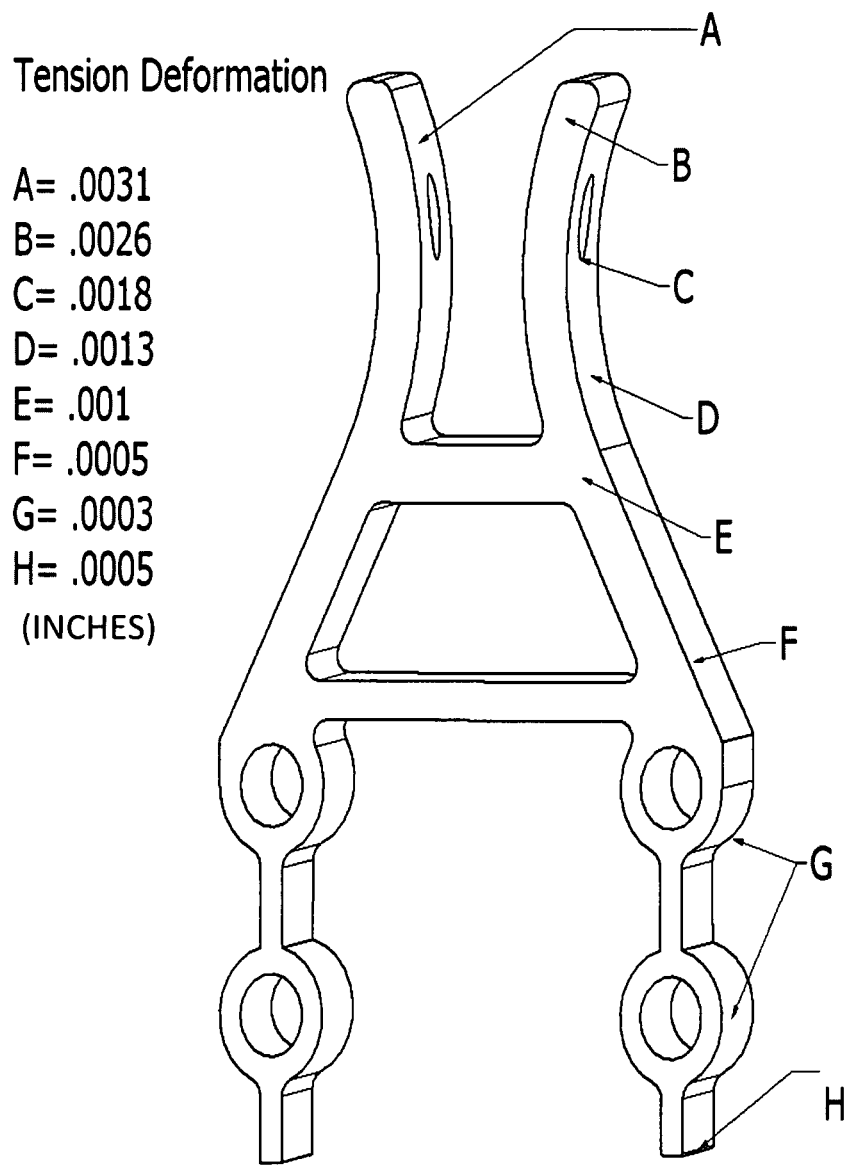
FIG. 69e shows an FEA for SEP with extruded holes showing deformation in tension.

FIG. 69e shows a Strut end piece 16 with holes for "X Strut" FEA showing maximum deformation under tensile load (10,000+ lbs) (very low deformation).

Figure 70A:
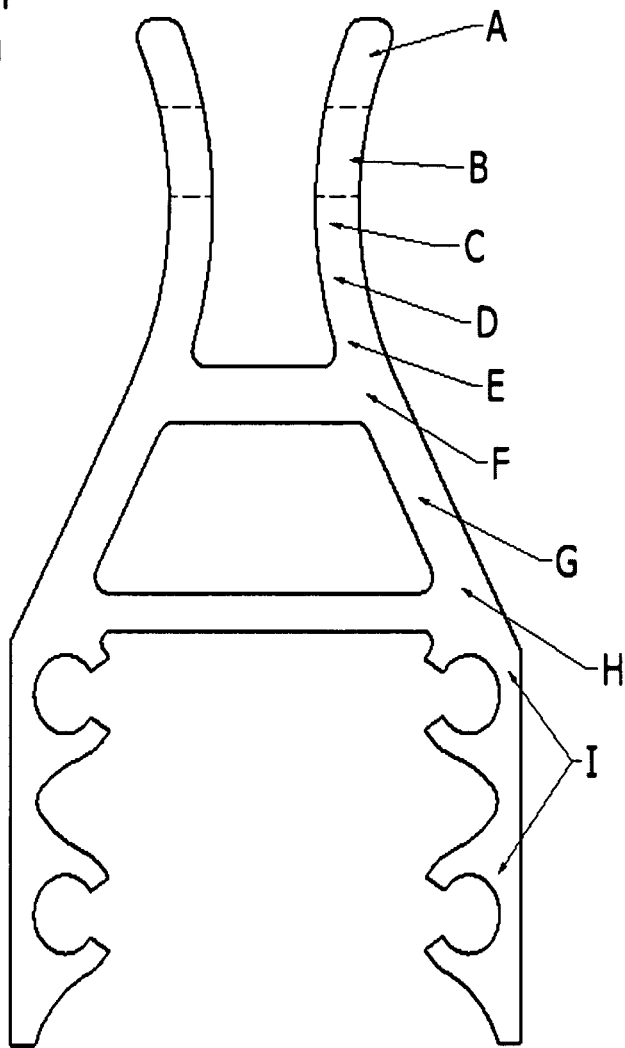
FIG. 70a shows an FEA for Hollow SEP with screw bosses 48 showing deformation in compression.

FIG. 70a shows a Strut end piece 16 with screw bosses 48 for "X Strut" FEA showing maximum deformation under compressive load (10,000+ lbs) (very low deformation).

Figure 70B:
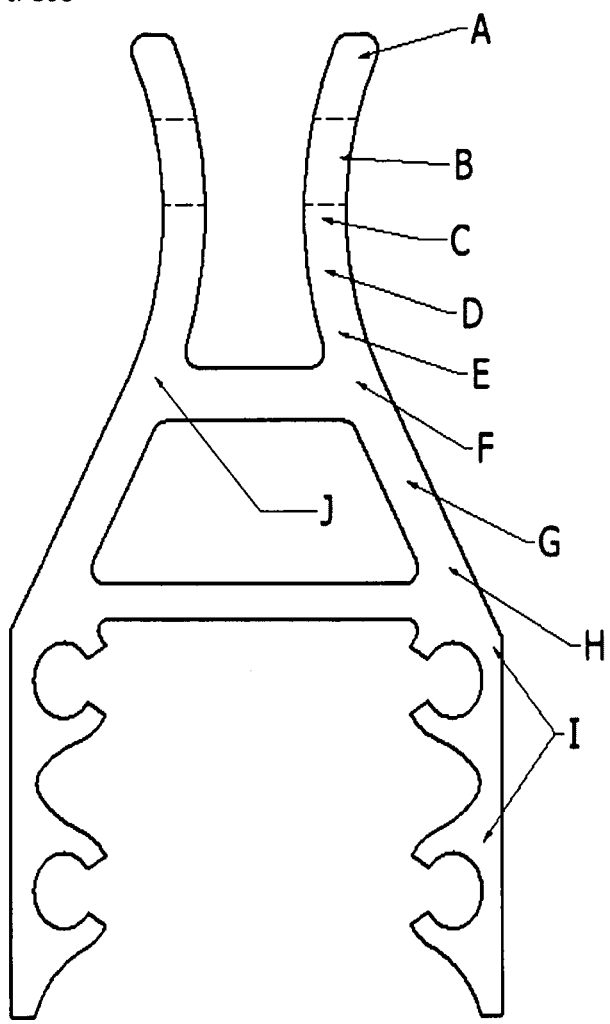
FIG. 70b shows an FEA for Hollow SEP with screw bosses 48 showing principal stress in compression.

FIG. 70b shows a Strut end piece 16 with screw bosses 48 for "X Strut" FEA showing maximum principal stress under compressive load (10,000+ lbs) (very low stress).

Figure 70C:
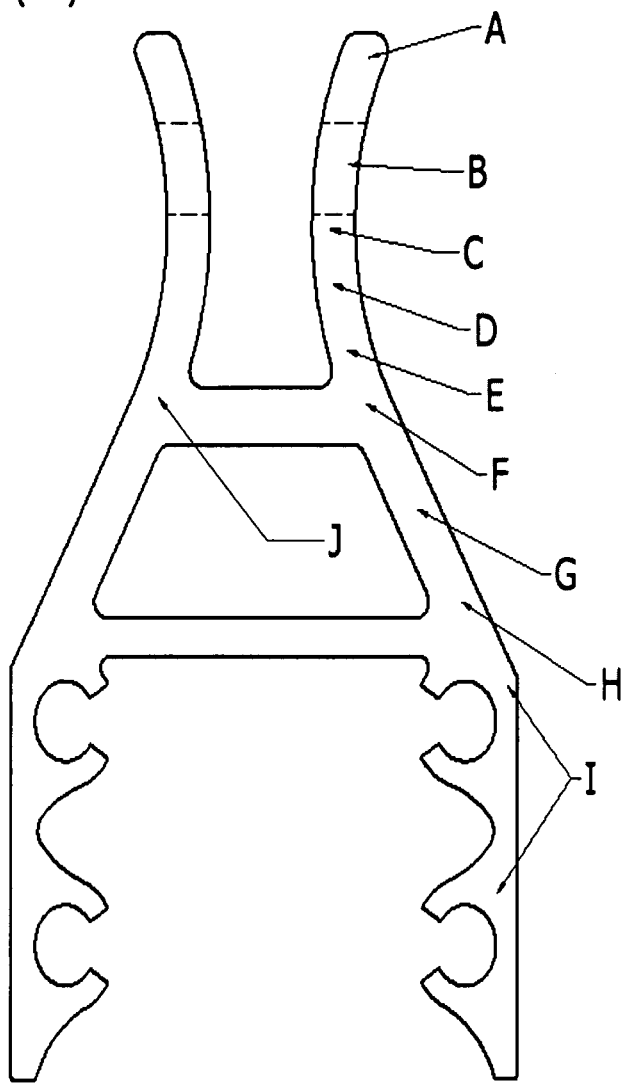
FIG. 70c shows an FEA for Hollow SEP with screw bosses 48 showing principal stress in tension.

FIG. 70c shows a Strut end piece 16 with screw bosses 48 for "X Strut" FEA showing maximum principal stress under tensile load (10,000+ lbs) (very low stress).

Figure 70D:
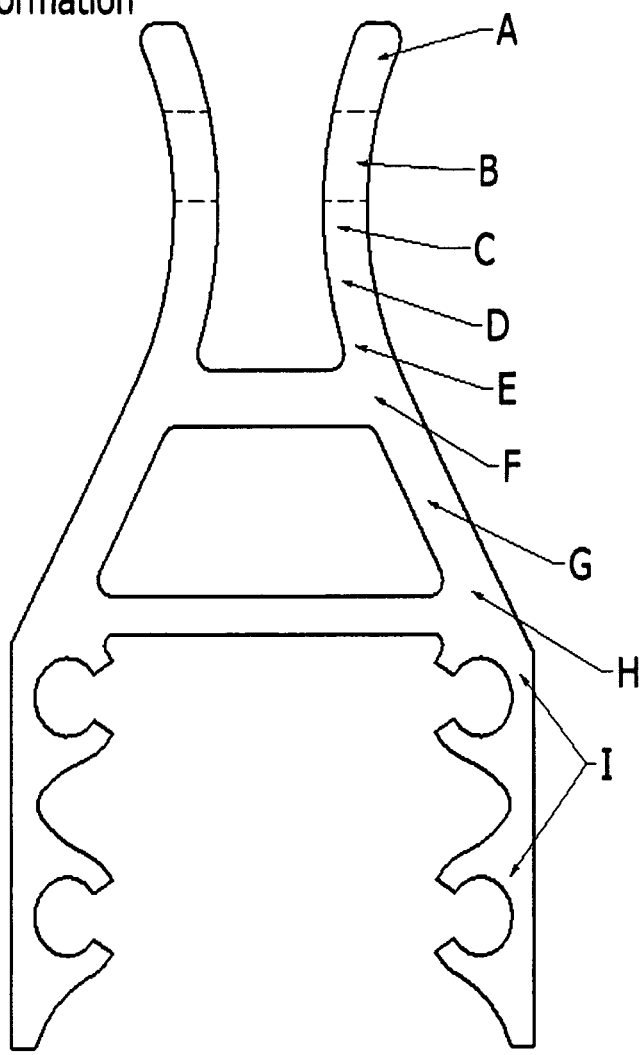
FIG. 70d shows an FEA for Hollow SEP with screw bosses 48 showing deformation in tension.

FIG. 70d shows a Strut end piece 16 with screw bosses 48 for "X Strut" FEA showing maximum deformation under tensile load (10,000+ lbs) (very low deformation).

Figure 71A:
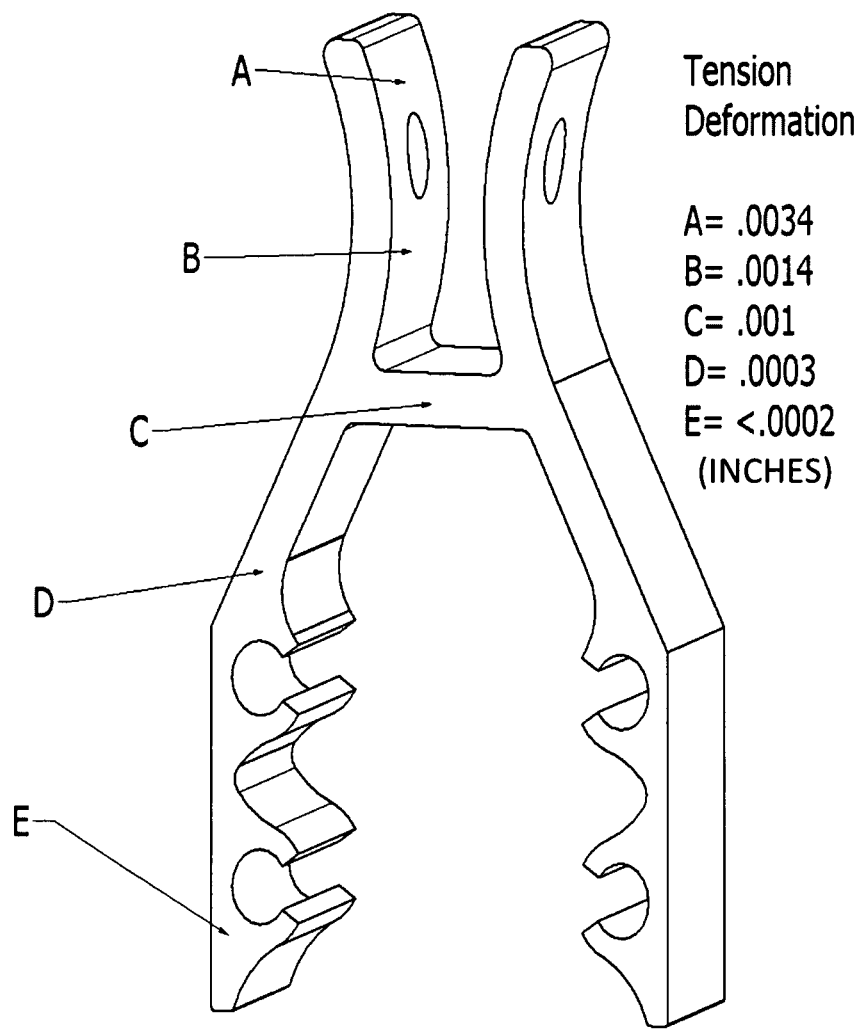
FIG. 71a shows an FEA for solid SEP with screw bosses 48 showing deformation in tension.

FIG. 71a shows a Strut end piece 16 with screw bosses 48 for "X Strut" FEA EXTRUDED AS A SOLID (note the missing "cross brace" above the top screw boss 48 hole) showing maximum deformation under tensile load (10,000+ lbs) (very low deformation).

Figure 71B:
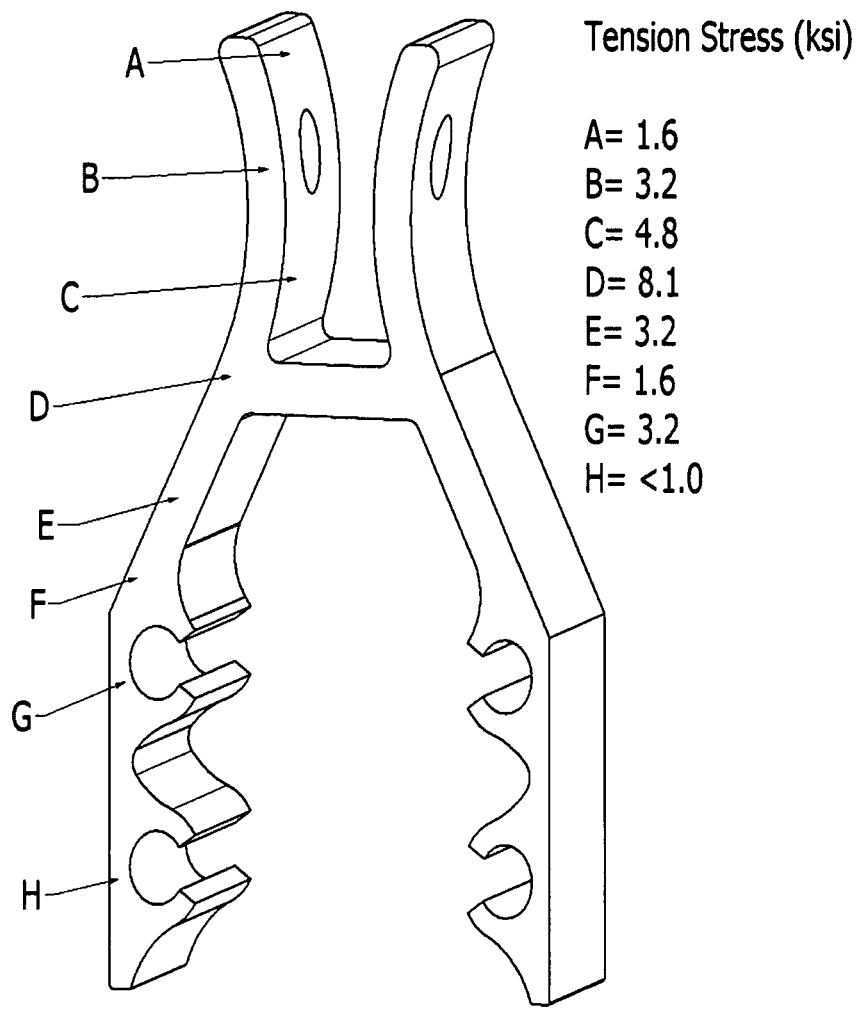
FIG. 71b shows an FEA for solid SEP with screw bosses 48 showing principal stress in tension.

FIG. 71b shows a Strut end piece 16 with screw bosses 48 for "X Strut" FEA EXTRUDED AS A SOLID (note the missing "cross brace" above the top screw boss 48 hole) showing maximum principal stress under tensile load (10,000+ lbs) (very low stress).

Figure 72:
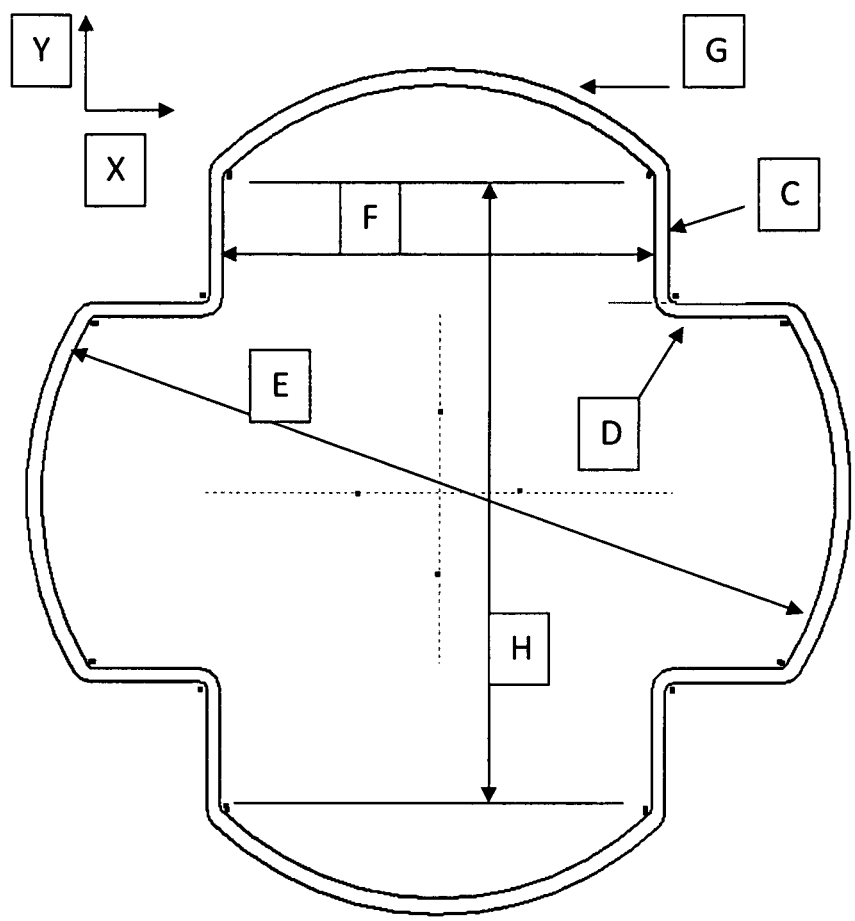
FIG. 72 shows an X Strut—print.

FIG. 72 shows an X strut cross.

Figure 73:
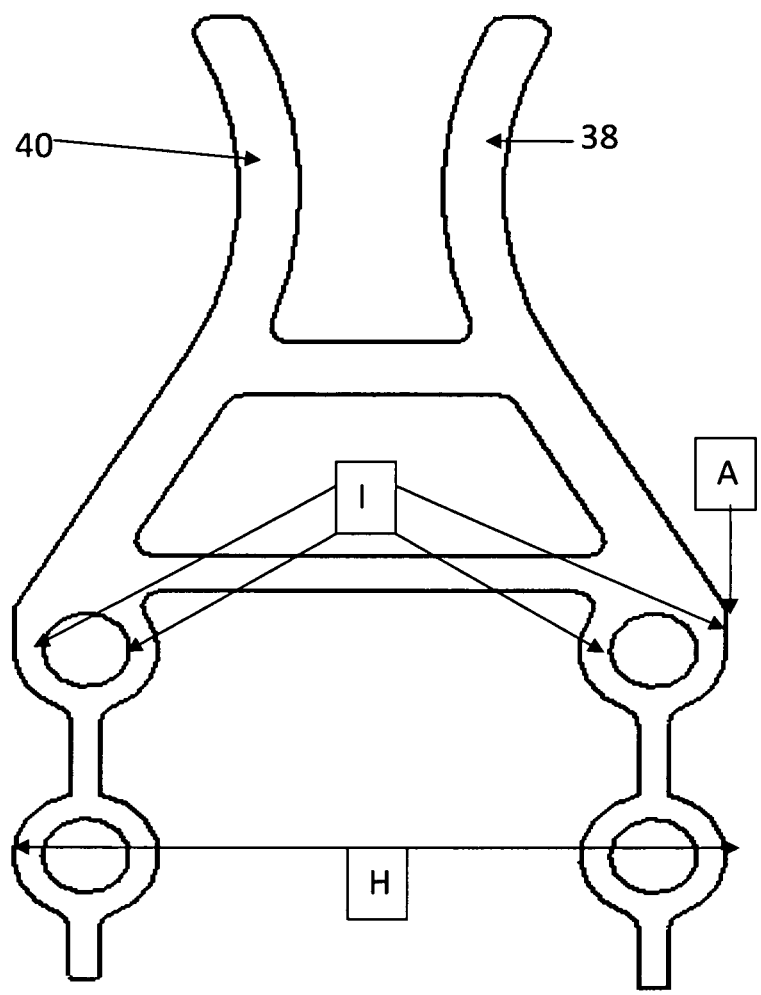
FIG. 73 shows an SEP with extruded or fabrication holes.

FIG. 73 shows a Strut end piece 16 with extruded and/or fabricated fastener holes.

Figure 74:
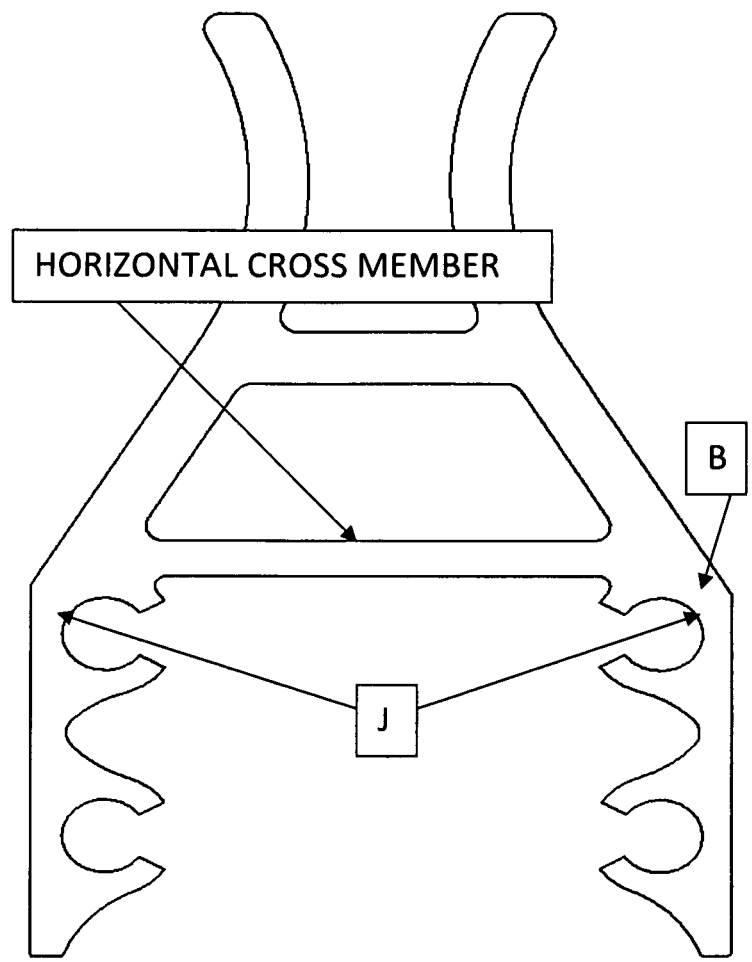
FIG. 74 shows a hollow SEP with screw bosses 48 extruded or fabricated.

FIG. 74 shows a Strut end piece 16 with extruded and/or fabricated fastener screw bosses 48.

Figure 75:
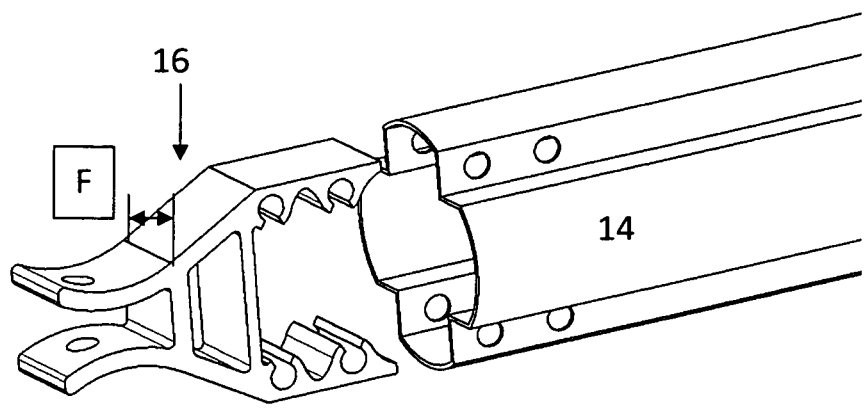
FIG. 75 shows a hollow SEP with screw bosses 48 and X strut—3D.

FIG. 75 shows a Strut end piece 16 with extruded and/or fabricated fastener screw bosses 48.

Figure 76:
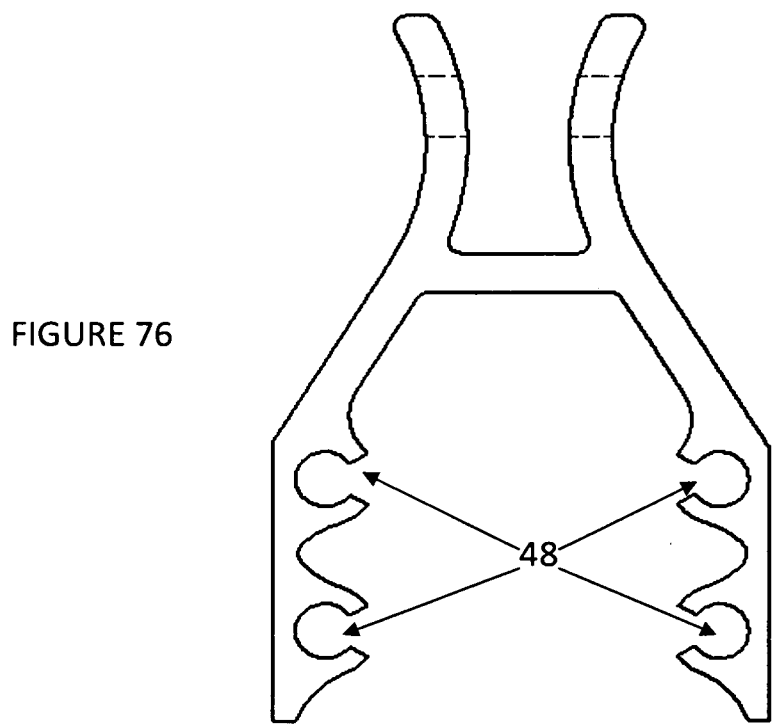
FIG. 76 shows a solid SEP with extruded or fabricated screw bosses 48.

FIG. 76 shows a Strut end piece 16 without horizontal cross member with extruded and/or fabricated fastener screw bosses 48.

X Strut Graphical Explanations (Graphics Above):

The X strut is designed to be "balanced" re: Ix and Iy around the X and Y axis to minimize aluminum content (cost) while optimizing resistance to compressive buckling. The wall thicknesses are designed to withstand the maximum tensile and compressive forces given the multiple fasteners (4—vs—the normal 2).

A. The wall thickness and cut length will need to be sized to ensure that there aren't failures due to tension at net area B. The wall thickness and cut length will need to be sized to ensure that there aren't failures due to tension at net area.

The strut end piece 16 was designed with both extruded and/or fabricated holes and extruded and/or fabricated screw bosses 48. Initial FEA analyses showed that both work well—the screw bosses 48 would be much easier to extrude and depending on the final load characteristics for the particular frame geometry and other criteria (wind load for example) used, either can be considered.

Note that the horizontal cross member shown is a common feature with other strut end pieces in this patent application, but initial FEA analyses showed that the X strut means of attachment to the strut end piece 16 makes this less critical re: deformation and part stresses. It is MUCH less expensive to tool extrusion dies for solid shapes (the strut end piece 16 without horizontal cross member and with extruded and/or fabricated fastener screw bosses 48 is a solid—any of the shapes with the $2^{nd}$ horizontal cross member or with extruded fastener holes are hollow dies).

C. The wall thickness of the extruded profile at the position through which the strut end piece 16 (whether with holes or screw bosses 48) is fastened can be designed as needed to handle the compressive and tensile loads while staying within the allowable material stresses. (See "G" also)

D. The wall thickness of other portions of the extruded profile can differ from where the strut end piece 16 is fastened, depending on the tensile and compressive buckling characteristics needed according to the loads and effective strut lengths.

E. The overall circle size of the strut 14 may be larger to improve the compressive buckling performance of the extruded member, but the strut end piece 16 width (H) can be smaller, leading to more linear force transfer between the strut end piece fins and strut end piece legs, which reduces the bending moments in the strut end piece 16 and thus reduces the part weight while meeting deformation and material stress requirements.

F. The strut end piece 16 cut length is such that it fits within this dimension.

G. The wall thickness of the extruded profile at the position through which the strut end piece 16 (whether with holes or screw bosses 48) is fastened can be designed as needed to handle the compressive and tensile loads while staying within the allowable material stresses. (See "C" also)

H. The overall circle size of the strut 14 may be larger to improve the compressive buckling performance of the extruded member, but the strut end piece width (H) can be smaller, leading to more linear force transfer between the strut end piece fins and strut end piece legs, which reduces the bending moments in the strut end piece 16 and thus reduces the part weight while meeting deformation and material stress requirements.

I. The wall thicknesses (total)× the cut length of the strut end piece 16 give the area that resists tensile forces. Because the strut end piece cut length is generally wider than in other designs of struts, the resulting material stresses and thus deformations are lower.

J. The wall thicknesses (total)× the cut length of the strut end piece 16 give the area that resists tensile forces. Because the strut end piece cut length is generally wider than in other designs of struts, the resulting material stresses and thus deformations are lower.

Figure 77:
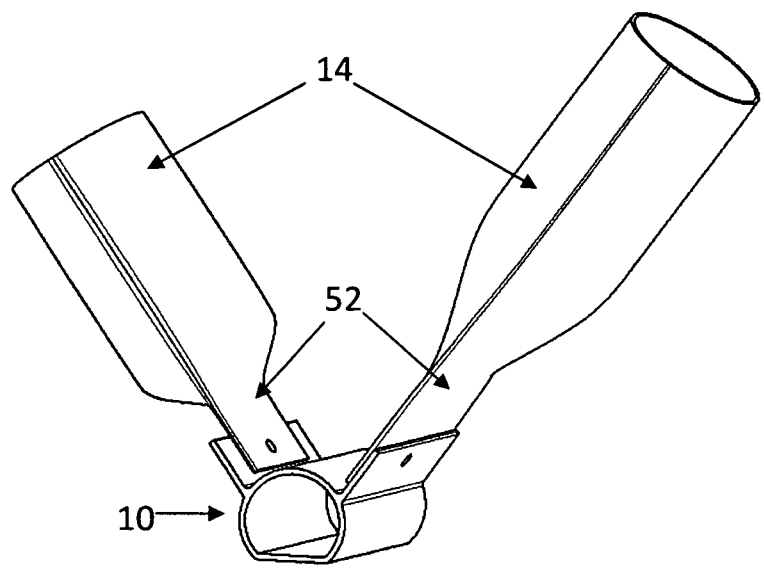
FIG. 77 shows a smashed Strut End Piece Concept—3D.

Smashed Strut End Concept (FIG. 77):

This concept is similar to how many steel trusses are produced—a simple tubular extrusion is flattened, and then connected at the flat area.

Figure 78:
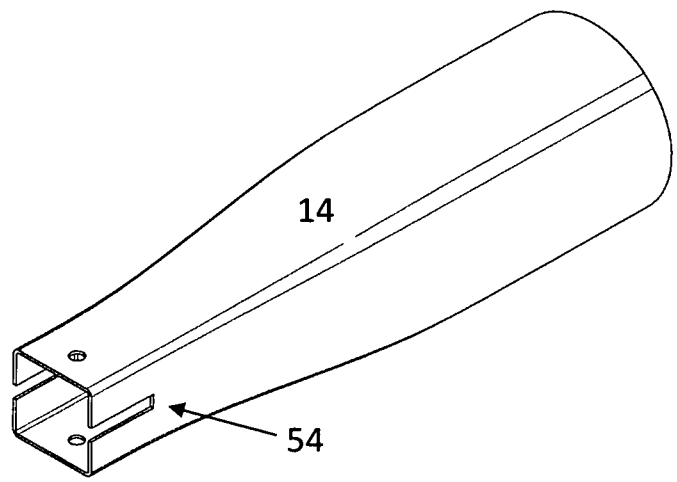
FIG. 78 shows a Formed Strut End Piece Concept—3D.
Figure 79A:
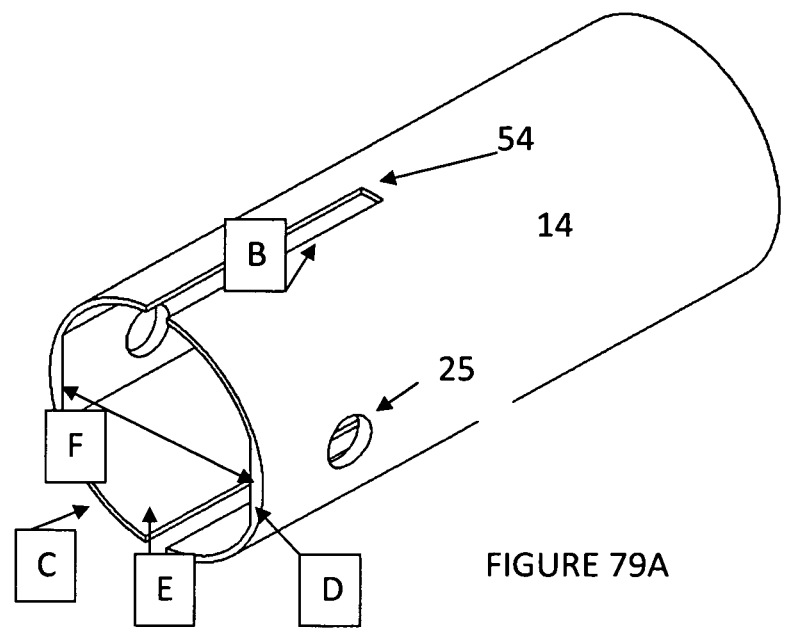
FIG. 79a shows a Slotted Strut Concept—3D.
Figure 79B:
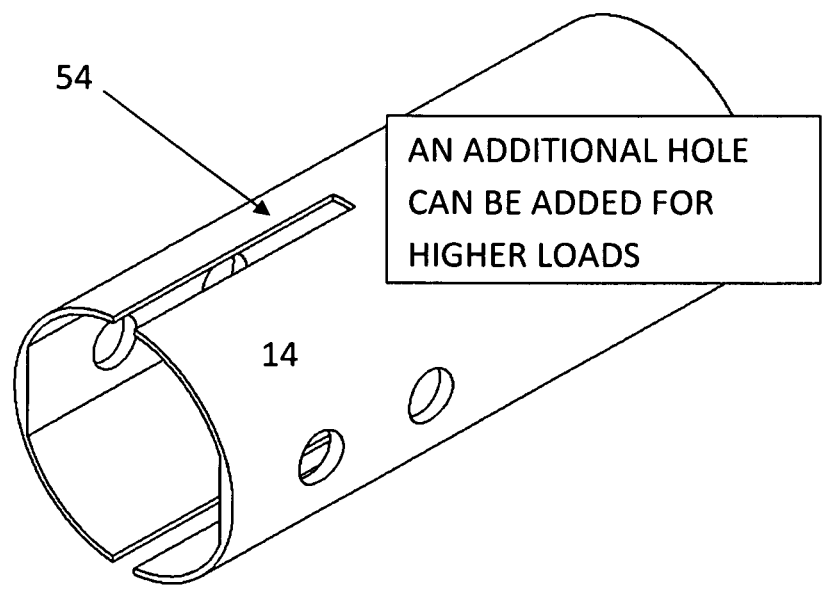
FIG. 79b shows a Slotted Strut Concept for higher loads (added fastener hole)—3D.
Figure 80:
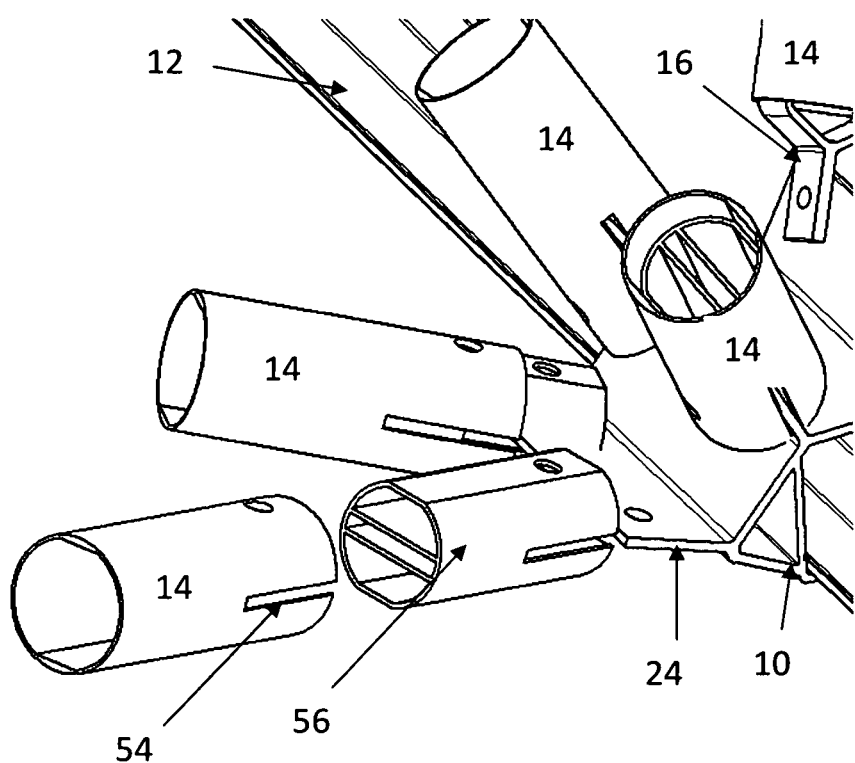
FIG. 80 shows a Slotted Strut, strut spacer and single fin sleeve assembly—3D.
Figure 81B:
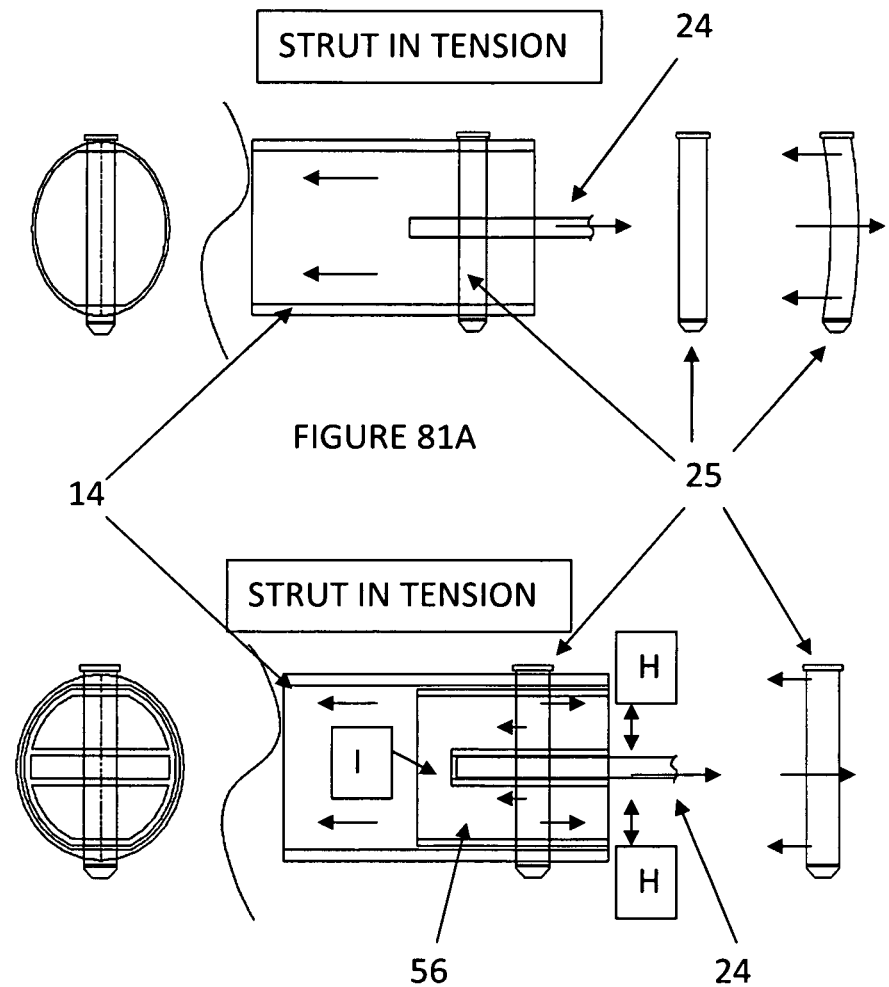
FIG. 81b shows a strut with strut spacer.
Figure 82:
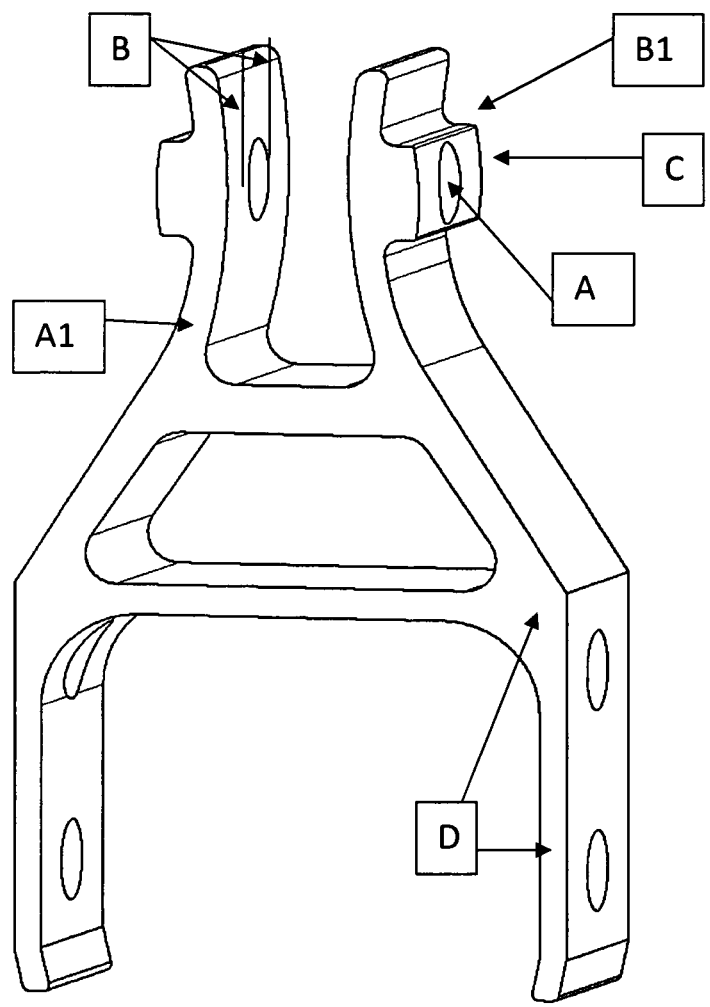
FIG. 82 shows an SEP with locally thickened (and nonparallel) bearing area—3D.

Formed Strut Concept (FIG. 78):

After extrusion, the end of the strut 14 is formed and slotted, with the fastener holes pierced, drilled or otherwise created. This design would lead to a direct strut to sleeve 10 connection, reducing the dimensions of the interface so that the strut 14 to sleeve 10 connection is more "compact", leading to a more extrudable sleeve 10 (lighter weight and smaller circle size, so that it can be extruded on smaller extrusion presses.

Slotted Strut Concept (FIGS. 79a, 79b, 80, 81a and 81b):

After extrusion, the end of the strut 14 is slotted, with the fastener holes pierced, drilled or otherwise created. This design would lead to a direct strut to sleeve 10 connection. With very small diameter struts, it is possible that this connection could be simply the slotted strut slid over a single fin 52 of the sleeve 10 and fastened. With larger diameters, or higher stresses, this could lead to fastener bending issues. In this case, a strut spacer 56 could be utilized, slid into the end of the strut 14, perhaps even pierced and slotted at the same time, with the strut spacer 56 providing support for the pin much closer to the sleeve 10 fin 24 connection.

A. Fastener: The fastener (Pin, Rivet, Bolt or other) secures the strut 14 to the strut sleeve 10 and to the sleeve 10 single fin 52.

B. The concept is to use the strut 14 with the strut spacer 56 together to more efficiently support the pin, through which passes all of the tensile and compressive loads and to provide for the addition of additional fastener(s) if required. The strut 14 and strut spacer 56 needed to be slotted to fit over the sleeve 10 single fin 52; this slotting operation can be done individually or with the two pieces together (perhaps passing over a saw blade, milling cutter or other means to create the slot 54). The "slot" 54 spacing on the extruded strut spacer 56 (G) could be slightly larger than the actual slot 54 to ensure that the slotting operation doesn't cut into the two walls between H & H. The graphic shown above shows a simple parallel sided sleeve 10 single fin 52, but the same concept would work with the non-parallel, curved single sleeve 10 fin shown elsewhere in this patent application.

C. If the strut 14 is circular (other strut designs used throughout this patent are also possible), it could have one wall thickness for the bulk of the strut profile with, if necessary, a thickened wall (either thickened on the interior with the flat as shown and/or thickened with a bulge on the outside periphery of the strut).

D. This shows the thickened portion of the strut wall, as discussed in C. if needed (for example if bearing stresses from the fastener are too large and additional bearing area is required to reduce the stress levels).

E. The ID of the bulk of the strut 14 may be one dimension while:

F. The ID of the strut 14 at the thickened portion could, if necessary, be a different dimension.

G. The slot 54 width of both the strut 14 and strut spacer 56 may be the same or slightly difference, but must clear the thickest part of the sleeve 10 single fin 52.

H. A main purpose of the strut spacer 56, besides providing support to the strut 14 at the connection ends, would be to substantially change the loading on the fastener. If the slotted strut were placed onto the sleeve 10 single fin 52 without the spacer, the pin would see balanced and opposite forces either putting the strut 14 into tension or compression—the pin would be "unsupported" over a much narrower distance (H—vs—F (minus the spacer wall thicknesses)).

I. The strut spacer 56, while slotted, is not completely cut in ½—the remaining material will be designed to properly transfer the loads from the strut 14 through the strut spacer 56 to the sleeve 10 fin without excess deflection or stresses which could lead to part failure.

Locally Thickened Portion of a Member

A. Base thickness of strut end piece fin.

B. Locally thickened portion of strut end piece fin (easy to do with the aluminum extrusion process) to decrease stresses (through increasing area subject to the stresses). Currently shown w/local thickening of fastener that connects the strut end piece 16 to the sleeve 10 fin 24, but could be @ other portions of the various extrusions (see d. below as an example):
  a. Bearing stress at fastener contact area=less lbs/sq.in. due to larger sq.in.
  b. Block shear failure (thickened portion greatly increases the amount of metal that would have to fail from block shear)
  c. Tensile failure of net area (thickened portion on either side of the hole greatly increases the area of material, lowering the stress (psi))
  d. Local thickening could also occur @ the strut end piece leg to strut fastener(s), @ critical points subject to bending stresses, etc.

Figure 83:
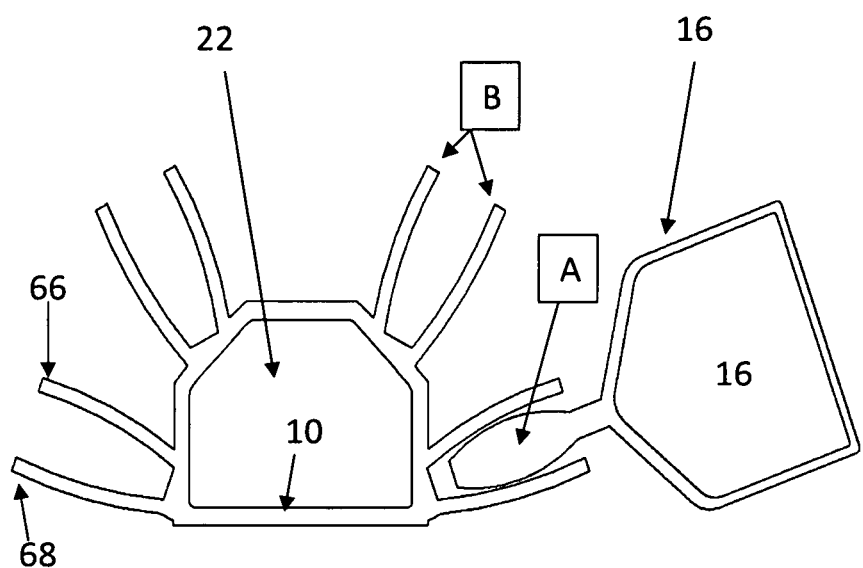
FIG. 83 shows a single fin SEP with double fin nonstraight nonparallel fin sleeve.
Figure 84:
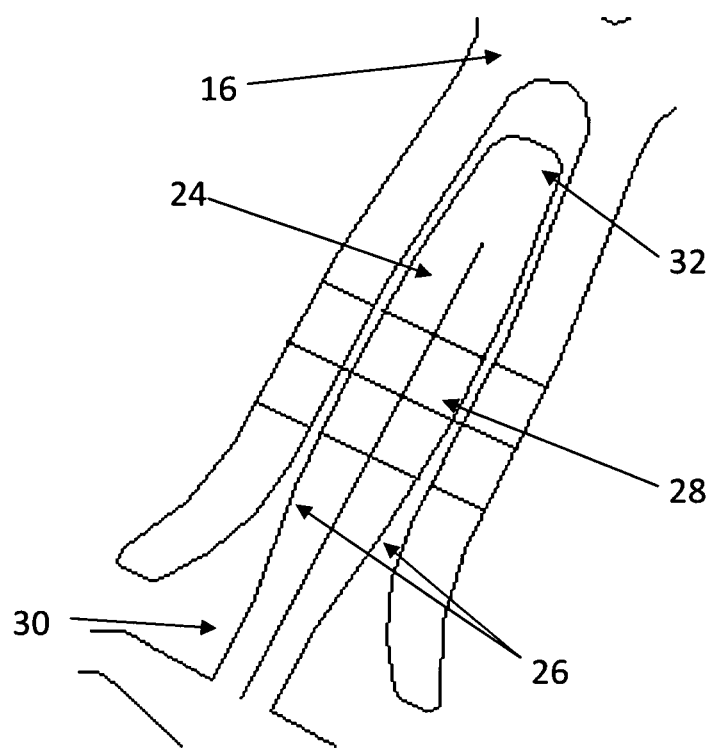
FIG. 84 shows a single fin sleeve with guided insertion Strut End Piece (SEP).
Figure 85:
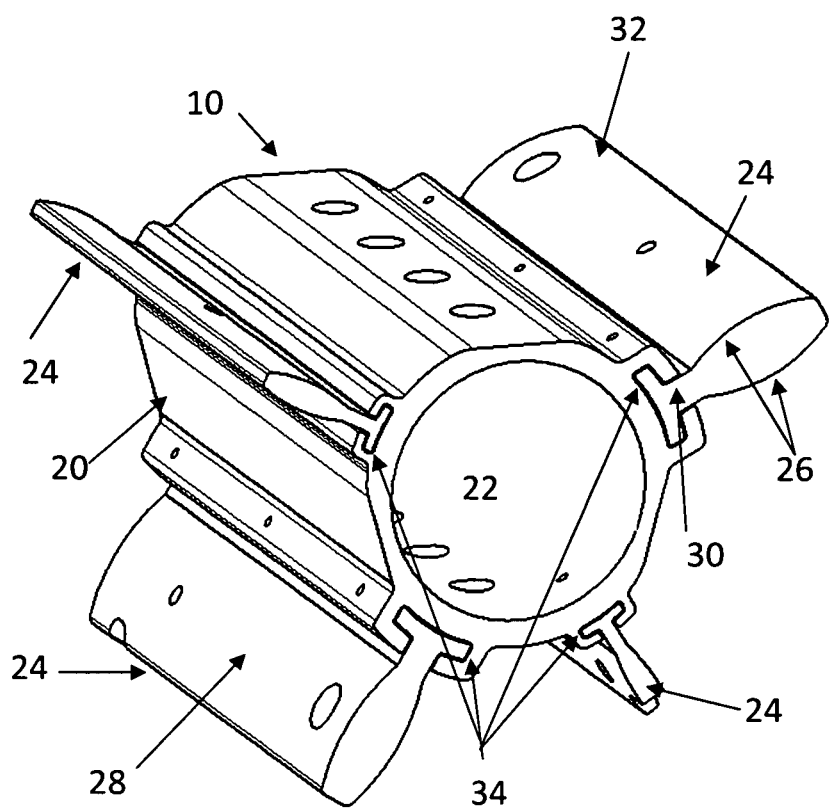
FIG. 85 shows a single fin sleeve with guided insertion Strut End Piece (SEP) with insertable fins—3D.

Single Fin 52 Strut End (See FIG. 83)

In general the Sleeve 10 is the larger extrusion (both weight/ft and circle size) when compared to the Strut end piece 16. At certain limits of weight/ft or circle size, the next larger extrusion press size is required (smaller shapes can be run on larger presses but larger shapes cannot be run on presses that are too small), which limits extrusion flexibility (fewer large presses exist) and increases cost/lb (due to the reduced number of large diameter presses available. Generally speaking, as required press size increases, so does extrusion cost.

There may be circumstances where the particular geometry, loads, strut configuration, etc. . . . make it advantageous to switch such that the multiple fins are on the sleeve 10 (shown here (B) as non parallel fins) while the single fin 52 (A) is on the strut end piece 16 (also shown with non-parallel surfaces 26 to ease assembly while still providing bearing surface for the fastener, meeting tension on net area and block shear requirements (discussed elsewhere).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. An assembly for a solar mirror frame support comprising:
  a metal sleeve with a fin, the metal sleeve having a size that allows the metal sleeve and fin to be extruded on a 10 inch diameter extrusion press, the metal sleeve and fin being one continuous extrusion;
  a strut having an end; and
  a metal strut end piece that is distinct and separate from the strut, the strut end piece having a size that allows the strut end piece to be extruded on a 10 inch diameter extrusion press, the strut end piece comprising:
    an engagement portion which engages with the strut in proximity to the strut's end;
    a first strut end piece upper leg extending from the engagement portion; and
    a second strut end piece upper leg extending from the engagement portion, the ends of the first strut end piece upper leg and the second strut end piece upper leg curving or angled outwards, the first and second strut end piece upper legs engaging with the fin of the metal sleeve, each of the first and second strut end pieces upper legs has a fastener hole, the engagement portion and the first and second piece upper legs being one continuous extrusion.

2. The assembly as described in claim 1 that can support between 1000-20000 pounds.

3. The assembly as described in claim 2 wherein the engagement portion has bottom legs which fit into the strut whose ends angle or curve inwards or are beveled or otherwise formed to ease insertion of the strut end piece into the strut.

* * * * *